US011514673B2

(12) United States Patent
Lehrich et al.

(10) Patent No.: US 11,514,673 B2
(45) Date of Patent: Nov. 29, 2022

(54) SYSTEMS AND METHODS FOR AUGMENTED REALITY

(71) Applicant: Magic Leap, Inc., Plantation, FL (US)

(72) Inventors: Daniel Lewinn Lehrich, Miami, FL (US); David C. Lundmark, Los Altos, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/938,782

(22) Filed: Jul. 24, 2020

(65) Prior Publication Data

US 2021/0097286 A1 Apr. 1, 2021

Related U.S. Application Data

(60) Provisional application No. 62/899,678, filed on Sep. 12, 2019, provisional application No. 62/881,355, filed on Jul. 31, 2019, provisional application No. 62/879,408, filed on Jul. 26, 2019.

(51) Int. Cl.
*G06V 20/20* (2022.01)
*G06F 3/01* (2006.01)
*G06K 9/62* (2022.01)

(52) U.S. Cl.
CPC .............. *G06V 20/20* (2022.01); *G06F 3/013* (2013.01); *G06F 3/014* (2013.01); *G06K 9/6218* (2013.01)

(58) Field of Classification Search
CPC ... G06T 19/006; G06T 13/40; G06K 9/00671; G06K 9/6218; G06F 3/011; G06F 3/013; G06F 3/014; G06F 3/017; A63F 13/211; A63F 13/213; A63F 13/25; A63F 13/42; A63F 13/428; A63F 13/5255; A63F 13/655

See application file for complete search history.

(56) References Cited

U.S. PATENT DOCUMENTS

| | | |
|---|---|---|
| 4,344,092 A | 8/1982 | Miller |
| 4,652,930 A | 3/1987 | Crawford |
| 4,810,080 A | 3/1989 | Grendol et al. |
| 4,997,268 A | 3/1991 | Dauvergne |
| 5,007,727 A | 4/1991 | Kahaney et al. |
| 5,074,295 A | 12/1991 | Willis |
| 5,240,220 A | 8/1993 | Elberbaum |
| 5,251,635 A | 10/1993 | Dumoulin et al. |
| 5,410,763 A | 5/1995 | Bolle |
| 5,455,625 A | 10/1995 | Englander |
| 5,495,286 A | 2/1996 | Adair |

(Continued)

FOREIGN PATENT DOCUMENTS

| | | |
|---|---|---|
| CN | 104603675 A | 5/2015 |
| CN | 107683497 A1 | 2/2018 |

(Continued)

OTHER PUBLICATIONS

Communication Pursuant to Article 94(3) EPC dated Sep. 4, 2019, European Patent Application No. 10793707.0, (4 pages).

(Continued)

*Primary Examiner* — Jin Cheng Wang
(74) *Attorney, Agent, or Firm* — Stephen M. De Klerk

(57) ABSTRACT

An augmented reality viewer includes components, assemblies, and executable logic to provide a user with the perception of rich augmented reality experiences, including aspects of the aquatic world.

20 Claims, 44 Drawing Sheets

(56) References Cited

U.S. PATENT DOCUMENTS

| | | |
|---|---|---|
| 5,497,463 A | 3/1996 | Stein et al. |
| 5,682,255 A | 10/1997 | Friesem et al. |
| 5,826,092 A | 10/1998 | Flannery |
| 5,854,872 A | 12/1998 | Tai |
| 5,864,365 A | 1/1999 | Sramek et al. |
| 5,937,202 A | 8/1999 | Crosetto |
| 6,012,811 A | 1/2000 | Chao et al. |
| 6,016,160 A | 1/2000 | Coombs et al. |
| 6,064,749 A | 5/2000 | Hirota et al. |
| 6,076,927 A | 6/2000 | Owens |
| 6,117,923 A | 9/2000 | Amagai et al. |
| 6,124,977 A | 9/2000 | Takahashi |
| 6,191,809 B1 | 2/2001 | Hori et al. |
| 6,375,369 B1 | 4/2002 | Schneider et al. |
| 6,385,735 B1 | 5/2002 | Wilson |
| 6,538,655 B1 * | 3/2003 | Kubota .................. G06T 13/40 345/474 |
| 6,541,736 B1 | 4/2003 | Huang et al. |
| 6,757,068 B2 | 6/2004 | Foxlin |
| 7,046,515 B1 | 5/2006 | Wyatt |
| 7,051,219 B2 | 5/2006 | Hwang |
| 7,076,674 B2 | 7/2006 | Cervantes |
| 7,111,290 B1 | 9/2006 | Yates, Jr. |
| 7,119,819 B1 | 10/2006 | Robertson et al. |
| 7,219,245 B1 | 5/2007 | Raghuvanshi |
| 7,431,453 B2 | 10/2008 | Hogan |
| 7,542,040 B2 | 6/2009 | Templeman |
| 7,573,640 B2 | 8/2009 | Nivon et al. |
| 7,724,980 B1 | 5/2010 | Shenzhi |
| 7,751,662 B2 | 7/2010 | Kleemann |
| 7,758,185 B2 | 7/2010 | Lewis |
| 8,060,759 B1 | 11/2011 | Arnan et al. |
| 8,120,851 B2 | 2/2012 | Iwasa |
| 8,214,660 B2 | 7/2012 | Capps, Jr. |
| 8,246,408 B2 | 8/2012 | Elliot |
| 8,353,594 B2 | 1/2013 | Lewis |
| 8,508,676 B2 | 8/2013 | Silverstein et al. |
| 8,547,638 B2 | 10/2013 | Levola |
| 8,605,764 B1 | 10/2013 | Rothaar et al. |
| 8,619,365 B2 | 12/2013 | Harris et al. |
| 8,696,113 B2 | 4/2014 | Lewis |
| 8,733,927 B1 | 5/2014 | Lewis |
| 8,736,636 B2 | 5/2014 | Kang |
| 8,759,929 B2 | 6/2014 | Shiozawa et al. |
| 8,793,770 B2 | 7/2014 | Lim |
| 8,823,855 B2 | 9/2014 | Hwang |
| 8,847,988 B2 | 9/2014 | Geisner et al. |
| 8,874,673 B2 | 10/2014 | Kim |
| 9,010,929 B2 | 4/2015 | Lewis |
| 9,015,501 B2 | 4/2015 | Gee |
| 9,086,537 B2 | 7/2015 | Iwasa et al. |
| 9,095,437 B2 | 8/2015 | Boyden et al. |
| 9,239,473 B2 | 1/2016 | Lewis |
| 9,244,293 B2 | 1/2016 | Lewis |
| 9,244,533 B2 | 1/2016 | Friend et al. |
| 9,383,823 B2 * | 7/2016 | Geisner .................. G06F 3/017 |
| 9,489,027 B1 | 11/2016 | Ogletree |
| 9,519,305 B2 | 12/2016 | Wolfe |
| 9,581,820 B2 | 2/2017 | Robbins |
| 9,582,060 B2 | 2/2017 | Balatsos |
| 9,658,473 B2 | 5/2017 | Lewis |
| 9,671,566 B2 | 6/2017 | Abovitz et al. |
| 9,671,615 B1 | 6/2017 | Vallius et al. |
| 9,696,795 B2 | 7/2017 | Marcolina et al. |
| 9,798,144 B2 | 10/2017 | Sako et al. |
| 9,874,664 B2 | 1/2018 | Stevens et al. |
| 9,880,441 B1 | 1/2018 | Osterhout |
| 9,955,862 B2 | 5/2018 | Freeman et al. |
| 9,978,118 B1 | 5/2018 | Ozgumer et al. |
| 9,996,797 B1 | 6/2018 | Holz et al. |
| 10,018,844 B2 | 7/2018 | Levola et al. |
| 10,082,865 B1 | 9/2018 | Raynal et al. |
| 10,151,937 B2 | 12/2018 | Lewis |
| 10,185,147 B2 | 1/2019 | Lewis |
| 10,218,679 B1 | 2/2019 | Jawahar |
| 10,241,545 B1 | 3/2019 | Richards et al. |
| 10,317,680 B1 | 6/2019 | Richards et al. |
| 10,436,594 B2 | 10/2019 | Belt et al. |
| 10,516,853 B1 | 12/2019 | Gibson et al. |
| 10,551,879 B1 | 2/2020 | Richards et al. |
| 10,578,870 B2 | 3/2020 | Kimmel |
| 10,698,202 B2 | 6/2020 | Kimmel et al. |
| 10,856,107 B2 | 10/2020 | Mycek et al. |
| 10,825,424 B2 | 11/2020 | Zhang |
| 10,987,176 B2 | 4/2021 | Poltaretskyi et al. |
| 11,190,681 B1 | 11/2021 | Brook et al. |
| 11,209,656 B1 | 12/2021 | Choi et al. |
| 11,236,993 B1 | 2/2022 | Hall et al. |
| 2001/0010598 A1 | 8/2001 | Aritake et al. |
| 2002/0007463 A1 | 1/2002 | Fung |
| 2002/0108064 A1 | 2/2002 | Nunally |
| 2002/0063913 A1 | 5/2002 | Nakamura et al. |
| 2002/0071050 A1 | 6/2002 | Homberg |
| 2002/0122648 A1 | 9/2002 | Mule' et al. |
| 2002/0140848 A1 | 10/2002 | Cooper et al. |
| 2003/0028816 A1 | 2/2003 | Bacon |
| 2003/0048456 A1 | 3/2003 | Hill |
| 2003/0067685 A1 | 4/2003 | Niv |
| 2003/0077458 A1 | 4/2003 | Korenaga et al. |
| 2003/0115494 A1 | 6/2003 | Cervantes |
| 2003/0218614 A1 | 11/2003 | Lavelle et al. |
| 2003/0219992 A1 | 11/2003 | Schaper |
| 2003/0226047 A1 | 12/2003 | Park |
| 2004/0001533 A1 | 1/2004 | Tran et al. |
| 2004/0021600 A1 | 2/2004 | Wittenberg |
| 2004/0025069 A1 | 2/2004 | Gary et al. |
| 2004/0042377 A1 | 3/2004 | Nikoloai et al. |
| 2004/0073822 A1 | 4/2004 | Greco |
| 2004/0073825 A1 | 4/2004 | Itoh |
| 2004/0111248 A1 | 6/2004 | Granny et al. |
| 2004/0174496 A1 | 9/2004 | Ji et al. |
| 2004/0186902 A1 | 9/2004 | Stewart |
| 2004/0201857 A1 | 10/2004 | Foxlin |
| 2004/0238732 A1 | 12/2004 | State et al. |
| 2004/0240072 A1 | 12/2004 | Schindler et al. |
| 2004/0246391 A1 | 12/2004 | Travis |
| 2004/0268159 A1 | 12/2004 | Aasheim et al. |
| 2005/0001977 A1 | 1/2005 | Zelman |
| 2005/0034002 A1 | 2/2005 | Flautner |
| 2005/0157159 A1 | 7/2005 | Komiya et al. |
| 2005/0177385 A1 | 8/2005 | Hull |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0019723 A1 | 1/2006 | Vorenkamp |
| 2006/0038880 A1 | 2/2006 | Starkweather et al. |
| 2006/0050224 A1 | 3/2006 | Smith |
| 2006/0090092 A1 | 4/2006 | Verhulst |
| 2006/0126181 A1 | 6/2006 | Levola |
| 2006/0129852 A1 | 6/2006 | Bonola |
| 2006/0132914 A1 | 6/2006 | Weiss et al. |
| 2006/0179329 A1 | 8/2006 | Terechko |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0259621 A1 | 11/2006 | Ranganathan |
| 2006/0268220 A1 | 11/2006 | Hogan |
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0188837 A1 | 8/2007 | Shimizu et al. |
| 2007/0198886 A1 | 8/2007 | Saito |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0043334 A1 | 2/2008 | Itzkovitch et al. |
| 2008/0046773 A1 | 2/2008 | Ham |
| 2008/0063802 A1 | 3/2008 | Maula et al. |
| 2008/0068557 A1 | 3/2008 | Menduni et al. |
| 2008/0146942 A1 | 6/2008 | Dala-Krishna |
| 2008/0173036 A1 | 7/2008 | Williams |

(56) References Cited

U.S. PATENT DOCUMENTS

| | | |
|---|---|---|
| 2008/0177506 A1 | 7/2008 | Kim |
| 2008/0205838 A1 | 8/2008 | Crippa et al. |
| 2008/0215907 A1 | 9/2008 | Wilson |
| 2008/0225393 A1 | 9/2008 | Rinko |
| 2008/0316768 A1 | 12/2008 | Travis |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0310633 A1 | 12/2009 | Ikegami |
| 2010/0005326 A1 | 1/2010 | Archer |
| 2010/0019962 A1 | 1/2010 | Fujita |
| 2010/0056274 A1 | 3/2010 | Uusitalo et al. |
| 2010/0063854 A1 | 3/2010 | Purvis et al. |
| 2010/0079841 A1 | 4/2010 | Levola |
| 2010/0153934 A1 | 6/2010 | Lachner |
| 2010/0194632 A1 | 8/2010 | Raento et al. |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0296163 A1 | 11/2010 | Sarikko |
| 2011/0021263 A1* | 1/2011 | Anderson .......... G07F 17/3232 463/25 |
| 2011/0022870 A1 | 1/2011 | Mcgrane |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0011389 A1 | 1/2012 | Driesen |
| 2012/0050535 A1 | 3/2012 | Densham et al. |
| 2012/0075501 A1* | 3/2012 | Oyagi .................. A63F 13/213 348/231.99 |
| 2012/0081392 A1 | 4/2012 | Arthur |
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0307075 A1 | 12/2012 | Margalitq |
| 2012/0307362 A1 | 12/2012 | Silverstein et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050833 A1 | 2/2013 | Lewis et al. |
| 2013/0051730 A1 | 2/2013 | Travers et al. |
| 2013/0502058 | 2/2013 | Liu et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0169923 A1 | 7/2013 | Schnoll et al. |
| 2013/0205126 A1 | 8/2013 | Kruglick |
| 2013/0268257 A1 | 10/2013 | Hu |
| 2013/0278633 A1* | 10/2013 | Ahn ...................... G06T 19/006 345/633 |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1* | 12/2013 | Kinnebrew .......... G02B 27/017 345/619 |
| 2013/0342570 A1* | 12/2013 | Kinnebrew ............ G09G 3/003 345/633 |
| 2013/0342571 A1* | 12/2013 | Kinnebrew .......... G02B 27/017 345/633 |
| 2013/0343408 A1 | 12/2013 | Cook |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0340449 A1 | 11/2014 | Plagemann et al. |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0077312 A1 | 3/2015 | Wang |
| 2015/0097719 A1 | 4/2015 | Balachandreswaran et al. |
| 2015/0123966 A1 | 5/2015 | Newman |
| 2015/0130790 A1 | 5/2015 | Vazquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0027215 A1 | 1/2016 | Burns et al. |
| 2016/0033770 A1 | 2/2016 | Fujimaki et al. |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0093269 A1 | 3/2016 | Buckley et al. |
| 2016/0123745 A1 | 5/2016 | Cotier et al. |
| 2016/0155273 A1 | 6/2016 | Lyren et al. |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |
| 2017/0100664 A1 | 4/2017 | Osterhout et al. |
| 2017/0115487 A1 | 4/2017 | Travis |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0185261 A1 | 6/2017 | Perez et al. |
| 2017/0192239 A1 | 7/2017 | Nakamura et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0219841 A1 | 8/2017 | Popovich et al. |

(56) References Cited

U.S. PATENT DOCUMENTS

| | | |
|---|---|---|
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0270712 A1* | 9/2017 | Tyson ............... H04N 1/00161 |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0357332 A1 | 12/2017 | Balan et al. |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0044173 A1 | 2/2018 | Netzer |
| 2018/0052007 A1 | 2/2018 | Teskey et al. |
| 2018/0052501 A1 | 2/2018 | Jones, Jr. et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0088185 A1 | 3/2018 | Woods et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0131907 A1 | 5/2018 | Schmirier et al. |
| 2018/0136466 A1 | 5/2018 | Ko |
| 2018/0151796 A1 | 5/2018 | Akahane |
| 2018/0188115 A1 | 7/2018 | Hsu et al. |
| 2018/0189568 A1 | 7/2018 | Powderly et al. |
| 2018/0190017 A1 | 7/2018 | Mendez et al. |
| 2018/0191990 A1* | 7/2018 | Motoyama ............... A63F 13/80 |
| 2018/0250589 A1 | 9/2018 | Cossairt et al. |
| 2018/0284877 A1 | 10/2018 | Klein |
| 2018/0357472 A1 | 12/2018 | Dreessen |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0155439 A1 | 5/2019 | Mukherjee et al. |
| 2019/0158926 A1 | 5/2019 | Kang et al. |
| 2019/0167095 A1 | 6/2019 | Krueger |
| 2019/0172216 A1 | 6/2019 | Ninan et al. |
| 2019/0178654 A1 | 6/2019 | Hare |
| 2019/0196690 A1* | 6/2019 | Chong ............... A63F 13/335 |
| 2019/0219815 A1 | 7/2019 | Price et al. |
| 2019/0243123 A1 | 8/2019 | Bohn |
| 2019/0318540 A1* | 10/2019 | Piemonte ............... H04W 4/02 |
| 2019/0321728 A1* | 10/2019 | Imai ............... A63F 13/58 |
| 2019/0347853 A1 | 11/2019 | Chen et al. |
| 2019/0380792 A1 | 12/2019 | Poltaretskyi et al. |
| 2020/0098188 A1* | 3/2020 | Bar-Zeev ............... G02B 27/017 |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0202759 A1 | 6/2020 | Ukai et al. |
| 2020/0309944 A1 | 10/2020 | Thoresen et al. |
| 2020/0356161 A1* | 11/2020 | Wagner ............... A63B 69/125 |
| 2020/0368616 A1 | 11/2020 | Delamont |
| 2020/0409528 A1* | 12/2020 | Lee ............... G06N 3/02 |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0142582 A1* | 5/2021 | Jones ............... G02B 27/017 |
| 2021/0158627 A1* | 5/2021 | Cossairt ............... G06T 19/006 |
| 2021/0173480 A1 | 6/2021 | Osterhout et al. |

FOREIGN PATENT DOCUMENTS

| | | |
|---|---|---|
| EP | 0504930 A1 | 3/1992 |
| EP | 0535402 A1 | 4/1993 |
| EP | 0632360 A1 | 1/1995 |
| EP | 1215522 A2 | 6/2002 |
| EP | 1494110 A2 | 1/2005 |
| EP | 1938141 A1 | 7/2008 |
| EP | 1943556 A2 | 7/2008 |
| EP | 2290428 A2 | 3/2011 |
| EP | 2350774 A1 | 8/2011 |
| EP | 1237067 B1 | 1/2016 |
| EP | 3139245 A1 | 3/2017 |
| EP | 3164776 B1 | 5/2017 |
| EP | 3236211 A1 | 10/2017 |
| EP | 2723240 B1 | 8/2018 |
| EP | 2896986 B1 | 2/2021 |
| GB | 2499635 A | 8/2013 |
| GB | 2542853 A | 4/2017 |
| IN | 938/DEL/2004 A | 6/2006 |
| JP | 2002-529806 | 9/2002 |
| JP | 2003-029198 A | 1/2003 |
| JP | 2007-012530 A | 1/2007 |
| JP | 2008-257127 A | 10/2008 |
| JP | 2009-090689 A | 4/2009 |
| JP | 2009-244869 A | 10/2009 |
| JP | 2012-015774 A | 1/2012 |
| JP | 2013-525872 A1 | 6/2013 |
| JP | 2016-85463 A | 5/2016 |
| JP | 2016-516227 A | 6/2016 |
| JP | 6232763 B2 | 11/2017 |
| JP | 6333965 B2 | 5/2018 |
| KR | 2005-0010775 A | 1/2005 |
| KR | 10-1372623 B1 | 3/2014 |
| TW | 201219829 A | 5/2012 |
| TW | 201803289 A | 1/2018 |
| WO | 1991/000565 A2 | 1/1991 |
| WO | 2000/030368 A1 | 6/2000 |
| WO | 2002/071315 A2 | 9/2002 |
| WO | 2004095248 A | 11/2004 |
| WO | 2006132614 A1 | 12/2006 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2012030787 A2 | 3/2012 |
| WO | 2013/049012 A1 | 4/2013 |
| WO | 2013062701 A1 | 5/2013 |
| WO | 2015143641 A1 | 10/2015 |
| WO | 2016/054092 A1 | 4/2016 |
| WO | 2017004695 A1 | 1/2017 |
| WO | 2017044761 A1 | 3/2017 |
| WO | 2017120475 A1 | 7/2017 |
| WO | 2017/203201 A1 | 11/2017 |
| WO | 2018/044537 A1 | 3/2018 |
| WO | 2018087408 A1 | 5/2018 |
| WO | 2018097831 A1 | 5/2018 |
| WO | 2018166921 A1 | 9/2018 |
| WO | 2019148154 A1 | 8/2019 |
| WO | 2020010226 A1 | 1/2020 |

OTHER PUBLICATIONS

Examination Report dated Jun. 19, 2020, European Patent Application No. 20154750.2, (10 pages).
Extended European Search Report dated May 20, 2020, European Patent Application No. 20154070.5, (7 pages).
Extended European Search Report dated Jun. 12, 2017, European Patent Application No. 16207441.3, (8 pages).

(56) References Cited

OTHER PUBLICATIONS

Final Office Action dated Aug. 10, 2020, U.S. Appl. No. 16/225,961, (13 pages).
Final Office Action dated Dec. 4, 2019, U.S. Appl. No. 15/564,517, (15 pages).
Final Office Action dated Feb. 19, 2020, U.S. Appl. No. 15/552,897, (17 pages).
International Search Report and Written Opinion dated Mar. 12, 2020, International PCT Patent Application No. PCT/US19/67919, (14 pages).
International Search Report and Written Opinion dated Aug. 15, 2019, International PCT Patent Application No. PCT/US19/33987, (20 pages).
International Search Report and Written Opinion dated Jun. 15, 2020, International PCT Patent Application No. PCT/US2020/017023, (13 pages).
International Search Report and Written Opinion dated Oct. 16, 2019, International PCT Patent Application No. PCT/US19/43097, (10 pages).
International Search Report and Written Opinion dated Oct. 16, 2019, International PCT Patent Application No. PCT/US19/36275, (10 pages).
International Search Report and Written Opinion dated Oct. 16, 2019, International PCT Patent Application No. PCT/US19/43099, (9 pages).
International Search Report and Written Opinion dated Jun. 17, 2016, International PCT Patent Application No. PCT/FI2016/050172, (9 pages).
International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Sep. 30, 2019, International Patent Application No. PCT/US19/40324, (7 pages).
International Search Report and Written Opinion dated Sep. 4, 2020, International Patent Application No. PCT/US20/31036, (13 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees dated Aug. 15, 2019, International PCT Patent Application No. PCT/US19/36275, (2 pages).
Invitation to Pay Additional Fees dated Sep. 24, 2020, International Patent Application No. PCT/US2020/043596, (3 pages).
Invitation to Pay Additional Fees dated Oct. 22, 2019, International PCT Patent Application No. PCT/US19/47746, (2 pages).
Invitation to Pay Additional Fees dated Apr. 3, 2020, International Patent Application No. PCT/US20/17023, (2 pages).
Invitation to Pay Additional Fees dated Oct. 17, 2019, International PCT Patent Application No. PCT/US19/44953, (2 pages).
Non Final Office Action dated Aug. 21, 2019, U.S. Appl. No. 15/564,517, (14 pages).
Non Final Office Action dated Jul. 27, 2020, U.S. Appl. No. 16/435,933, (16 pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).
Non Final Office Action dated Nov. 19, 2019, U.S. Appl. No. 16/355,611, (31 pages).
Non Final Office Action dated Oct. 22, 2019, U.S. Appl. No. 15/859,277, (15 pages).
Non Final Office Action dated Sep. 1, 2020, U.S. Appl. No. 16/214,575, (40 pages).
Notice of Allowance dated Mar. 25, 2020, U.S. Appl. No. 15/564,517, (11 pages).
Notice of Allowance dated Oct. 5, 2020, U.S. Appl. No. 16/682,911, (27 pages).
Notice of Reason of Refusal dated Sep. 11, 2020 with English translation, Japanese Patent Application No. 2019-140435, (6 pages).
Summons to attend oral proceedings pursuant to Rule 115(1) EPC mailed on Jul. 15, 2019, European Patent Application No. 15162521.7, (7 pages).
Aarik, J. et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/50040-6090(97)00135-1; see entire document, (2 pages).
Azom, , "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?Article1D=1114>, (6 pages).
Goodfellow, , "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>, (9 pages).
Levola, T. , "Diffractive Optics for Virtual Reality Displays", Journal of the SID EURODISPLAY 14/05, 2005, XP008093627, chapters 2-3, Figures 2 and 10, pp. 467-475.
Levola, Tapani , "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Memon, F. et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017_00002.pdf> DOI: 10.1051/epjconf/201713900002, (8 pages).
Spencer, T. et al., "Decomposition of poly(propylene carbonate) with UV sensitive iodonium 11 salts", Polymer Degradation and Stability; (online]. Dec. 24, 2010 (retrieved Feb. 19, 2020]., <URL: http://fkohl.chbe.gatech.edu/sites/default/files/linked_files/publications/2011Decomposition%20of%20poly(propylene%20carbonate)%20with%20UV%20sensitive%20iodonium%20salts,pdf>; DOI: 10, 1016/j.polymdegradstab.2010, 12.003, (17 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020.

(56) References Cited

OTHER PUBLICATIONS (May 16, 2020) from <URL: https://dl.acm.org/doi/pdf/10.1145/581630.581668>, p. 238-246.
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
European Search Report dated Oct. 15, 2020, European Patent Application No. 20180623.9, (10 pages).
Extended European Search Report dated Jan. 22, 2021, European Patent Application No. 18890390.0, (11 pages).
Extended European Search Report dated Nov. 3, 2020, European Patent Application No. 18885707.2, (7 pages).
Extended European Search Report dated Nov. 4, 2020, European Patent Application No. 20190980.1, (14 pages).
Final Office Action dated Nov. 24, 2020, U.S. Appl. No. 16/435,933, (44 pages).
International Search Report and Written Opinion dated Dec. 3, 2020, International Patent Application No. PCT/US20/43596, (25 pages).
Non Final Office Action dated Jan. 26, 2021, U.S. Appl. No. 16/928,313, (33 pages).
Non Final Office Action dated Jan. 27, 2021, U.S. Appl. No. 16/225,961, (15 pages).
Non Final Office Action dated Nov. 5, 2020, U.S. Appl. No. 16/530,776, (45 pages).
"Phototourism Challenge", CVPR 2019 Image Matching Workshop. https://image matching-workshop, github.io., (16 pages).
Arandjelović, Relja et al., "Three things everyone should know to improve object retrieval", CVPR, 2012, (8 pages).
Azuma, Ronald T., "A Survey of Augmented Reality", Presence Teleoperators and Virtual Environments 6, 4 (Aug. 1997), 355-385 https://web.archive.org/web/20010604100006/http://www.cs.unc.edu/~azuma/ARpresence.pdf (downloaded Oct. 26, 2020).
Azuma, Ronald T., "Predictive Tracking for Augmented Reality", Department of Computer Science, Chapel Hill NC; TR95-007, Feb. 1995, 262 pages.
Battaglia, Peter W. et al., "Relational inductive biases, deep learning, and graph networks", arXiv:1806.01261, Oct. 17, 2018, pp. 1-40.
Berg, Alexander C. et al., "Shape matching and object recognition using low distortion correspondences", In CVPR, 2005, (8 pages).
Bian, Jiawang et al., "GMS: Grid-based motion statistics for fast, ultra-robust feature correspondence.", In CVPR (Conference on Computer Vision and Pattern Recognition), 2017, (10 pages).
Bimber, Oliver et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric et al., "Neural-Guided RANSAC: Learning Where to Sample Model Hypotheses", In ICCV (International Conference on Computer Vision), arXiv:1905.04132v2 [cs.CV] Jul. 31, 2019, (17 pages).
Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document, (8 pages).
Caetano, Tibério S. et al., "Learning graph matching", IEEE TPAMI, 31(6):1048-1058, 2009.
Cech, Jan et al., "Efficient sequential correspondence selection by cosegmentation", IEEE TPAMI, 32(9):1568-1581, Sep. 2010.
Cuturi, Marco, "Sinkhorn distances: Lightspeed computation of optimal transport", NIPS, 2013, (9 pages).
Dai, Angela et al., "ScanNet: Richly-annotated 3d reconstructions of indoor scenes", In CVPR, arXiv:1702.04405v2 [cs.CV] Apr. 11, 2017, (22 pages).
Deng, Haowen et al., "PPFnet: Global context aware local features for robust 3d point matching", In CVPR, arXiv:1802.02669v2 [cs.CV] Mar. 1, 2018, (12 pages).

Detone, Daniel et al., "Deep image homography estimation", In RSS Work-shop: Limits and Potentials of Deep Learning in Robotics, arXiv:1606.03798v1 [cs.CV] Jun. 13, 2016, (6 pages).
Detone, Daniel et al., "Self-improving visual odometry", arXiv:1812.03245, Dec. 8, 2018, (9 pages).
Detone, Daniel et al., "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai et al., "D2-net: A trainable CNN for joint detection and description of local features", CVPR, arXiv:1905.03561v1 [cs.CV] May 9, 2019, (16 pages).
Ebel, Patrick et al., "Beyond cartesian representations for local descriptors", ICCV, arXiv:1908.05547v1 [cs.CV] Aug. 15, 2019, (11 pages).
Fischler, Martin A et al., "Random sample consensus: a paradigm for model fitting with applications to image analysis and automated cartography", Communications of the ACM, 24(6): 1981, pp. 381-395.
Gilmer, Justin et al., "Neural message passing for quantum chemistry", In ICML, arXiv:1704.01212v2 [cs.LG] Jun. 12, 2017, (14 pages).
Hartley, Richard et al., "Multiple View Geometry in Computer Vision", Cambridge University Press, 2003, pp. 1-673.
Jacob, Robert J., "Eye Tracking in Advanced Interface Design", Human-Computer Interaction Lab, Naval Research Laboratory, Washington, D.C., date unknown. 2003, pp. 1-50.
Lee, Juho et al., "Set transformer: A frame-work for attention-based permutation-invariant neural networks", ICML, arXiv:1810.00825v3 [cs.LG] May 26, 2019, (17 pages).
Leordeanu, Marius et al., "A spectral technique for correspondence problems using pairwise constraints", Proceedings of (ICCV) International Conference on Computer Vision, vol. 2, pp. 1482-1489, Oct. 2005, (8 pages).
Li, Yujia et al., "Graph matching networks for learning the similarity of graph structured objects", ICML, arXiv:1904.12787v2 [cs.LG] May 12, 2019, (18 pages).
Li, Zhengqi et al., "Megadepth: Learning single-view depth prediction from internet photos", In CVPR, fromarXiv: 1804.00607v4 [cs.CV] Nov. 28, 2018, (10 pages).
Loiola, Eliane M. et al., "A survey for the quadratic assignment problem", European journal of operational research, 176(2): 2007, pp. 657-690.
Lowe, David G., "Distinctive image features from scale-invariant keypoints", International Journal of Computer Vision, 60(2): 91-110, 2004, (28 pages).
Luo, Zixin et al., "ContextDesc: Local descriptor augmentation with cross-modality context", CVPR, arXiv:1904.04084v1 [cs.CV] Apr. 8, 2019, (14 pages).
Munkres, James, "Algorithms for the assignment and transportation problems", Journal of the Society for Industrial and Applied Mathematics, 5(1): 1957, pp. 32-38.
Ono, Yuki et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam et al., "Automatic differentiation in Pytorch", 31st Conference on Neural Information Processing Systems (NIPS 2017), Long Beach, CA, USA, (4 pages).
Peyre, Gabriel et al., "Computational Optimal Transport", Foundations and Trends in Machine Learning, 11(5-6):355-607, 2019 arXiv:1803.00567v4 [stat.ML] Mar. 18, 2020, (209 pages).
Qi, Charles R. et al., "Pointnet++: Deep hierarchical feature learning on point sets in a metric space.", 31st Conference on Neural Information Processing Systems (NIPS 2017), Long Beach, CA, USA., (10 pages).
Qi, Charles R. et al., "Pointnet: Deep Learning on Point Sets for 3D Classification and Segmentation", CVPR, arXiv:1612.00593v2 [cs.CV] Apr. 10, 201, (19 pages).
Radenović, Filip et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul et al., "A comparative analysis of ransac techniques leading to adaptive real-time random sample consensus", Computer

(56) References Cited

OTHER PUBLICATIONS

Vision—ECCV 2008, 10th European Conference on Computer Vision, Marseille, France, Oct. 12-18, 2008, Proceedings, Part I, (15 pages).
Ranftl, René et al., "Deep fundamental matrix estimation", European Conference on Computer Vision (ECCV), 2018, (17 pages).
Revaud, Jerome et al., "R2D2: Repeatable and Reliable Detector and Descriptor", In NeurIPS, arXiv:1906.06195v2 [cs.CV] Jun. 17, 2019, (12 pages).
Rocco, Ignacio et al., "Neighbourhood Consensus Networks", 32nd Conference on Neural Information Processing Systems (NeurIPS 2018), Montreal, Canada, arXiv:1810.10510v2 [cs.CV] Nov. 29, 2018, (20 pages).
Rublee, Ethan et al., "ORB: An efficient alternative to SIFT or SURF", Proceedings of the IEEE International Conference on Computer Vision. 2564-2571. 2011; 10.1109/ICCV.2011.612654, (9 pages).
Sattler, Torsten et al., "SCRAMSAC: Improving RANSAC's efficiency with a spatial consistency filter", ICCV, 2009: 2090-2097., (8 pages).
Schonberger, Johannes L. et al., "Pixelwise view selection for unstructured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes L. et al., "Structure-from-motion revisited", Proceedings of the IEEE Conference on Computer Vision and Pattern Recognition (CVPR), 2016, pp. 4104-4113, (11 pages).
Sinkhorn, Richard et al., "Concerning nonnegative matrices and doubly stochastic matrices.", Pacific Journal of Mathematics, 1967, pp. 343-348.
Tanriverdi, Vildan et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne et al., "Wide baseline stereo matching based on local, affinely invariant regions", BMVC, 2000, pp. 1-14.
Ulyanov, Dmitry et al., "Instance normalization: The missing ingredient for fast stylization", arXiv:1607.08022v3 [cs.CV] Nov. 6, 2017, (6 pages).
Vaswani, Ashish et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar et al., "Graph attention networks", ICLR, arXiv:1710.10903v3 [stat.ML] Feb. 4, 2018, (12 pages).
Villani, Cédric , "Optimal transport: old and new", vol. 338. Springer Science & Business Media, Jun. 2008, pp. 1-998.
Wang, Xiaolong et al., "Non-local neural networks", CVPR, arXiv:1711.07971v3 [cs.CV] Apr. 13, 2018, (10 pages).
Wang, Yue et al., "Deep Closest Point: Learning representations for point cloud registration", ICCV, arXiv:1905.03304v1 [cs.CV] May 8, 2019, (10 pages).
Wang, Yue et al., "Dynamic Graph CNN for learning on point clouds", ACM Transactions on Graphics, arXiv:1801.07829v2 [cs.CV] Jun. 11, 2019, (13 pages).
Yi, Kwang M. et al., "Learning to find good correspondences", CVPR, arXiv:1711.05971v2 [cs.CV] May 21, 2018, (13 pages).
Yi, Kwang Moo et al., "Lift: Learned invariant feature transform", ECCV, arXiv:1603.09114v2 [cs.CV] Jul. 29, 2016, (16 pages).
Zaheer, Manzil et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui et al., "Learning two-view correspondences and geometry using order-aware network", ICCV; aarXiv:1908.04964v1 [cs.CV] Aug. 14, 2019, (11 pages).
Zhang, Li et al., "Dual graph convolutional net-work for semantic segmentation", BMVC, 2019; arXiv:1909.06121v3 [cs.CV] Aug. 26, 2020, (18 pages).
Communication Pursuant to Article 94(3) EPC dated Oct. 21, 2021, European Patent Application No. 16207441.3 , (4 pages).
Communication Pursuant to Rule 164(1) EPC dated Jul. 27, 2021, European Patent Application No. 19833664.6 , (11 pages).
Extended European Search Report dated Jun. 30, 2021, European Patent Application No. 19811971.1 , (9 pages).
Extended European Search Report dated Mar. 4, 2021, European Patent Application No. 19768418.6 , (9 pages).
Extended European Search Report dated Jul. 16, 2021, European Patent Application No. 19810142.0 , (14 pages).
Extended European Search Report dated Jul. 30, 2021, European Patent Application No. 19839970.1 , (7 pages).
Extended European Search Report dated Oct. 27, 2021, European Patent Application No. 19833664.6 , (10 pages).
Extended European Search Report dated Sep. 20, 2021, European Patent Application No. 19851373.1 , (8 pages).
Extended European Search Report dated Sep. 28, 2021, European Patent Application No. 19845418.3 , (13 pages).
Final Office Action dated Jun. 15, 2021, U.S. Appl. No. 16/928,313 , (42 pages).
Final Office Action dated Mar. 1, 2021, U.S. Appl. No. 16/214,575 , (29 pages).
Final Office Action dated Mar. 19, 2021, U.S. Appl. No. 16/530,776 , (25 pages).
International Search Report and Written Opinion dated Feb. 2, 2021, International PCT Patent Application No. PCT/US20/60550 , (9 pages).
Non Final Office Action dated Aug. 4, 2021, U.S. Appl. No. 16/864,721 , (51 pages).
Non Final Office Action dated Jul. 9, 2021, U.S. Appl. No. 17/002,663 , (43 pages).
Non Final Office Action dated Jul. 9, 2021, U.S. Appl. No. 16/833,093 , (47 pages).
Non Final Office Action dated Jun. 29, 2021, U.S. Appl. No. 16/698,588 , (58 pages).
Non Final Office Action dated Mar. 3, 2021, U.S. Appl. No. 16/427,337, (41 pages).
Non Final Office Action dated May 26, 2021, U.S. Appl. No. 16/214,575 , (19 pages).
Non Final Office Action dated Sep. 20, 2021, U.S. Appl. No. 17/105,848 , (56 pages).
Non Final Office Action dated Sep. 29, 2021, U.S. Appl. No. 16/748,193 , (62 pages).
Altwaijry , et al. , "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract.
Giuseppe, Donato , et al. , "Stereoscopic helmet mounted system for real time 3D environment reconstruction and indoor ego-motion estimation", Proc. SPIE 6955, Head- and Helmet-Mounted Displays XIII: Design and Applications , 69550P, May 1, 2008.
Lee , et al. , "Self-Attention Graph Pooling", Cornell University Library/Computer Science/Machine Learning, Apr. 17, 2019 [retrieved on Jan. 8, 2021 from the Internet< URL: https://arxiv.org/abs/1904.08082 >, entire document.
Libovicky , et al. , "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.
Molchanov, Pavlo , et al. , "Short-range FMCW monopulse radar for hand-gesture sensing", 2015 IEEE Radar Conference (RadarCon) (2015) , pp. 1491-1496.
Sarlin , et al. , "SuperGlue: Learning Feature Matching with Graph Neural Networks", Cornell University Library/Computer Science/

(56) References Cited

OTHER PUBLICATIONS

Computer Vision and Pattern Recognition, Nov. 26, 2019 [retrieved on Jan. 8, 2021 from the Internet< URL: https://arxiv.org/abs/1911.11763 >, entire document.
Sheng, Liu , et al. , "Time-multiplexed dual-focal plane head-mounted display with a liquid lens", Optics Letters, Optical Society of Amer I CA, US, vol. 34, No. 11, Jun. 1, 2009 (Jun. 1, 2009), XP001524475, ISSN: 0146-9592 , pp. 1642-1644.
Communication according to Rule 164(1) EPC dated Feb. 23, 2022, European Patent Application No. 20753144.3, (11 pages).
Extended European Search Report dated Jan. 28, 2022, European Patent Application No. 19815876.8, (9 pages).
Final Office Action dated Feb. 23, 2022, U.S. Appl. No. 16/748,193, (23 pages).
Final Office Action dated Feb. 3, 2022, U.S. Appl. No. 16/864,721, (36 pages).
Non Final Office Action dated Feb. 2, 2022, U.S. Appl. No. 16/783,866, (8 pages).
Communication Pursuant to Article 94(3) EPC dated Jan. 4, 2022, European Patent Application No. 20154070.5 , (8 pages).
Extended European Search Report dated Jan. 4, 2022, European Patent Application No. 19815085.6 , (9 pages).
International Search Report and Written Opinion dated Feb. 12, 2021, International Application No. PCT/US20/60555 , (25 pages).
"Multi-core processor", TechTarget, 2013 , (1 page).
Mrad , et al. , "A framework for System Level Low Power Design Space Exploration", 1991.
"Communication Pursuant to Article 94(3) EPC dated Apr. 25, 2022", European Patent Application No. 18885707.2, (5 pages).
"Extended European Search Report dated Mar. 22, 2022", European Patent Application No. 19843487.0, (14 pages).
"First Office Action dated Mar. 14, 2022 with English translation", Chinese Patent Application No. 201880079474.6, (11 pages).
"Non Final Office Action dated Apr. 1, 2022", U.S. Appl. No. 17/256,961, (65 pages).
"Non Final Office Action dated Apr. 12, 2022", U.S. Appl. No. 17/262,991, (60 pages).
"Non Final Office Action dated Mar. 31, 2022", U.S. Appl. No. 17/257,814, (60 pages).
"Non Final Office Action dated Mar. 9, 2022", U.S. Appl. No. 16/870,676, (57 pages).
"Non Final Office Action dated May 10, 2022", U.S. Appl. No. 17/140,921, (25 pages).
"Extended European Search Report dated Aug. 24, 2022", European Patent Application No. 20846338.0, (13 pages).
"Extended European Search Report dated Aug. 8, 2022", European Patent Application No. 19898874.3, (8 pages).
"Extended European Search Report dated Sep. 8, 2022", European Patent Application No. 20798769.4, (13 pages).
"First Examination Report dated Jul. 27, 2022", Chinese Patent Application No. 201980036675.2, (5 pages).
"First Examination Report dated Jul. 28, 2022", Indian Patent Application No. 202047024232, (6 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GP P%5FSYNC/SA4/Docs/S4%2DI90526%2Ezip [retrieved on Apr. 12, 2019], Apr. 12, 2019, (98 pages).
"Non Final Office Action dated Sep. 19, 2022", U.S. Appl. No. 17/263,001, (14 pages).
"Second Office Action dated Jul. 13, 2022 with English Translation", Chinese Patent Application No. 201880079474.6, (10 pages).
Anonymous , "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022], (2 pages).
Chittineni, C., et al., "Single filters for combined image geometric manipulation and enhancement", Proceedings of SPIE vol. 1903, Image and Video Processing, Apr. 8, 1993, San Jose, CA. (Year: 1993), pp. 111-121.
"Communication Pursuant to Article 94(3) EPC dated May 30, 2022", European Patent Application No. 19768418.6, (6 pages).
"Extended European Search Report dated May 16, 2022", European Patent Application No. 19871001.4, (9 pages.
"Extended European Search Report dated May 30, 2022", European Patent Application No. 20753144.3, (10 pages).
"Final Office Action dated Jul. 13, 2022", U.S. Appl. No. 17/262,991, (18 pages).
"First Examination Report dated May 13, 2022", Indian Patent Application No. 202047026359, (8 pages).
"Non Final Office Action dated Jul. 26, 2022", U.S. Appl. No. 17/098,059, (28 pages).
"Non Final Office Action dated May 17, 2022", U.S. Appl. No. 16/748,193, (11 pages).

\* cited by examiner

Rig & Anim challenges unique to Mixed Reality

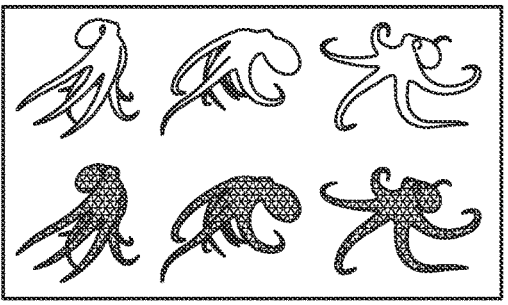
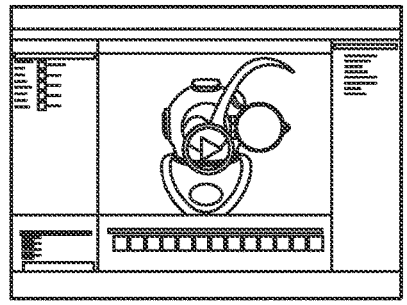

- Animations needed sharper, snappier turns and Yaw/Pitch changes based on the pathfinding capsule
- Had to account for in-place rotations of the root "pathfinding" capsule
- Unlike ground-based AI characters, fish require many more corrective animations for various states, depending on orientation
- Behaviours dictate animation as opposed to targeted or reactive movement

FIG. 13

Procedural Placement of Virtual Content in the Real World

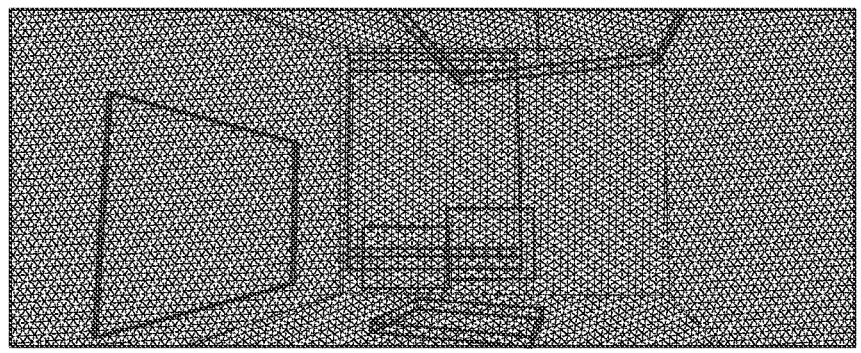

- Randomized, Procedural, placement of content in the players world was one of the primary design directives for Undersea
- Make content of different sizes fit properly so they look like they belong in the room
- Aesthetically pleasing arrangement of content
- We wanted the potential for the room layout to be different every time the application is played

FIG. 19

Procedural Placement of Virtual Content in the Real World
Finding Best Location for a Vista

- Use the Magic Leap Meshing and Planes APIs to capture the players space as a static mesh and collection of vertical and horizontal planes
- Find suitable plane to place to put a Vista
  - Filter all planes by height from floor, dimensions, orientation, and location relative to the room mesh
  - Spawn the Vista Blueprint which includes the portal frame and all the content in the vista at the selection location.
  - "Cut" hole in the World Mesh occlusion material so player can see thru the Portal into the Vista

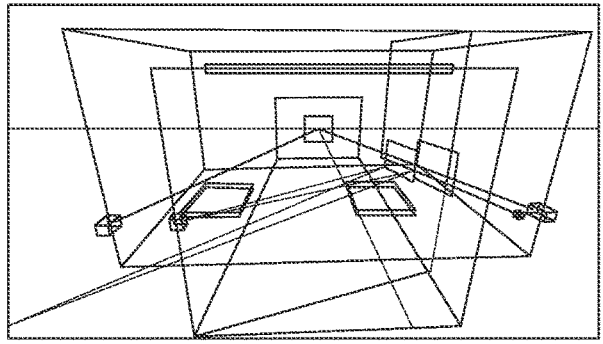

Debug Visualization of Vista Placement Tests

FIG. 20

Procedural Placement of Virtual Content in the Real World
Find Best Location to put Coral Clusters

- Determine a bounding volume aligned to the placed Vista that fits within the dimensions of meshed space
- Do LineTrace at random points within the volume from max height to the floor.
- If hit valid location on mesh:
  - Do BoxTrace to test if a random cluster will fit without overlapping world mesh. Try different scales, and rotation then score placement
  - Repeat until find enough suitable locations
  - Spawn Coral Cluster in highest scoring locations

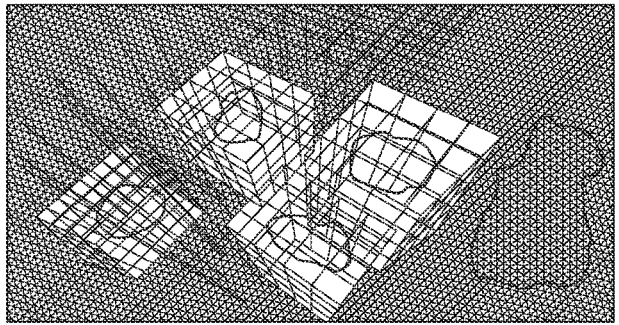

Debug Visualization of Cluster Placement Tests

*FIG. 21*

Custom AI System

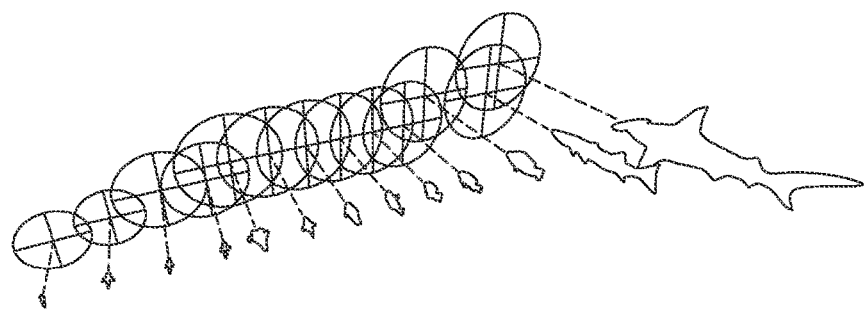

- How to make AI creatures that can navigate around the meshed space, as well as exhibit interesting and believable behaviors with the virtual content, each other, and the user

*FIG. 22A*

AI Root Behavior Tree

- Use Unreal Engine Behavior Trees
  - Controls our Decision Making layer
  - We tried to minimize adding complex flows to behavior tree and are handling complex execution flows within custom c++ tasks. This allowed us to keep simple, easily maintainable, and debuggable behavior trees.
  - Behavior trees are dynamically constructed through dynamic injection based on the creature type so each creature will only use a behavior tree if it supports a specific behavior
  - Has useful flow visualization which helps us to lock on to an agent and debug the behavior tree flow isolating to a single agent.

*FIG. 22B*

How to complete all the tech work with a very small
(2 person engineering team)

- Art Team members had expert knowledge of UE4 and were self sufficient regarding most tooling and workflows. Engineering team did not have to make any significant Art or Design tools.
- Tech Artists were able to leverage Blueprints to implement the UI, VFX, Lighting system, and to assemble content, allowing engineers to focus on areas that needed to be very performant like AI, world reconstruction, and content placement.
- Created gameplay and AI base classes in C++ that were overridden in Blueprints to ensure consistent interfaces and interchangeable functionality.
- Leverage access to a Build Engineer to develop automated build system, source control automation, automated device software update.
- Implemented naming and coding standards for C++ and Blueprints to enforce consistency and allow the entire team to know what, where, and why of an asset by just looking and the name -- saved a lot of time
  - Developing coding standards for Blueprints are hard :-( Everyone has their style, but I suggest coming up with a shared style and sticking with it. It will make understanding other developers work Soooo much easier and will also help when you maintain or go back to your own old work.

*FIG. 26*

| | Front | Side | Back | Side | Top | Bottom |
|---|---|---|---|---|---|---|
| EV_RockBase05 Based on (LargeRockA_Mesh) | | | | | | |
| EV_RockBase06 Based on (FlatRockA_Mesh) | | | | | | |
| EV_RockBase07 Based on (FlatRockB_Mesh) | | | | | | |
| EV_RockBase08 Based on (MediumRockA_Mesh) | | | | | | |

148

| | |
|---|---|
| 200 | SET OF DATA INCLUDING VIRTUAL OBJECTS |
| 202 | DISPLAY MODULE |
| 204 | DATA STREAM GENERATOR |
| 206 | LIGHT GENERATOR |
| 208 | A POSITION ADJUSTMENT MODULE |
| 210 | NOMADIC SUBROUTINE |
| 212 | WAVE MOVEMENT ROUTINE |
| 214 | RETRIEVAL AGENT |
| 216 | TRANSMISSION AGENT |
| 218 | ARTIFICIAL INTELLIGENCE SYSTEM |
| 220 | GAZE DIRECTION MOVEMENT ROUTINE |
| 222 | PERSONAL ASSISTANT MODULE |
| 224 | MOVEMENT MODULE |
| 226 | SURFACE EXTRACTION ROUTINE |
| 228 | DEPTH CREATION MODULE |
| 230 | VISTA PLACEMENT ROUTINE |
| 232 | VERTEX ANIMATION ROUTINE |
| 234 | CORAL CLUSTER SPAWNER |

*FIG. 32*

SYSTEMS AND METHODS FOR AUGMENTED REALITY

CROSS-REFERENCE TO RELATED APPLICATIONS

This application claims priority from U.S. Provisional Patent Application No. 62/879,408, filed on Jul. 26, 2019, U.S. Provisional Patent Application No. 62/881,355, filed on Jul. 31, 2019 and U.S. Provisional Patent Application No. 62/899,678, filed on Sep. 12, 2019, all of which are incorporated herein by reference in their entirety.

BACKGROUND OF THE INVENTION

1). Field of the Invention

This invention relates to an augmented reality viewer and an augmented reality visualization method.

2). Discussion of Related Art

Modern computing technology has advanced to the level of compact and persistently connected wearable computing systems and assemblies that may be utilized to provide a user with the perception of rich augmented reality experiences.

An augmented reality viewer usually has multiple sensors, including cameras positioned to sense a location real-world objects. A storage device holds a set of data including a virtual object. A display module on the storage device is executable by a processor to determine a desired display of the virtual object relative to the location the real-world objects. A data stream generator on the storage device is executable by the processor to generate a data stream based on the data and the desired display. A light generator, such as a laser light generator, is connected to the processor to receive the data stream and generate light based on the data stream. A display device is positioned to receive the light that is generated and to display the light to a user. The light creates a rendering of the virtual object visible to the user and rendered in accordance with the desired display.

SUMMARY OF THE INVENTION

The invention provides an augmented reality viewer including at least one sensor positioned to sense a location of at least one of a plurality of real-world objects, a storage device, a set of data on the storage device including a virtual object, a processor connected to the storage device, a display module on the storage device and executable by the processor to determine a desired display of the virtual object relative to the location of at least one of the real-world objects, a data stream generator on the storage device and executable by the processor to generate a data stream based on the data and the desired display, a light generator connected to the processor to receive the data stream and generate light based on the data stream, and a display device positioned to receive the light that is generated and to display the light to a user, wherein the light creates a rendering of the virtual object visible to the user and rendered in accordance with the desired display.

The augmented reality viewer may further include that the virtual object is a nomadic life object, further include a nomadic subroutine on the storage device and executable by the processor to move the nomadic life object relative to the real-world objects.

The augmented reality viewer may further include that the data includes a plurality of nomadic life objects, wherein the nomadic subroutine is executable by the processor to move the plurality of nomadic life objects relative to the real-world objects and relative to one another.

The augmented reality viewer may further include that the at least one sensor senses a wave movement initiated by the user, further including a wave movement routine on the storage device and executable by the processor to move the nomadic life object in response to the wave movement that is sensed by the at least one sensor.

The augmented reality viewer may further include that the wave movement is initiated in a target zone and the nomadic object is moved out of the target zone.

The augmented reality viewer may further include that the at least one sensor sensing the wave movement is a camera that detects an image of a hand of the user.

The augmented reality viewer may further include a handheld controller, wherein the sensor is mounted to a handheld controller that is held in a hand of the user.

The augmented reality viewer may further include a retrieval agent on the storage device and executable with the processor to retrieve incoming information from a resource, associate the incoming information with a location of the nomadic life object relative to the real-world objects, and communicate the incoming information to the user from the location of the nomadic life object.

The augmented reality viewer may further include that the retrieval agent activates the light source to display the incoming information through the display.

The augmented reality viewer may further include a speaker, wherein the retrieval agent activates the speaker so that the user hears the incoming information.

The augmented reality viewer may further include a transmission agent on the storage device and executable with the processor to sense, with the at least one sensor, an instruction by the user, sense, with the at least one sensor, that the instruction is directed by the user to the nomadic life object at a location of the nomadic life object relative to the real-world objects, determine, based on the instruction, an outgoing communication and a resource, and communicate the outgoing communication to the resource.

The augmented reality viewer may further include that the at least one sensor that senses the communication is a microphone suitable to receive a voice instruction from the user.

The augmented reality viewer may further include a transmission agent on the storage device and executable with the processor to sense, with the at least one sensor, an instruction by the user, sense, with the at least one sensor, that the instruction is directed by the user to the nomadic life object at a location of the nomadic life object relative to the real-world objects, determine, based on the instruction, an outgoing communication and an IOT device, and communicate the outgoing communication to the IOT device to operate the IOT device.

The augmented reality viewer may further include that the at least one sensor that senses the communication is a microphone suitable to receive a voice instruction from the user.

The augmented reality viewer may further include an artificial intelligence system on the storage device and executable with the processor to sense an action by the user using the at least one sensor, perform a routine involving the virtual object that is responsive to the action of the user, associate the routine with the action as an artificial intelligence cluster, determine a parameter that exists at a first time when the action is sensed, associate the parameter that exists at the first time with the artificial intelligence cluster, sense a parameter at a second time, determine whether the parameter at the second time is the same as the parameter at the first time, and if the determination is made that the parameter at the second time is the same as the parameter at the first time then executing the routine.

The augmented reality viewer may further include that the at least one sensor includes an eye tracking camera, wherein the action is a wave motion initiated by the user and the parameters are a gaze direction as determined by eye tracking of the user using the eye tracking camera.

The augmented reality viewer may further include that the action is a wave movement initiated in a target zone and the nomadic object is moved out of the target zone.

The augmented reality viewer may further include that the at least one sensor includes an eye tracking camera positioned to sense a gaze direction of the user, further including a gaze direction movement routine on the storage device and executable by the processor to move the nomadic life object in response to the gaze direction that is sensed by the eye tracking camera.

The augmented reality viewer may further include that there are a plurality of nomadic life objects and the nomadic subroutine is executable by the processor to move the plurality of nomadic life object relative to the real-world objects, further including a personal assistant module on the storage device and executable with the processor to select a personal assistant nomadic life object among the plurality of nomadic life objects, and move at least one of the nomadic life objects other than the personal assistant nomadic life objects with the personal assistant nomadic life object.

The augmented reality viewer may further include that the nomadic life object is a fish of a first type, further including a movement module on the storage device and executable with the processor to articulate a body of the fish in a first back-and-forth manner.

The augmented reality viewer may further include that the movement module is executable with the processor to articulate a body of a fish of a second type in a second back-and-forth manner that is different from the first back-and-forth manner.

The augmented reality viewer may further include that the movement module is executable with the processor to sense, with the at least one sensor, a slow hand movement of a hand of the user, articulate the body of the fish in the first back-and-forth manner at a low speed in response to the slow speed of the hand movement, sense, with the at least one sensor, a fast hand movement of the hand of the user, and articulate the body of the fish in the first back-and-forth manner at a high speed in response to the fast speed of the hand movement.

The augmented reality viewer may further include that the movement module is executable with the processor to move the first fish to stay close to the hand when the hand moves at the slow speed, and move the first fish to flee the hand when the hand moves at the fast speed.

The augmented reality viewer may further include a surface extraction routine on the storage device and executable with the processor to identify a surface among the real-world objects.

The augmented reality viewer may further include that the surface is a two-dimensional surface of a wall or a ceiling.

The augmented reality viewer may further include a depth creation module on the storage device and executable with the processor according to the desired display, display, in three-dimensional space, the virtual object to the user on a side of the opposing the user and with the surface between the user and the virtual object.

The augmented reality viewer may further include that the depth creation module is executable with the processor to display a porthole in the surface to the user through which the virtual object is visible to the user.

The augmented reality viewer may further include that the virtual object is a three-dimensional virtual object.

The augmented reality viewer of may further include a vista placement routine on the storage device and executable with the processor to capture a space that includes the real-world objects, represent the space as a real-world mesh, collect vertical and horizontal planes from the real-world mesh, filter the planes by height from a floor, dimensions, orientation, and location relative to the real-world mesh, spawn a blueprint which includes a portal frame and all the content in the vista at the selection location, and cut a hole in an occlusion material of the real-world mesh material so the user can see through the portal into the vista.

The augmented reality viewer may further include a vertex animation routine on the storage device and executable with the processor to store a virtual object mesh representing the virtual object, associate a texture with the virtual object mesh, and manipulate the virtual object mesh to cause movement of the texture and the virtual object in a view of the user.

The augmented reality viewer may further include that the virtual object mesh is manipulated to articulate the virtual object.

The augmented reality viewer may further include that the same virtual object mesh is used multiple times to cause movement of the texture and the virtual object.

The augmented reality viewer may further include that the virtual object is a coral cluster.

The augmented reality viewer may further include a coral cluster spawner on the storage device and executable with the processor to determine a volume, perform a line trace at random points within the volume from a maximum height of the volume to a floor of the volume, determine whether a valid location is identified by the line trace, if a valid location is identified then, in response to the identification, perform a box trace to test if a random cluster will fit without overlapping a world mesh while attempting different scales and rotations and generating a score for each placement, determine a select placement with a highest score among scores, and spawn the coral cluster to the placement with the highest score.

The augmented reality viewer may further include a vista placement routine on the storage device and executable with the processor to place a vista, wherein the volume is bound by the vista.

The augmented reality viewer may further include a coral spawner system on the storage device and executable with the processor to store at least a first coral element of a first type on the storage device, and construct the coral cluster from a plurality of coral elements including the first coral element.

The augmented reality viewer may further include that the coral spawner system is executable with the processor to construct the coral cluster from a plurality of first coral elements.

The augmented reality viewer may further include that the coral spawner system is executable with the processor to store at least a second coral element of a second type on the storage device, wherein the plurality of coral elements includes the second coral element.

The augmented reality viewer may further include that the coral spawner system is executable with the processor to determining a coral cluster setting, wherein the processor constructs the coral cluster according to the setting.

The augmented reality viewer may further include that the setting is available space that is detected, and a number of the coral elements is selected based on the available space.

The augmented reality viewer may further include that the coral spawner system is executable with the processor to simulate ambient light, wherein the setting is the ambient light, wherein a number of coral elements is selected based on the ambient light, wherein orientations of the coral elements are selected based on the ambient light.

The augmented reality viewer may further include that the coral spawner system includes a data table on the storage device with a plurality of coral cluster settings, wherein the coral spawner system constructs the coral cluster according to the plurality of coral cluster settings.

The augmented reality viewer may further include that the coral cluster settings include at least one of population, species max counts, spawn type, and height-based percentages.

The augmented reality viewer may further include that the coral spawner system includes a vertex crawling and raycast algorithm to check for placement viability, growth, and caching of valid points to file.

The augmented reality viewer may further include that the coral spawner system includes a run-time coral static mesh loop that first calculates a shadow pass and then creates instanced static meshes of all corals clusters.

The augmented reality viewer may further include that the coral spawner system includes collision-based exclusion configuration to place box colliders where certain species should not grow.

The augmented reality viewer may further include that the display device displays the light that is generated to a user while the views at least one of the real-world objects.

The augmented reality viewer may further include that the display device is a see-through display device that allows light from the at least one real-world objects to reach an eye of the user.

The augmented reality viewer may further include a head-worn structure shaped to be worn on a head of the user, wherein the display device is mounted to the head-worn structure and the at least one sensor is of a kind that is suitable to sense movement of the display device due to movement of a head of the user, and a position adjustment module, executable by the processor, to adjust a location of the virtual object so that, within a view of the user, the virtual object remains stationary relative to the at least one real-world object.

The invention also provides an augmented reality visualization method including sensing, with at least one sensor, a location of at least one of a plurality of real-world objects, storing, on a storage device, data including a virtual object, determining, with a processor, a desired display of the virtual object relative to the location of at least one of the real-world objects, generating, by the processor, a data stream based on the data and the desired display, generating, with a light generator, light based on the data stream, and displaying, with a display device, the light that is generated to a user, wherein the light creates a rendering of the virtual object visible to the user and rendered in accordance with the desired display.

The method may further include that the virtual object is a nomadic life object, further including moving, with the processor, the nomadic life object relative to the real-world objects.

The method may further include that the data includes a plurality of nomadic life objects, further including moving, with the processor, the plurality of nomadic life objects relative to the real-world objects and relative to one another.

The method may further include sensing, by the at least one sensor, a wave movement initiated by the user, and moving, by the processor, the nomadic life object in response to the wave movement that is sensed by the at least one sensor.

The method may further include that the wave movement is initiated in a target zone and the nomadic object is moved out of the target zone.

The method may further include that the at least one sensor sensing the wave movement is a camera that detects an image of a hand of the user.

The method may further include that the sensor is mounted to a handheld controller that is held in a hand of the user.

The method may further include retrieving, with the processor, incoming information from a resource, associating, with the processor, the incoming information with a location of the nomadic life object relative to the real-world objects, and communicating, with the processor, the incoming information to the user from the location of the nomadic life object.

The method may further include that the incoming information is displayed to the user.

The method may further include that the user hears the incoming information.

The method may further include sensing, with the at least one sensor, an instruction by the user, sensing, with the at least one sensor, that the instruction is directed by the user to the nomadic life object at a location of the nomadic life object relative to the real-world objects, determining, with the processor, based on the instruction, an outgoing communication and a resource, and communicating, with the processor, the outgoing communication to the resource.

The method may further include that the user speaks the instruction.

The method of may further include sensing, with the at least one sensor, an instruction by the user, sensing, with the at least one sensor, that the instruction is directed by the user to the nomadic life object at a location of the nomadic life object relative to the real-world objects, determining, with the processor, based on the instruction, an outgoing communication and an IOT device, and communicating, with the processor, the outgoing communication to the IOT device to operate the IOT device.

The method may further include that the user speaks the instruction.

The method may further include sensing, with the at least one sensor, an action by the user, performing, with the processor, a routine involving the virtual object that is responsive to the action of the user, associating, with the processor, the routine with the action as an artificial intelligence cluster, determining, with the at least one processor, a parameter that exists at a first time when the action is sensed, associating, with the processor, the parameter that exists at the first time with the artificial intelligence cluster, sensing, with the at least one sensor, a parameter at a second time, determining, with the processor, whether the parameter at the second time is the same as the parameter at the first time, and if the determination is made that the parameter at the second time is the same as the parameter at the first time then executing the routine.

The method may further include that the action is a wave motion initiated by the user and the parameters are a gaze direction of the user.

The method may further include that the action is a wave movement initiated in a target zone and the nomadic object is moved out of the target zone.

The method may further include sensing, by the at least one sensor, a gaze direction of the user, and moving, by the processor, the nomadic life object in response to the gaze direction.

The method of may further include moving, with the processor, a plurality of nomadic life object relative to the real-world objects, selecting, with the processor, a personal assistant nomadic life object among the plurality of nomadic life objects, and moving, with the processor, at least one of the nomadic life objects other than the personal assistant nomadic life objects with the personal assistant nomadic life object.

The method may further include that the nomadic life object is a fish of a first type, further including articulating, with the processor, a body of the fish in a first back-and-forth manner.

The method may further include articulating, with the processor, a body of a fish of a second type in a second back-and-forth manner that is different from the first back-and-forth manner.

The method may further include sensing, with the at least one sensor, a slow hand movement of a hand of the user, and articulating, with the processor, the body of the fish in the first back-and-forth manner at a low speed in response to the slow speed of the hand movement, sensing, with the at least one sensor, a fast hand movement of the hand of the user, and articulating, with the processor, the body of the fish in the first back-and-forth manner at a high speed in response to the fast speed of the hand movement.

The method may further include moving, with the processor, the first fish to stay close to the hand when the hand moves at the slow speed, and moving, with the processor, the first fish to flee the hand when the hand moves at the fast speed.

The method may further include identifying, with the processor, a surface among the real-world objects.

The method may further include that the surface is a two-dimensional surface of a wall or a ceiling.

The method may further include that the processor, according to the desired display, displays, in three-dimensional space, the virtual object to the user on a side of the surface opposing the user and with the surface between the user and the virtual object.

The method may further include that the processor displays a porthole in the surface to the user through which the virtual object is visible to the user.

The method may further include that the virtual object is a three-dimensional virtual object.

The method may further include capturing, with the processor, a space that includes the real-world objects, representing, with the processor, the space as a real-world mesh, collecting, with the processor, vertical and horizontal planes from the real-world mesh, filtering, with the processor, the planes by height from a floor, dimensions, orientation, and location relative to the real-world mesh, spawning, with the processor, a blueprint which includes a portal frame and all the content in the vista at the selection location, and cutting, with the processor, a hole in an occlusion material of the real-world mesh material so the user can see through the portal into the vista.

The method may further include storing, with the processor, a virtual object mesh representing the virtual object, associating, with the processor, a texture with the virtual object mesh, and manipulating, with the processor, the virtual object mesh to cause movement of the texture and the virtual object in a view of the user.

The method may further include that the virtual object mesh is manipulated to articulate the virtual object.

The method may further include that the same virtual object mesh is used multiple times to cause movement of the texture and the virtual object.

The method may further include that the virtual object is a coral cluster.

The method may further include placing, with the processor, the coral cluster including determining a volume, performing a line trace at random points within the volume from a maximum height of the volume to a floor of the volume, determining whether a valid location is identified by the line trace, if a valid location is identified then, in response to the identification, performing a box trace to test if a random cluster will fit without overlapping a world mesh while attempting different scales and rotations and generating a score for each placement, determining a select placement with a highest score among scores, and spawning the coral cluster to the placement with the highest score.

The method may further include placing a vista, wherein the volume is bound by the vista.

The method may further include storing at least a first coral element of a first type on the storage device, and constructing, with the processor, the coral cluster from a plurality of coral elements including the first coral element.

The method may further include that the processor constructs the coral cluster from a plurality of first coral elements.

The method may further include storing at least a second coral element of a second type on the storage device, wherein the plurality of coral elements include the second coral element.

The method may further include determining, with the processor, a coral cluster setting, wherein the processor constructs the coral cluster according to the setting.

The method of may further include that the setting is available space that is detected, and a number of the coral elements is selected based on the available space.

The method may further include simulating, with the processor, ambient light, wherein the setting is the ambient light, wherein a number of coral elements is selected based on the ambient light, and wherein orientations of the coral elements are selected based on the ambient light.

The method may further include storing a data table on the storage device with a plurality of coral cluster settings, wherein the processor constructs the coral cluster according to the plurality of coral cluster settings.

The method of may further include that the coral cluster settings include at least one of population, species max counts, spawn type, and height-based percentages.

The method may further include executing, with the processor, a vertex crawling and raycast algorithm to check for placement viability, growth, and caching of valid points to file.

The method may further include executing, with the processor, a run-time coral static mesh loop that first calculates a shadow pass and then creates instanced static meshes of all corals clusters.

The method may further include executing, with the processor, collision-based exclusion configuration to place box colliders where certain species should not grow.

The method the display device displays the light that is generated to a user while the views at least one of the real-world objects.

The method the display device is a see-through display device that allows light from the at least one real-world objects to reach an eye of the user.

The method may further include sensing, with the at least one sensor, movement of the display device due to movement of a head of the user, and adjusting a location of the virtual object so that, within a view of the user, the virtual object remains stationary relative to the at least one real-world object.

BRIEF DESCRIPTION OF THE DRAWINGS

The invention is further described by way of examples in the following drawings wherein:

FIG. 13 is a slide to show unpredictability in unknown environments;

FIGS. 19 and 20 are depth views illustrating that the system may be configured to utilize the geometry of the room or environment;

FIG. 21 is a depth view illustrating the location of positions within the mesh of the room that may be suitable anchors for elements such as coral clusters;

FIG. 22A-24 are screen shots illustrating the creation of interesting, believable interactions between the user and augmented reality elements;

FIG. 26 is a slide of various aspects of learnings;

FIG. 32 is a block diagram of various instructional routines and modules.

DETAILED DESCRIPTION OF THE INVENTION

Figure 1:
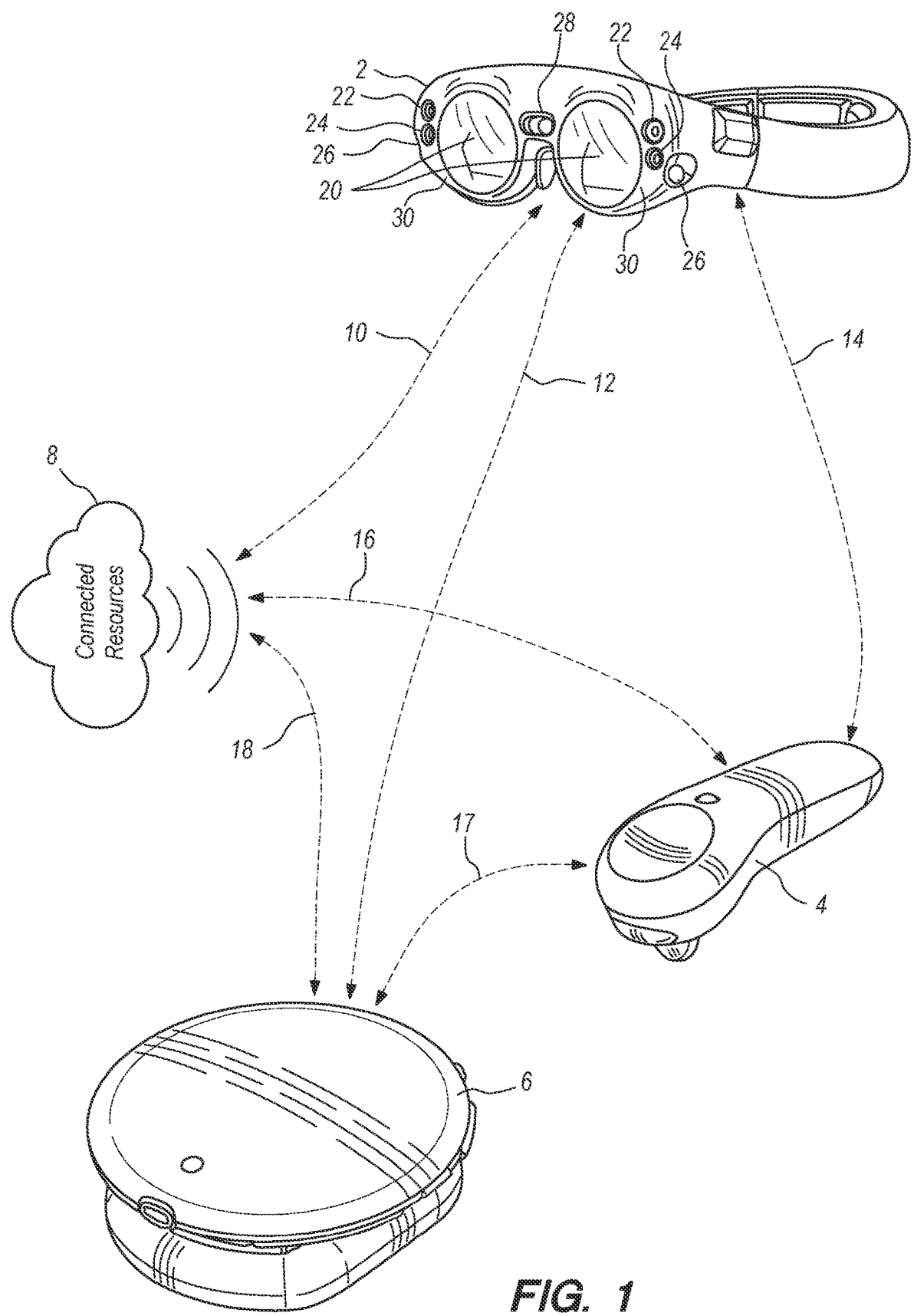
FIG. 1 is a perspective view of an augmented reality system according to an embodiment of the invention.

FIG. 1 illustrates an augmented reality system that includes augmented reality viewer 2, a handheld controller 4, and an interconnected auxiliary computing or controller component 6 that may be configured to be worn as a belt pack or the like on the user. Each of these components may be operatively coupled 10, 12, 14, 16, 17, 18 to each other and to other connected resources 8 such as cloud computing or cloud storage resources via wired or wireless communication configurations. The connected resources 8 may be those specified by IEEE 802.11, Bluetooth RTM, and other connectivity standards and configurations. As described, for example, in U.S. patent application Ser. Nos. 14/555,585, 14/690,401, 14/331,218, 15/481,255, 62/627,155, 62/518, 539, 16/229,532, 16/155,564, 15/413,284, 16/020,541, 62,702,322, 62/206,765, 15,597,694, 16/221,065, 15/968, 673, and 62/682,788, each of which is incorporated by reference herein in its entirety, various aspects of such components are described, such as various embodiments of two depicted optical elements 20 through which the user may see the world around them along with visual components which may be produced by the associated system components, for an augmented reality experience. The system may also comprise various sensors configured to provide information pertaining to the environment around the user, including camera type sensors such as monochrome, color/RGB, and/or thermal imaging components 22, 24, 26, depth camera sensors 28, and sound sensors 30 such as microphones.

The augmented reality viewer 2 includes a head-worn structure 25 that can be worn on a head of a user. The augmented reality viewer 2 and the controller component 6 each have a processor and a storage device connected to the processor. Data and executable code are stored on the storage devices and are executable with the processors. The augmented reality viewer 2 includes a projector that serves as a light generator. The processor of the augmented reality viewer 2 sends instructions to the projector and the projector generates light, typically laser light, that is transmitted through the display to eyes of the user.

FIG. 1 thus describes an augmented reality viewer that includes at least one sensor positioned to sense a location of at least one of a plurality of real-world objects, a storage device, a set of data on the storage device including a virtual object, a processor connected to the storage device, a display module on the storage device and executable by the processor to determine a desired display of the virtual object relative to the location of at least one of the real-world objects, a data stream generator on the storage device and executable by the processor to generate a data stream based on the data and the desired display, a light generator connected to the processor to receive the data stream and generate light based on the data stream, and a display device positioned to receive the light that is generated and to display the light to a user, wherein the light creates a rendering of the virtual object visible to the user and rendered in accordance with the desired display.

The display device may display the light that is generated to a user while the user views at least one of the real-world objects. The display device may be a see-through display device that allows light from the at least one real-world objects to reach an eye of the user.

The augmented reality viewer may include a head-worn structure shaped to be worn on a head of the user, wherein the display device is mounted to the head-worn structure and the at least one sensor is of a kind that is suitable to sense movement of the display device due to movement of a head of the user, and a position adjustment module, executable by the processor, to adjust a location of the virtual object so that, within a view of the user, the virtual object remains stationary relative to the at least one real-world object.

Figure 2:
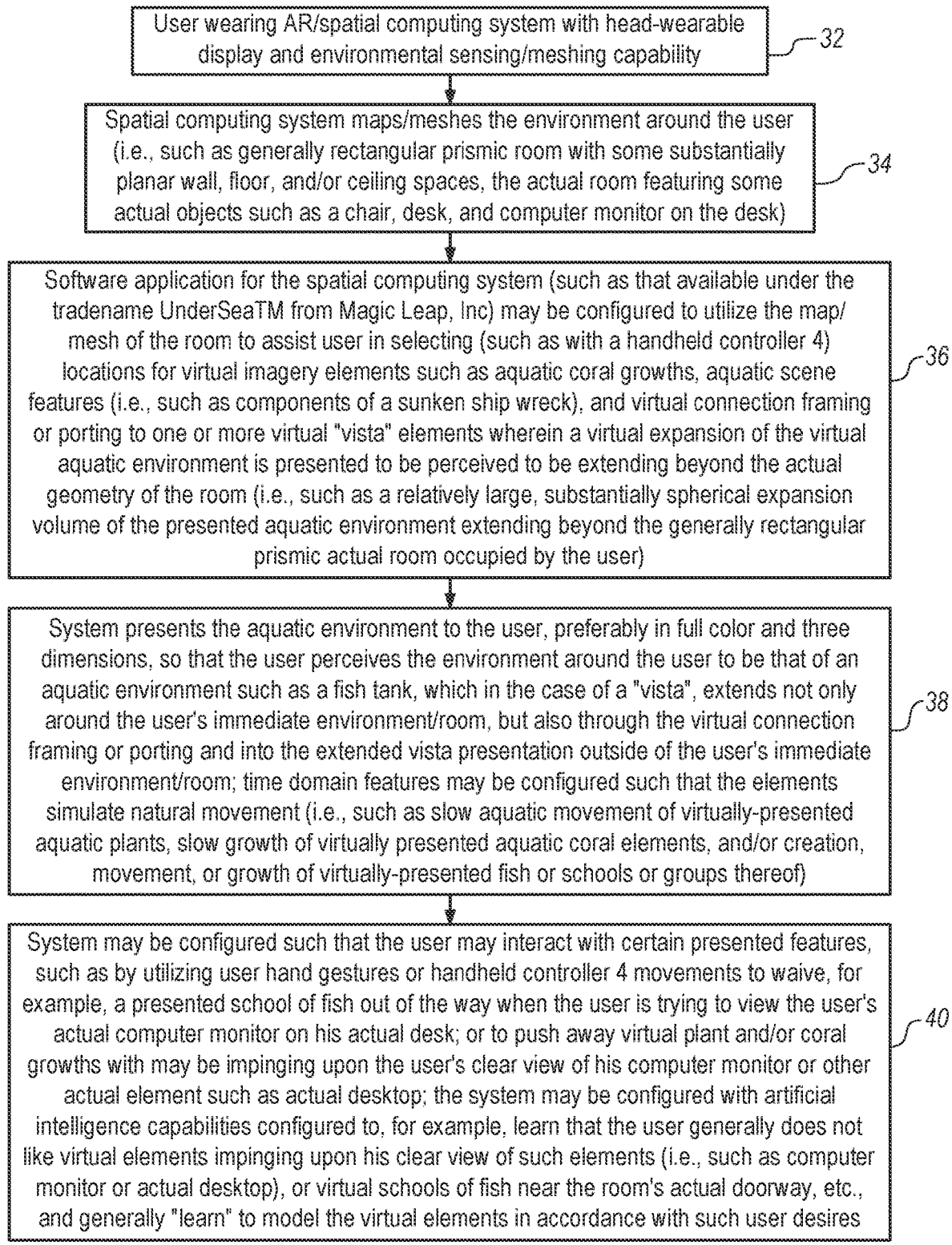
FIG. 2 is a flowchart showing basic operation of the augmented reality system.
Figure 3:
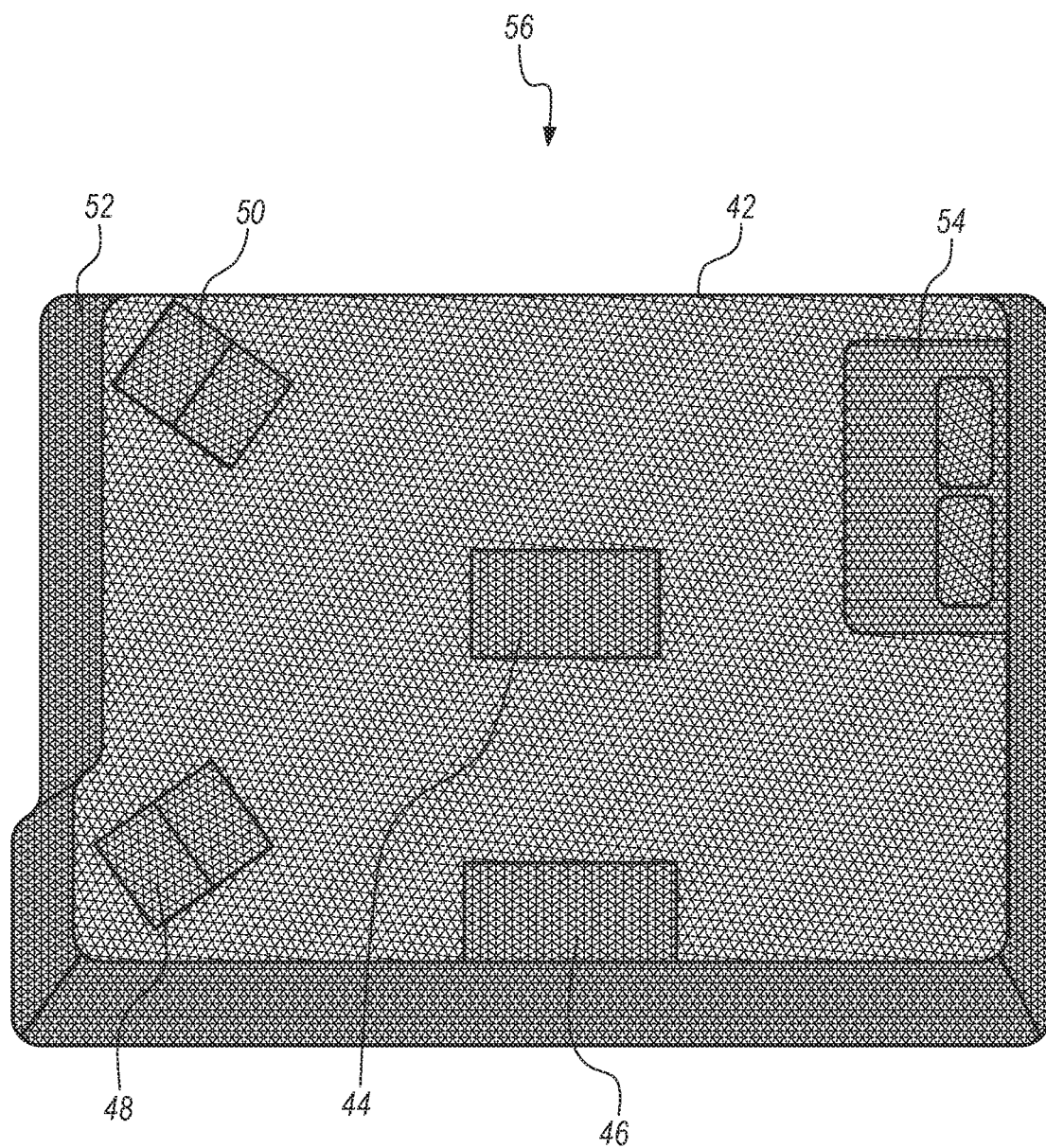
FIG. 3 is a depth view that shows the creation of such a mesh.

The following definitions will assist in an understanding or the various terms used herein:
1. virtual objects
    1.1. life-like objects (objects that migrate nomadically, that display articulating features, or have surface textures that move)
        1.1.1. nomadic classification (objects that move from one location to another location)
            1.1.1.1. nomadic life
                1.1.1.1.1. sea otters
                1.1.1.1.2. fish
                1.1.1.1.3. sea turtles
            1.1.1.2. non-nomadic life
                1.1.1.2.1. sea anemones
                1.1.1.2.2. coral
        1.1.2. articulating classification
            1.1.2.1. articulating life (objects that have bodies that bend)
                1.1.2.1.1. sea otters
                1.1.2.1.2. fish
                1.1.2.1.3. sea turtles
                1.1.2.1.4. sea anemones
            1.1.2.2. non-articulating life (objects that have bodies that do not bend)
                1.1.2.2.1. coral
        1.1.3. texture classification (surface features)
            1.1.3.1. fluid-texture life (objects with surfaces that move)
                1.1.3.1.1. fish
                1.1.3.1.2. sea otters
                1.1.3.1.3. sea anemones
            1.1.3.2. fixed-texture life (objects with surfaces that are static)
                1.1.3.2.1. sea turtles
                1.1.3.2.2. coral
    1.2. inanimate objects (objects that do not migrate nomadically, that do not display articulating features, and do not have surface textures that move)
        1.2.1. rocks
        1.2.2. sand
2. real-life objects
    2.1. walls
    2.2. ceilings
    2.3. furniture Referring to FIG. 2, in various embodiments a user may be wearing an augmented reality system such as that depicted in FIG. 1, which may also be termed a "spatial computing" system in relation to such system's interaction with the three dimensional world around the user when operated at 32. Such a system may comprise, for example, a head wearable display component 2, and may feature environmental sensing capabilities as described above and in the aforementioned incorporated by reference materials, such as cameras of various types which may be configured to map the environment around the user, or to create a "mesh" 56 of such environment. FIG. 3 shows the creation of such a mesh. A point cloud is depicted which forms a mesh of a given room wherein walls or perimeters 42, 52 are shown as well as chairs 46, 48, 50, 54 and a centrally located desk 44. As further shown in FIG. 2, at 34 the spatial computing system may be configured to map or mesh the environment around the user as described above with reference to FIG. 3.

At 36, the spatial computing system may be configured to run or operate software, such as that available from Magic Leap, Inc., of Plantation, Fla., under the tradename Undersea (TM). The software may be configured to utilize the map or mesh of the room to assist the user in selecting (such as with a handheld controller 4 of FIG. 1, or via gestures or other available control options available with the system and software) locations for virtual imagery elements such as aquatic coral growths, aquatic scene features (i.e., such as components of a sunken ship wreck), and virtual connection framing or porting to one or more virtual "vista" elements wherein a virtual expansion of the virtual aquatic environment is presented to be perceived to be extending beyond the actual geometry of the room (i.e., such as a relatively large, substantially spherical expansion volume of the presented aquatic environment extending beyond the generally rectangular prismic actual room occupied by the user). In various embodiments, the system may be configured to automatically locate possible locations, such as vertical or horizontal planar locations within the user's actual room, for possible placement of corals, kelp forests, and the like, subject to selection or placement confirmation by the user. In various embodiments the system may be configured to create (or "spawn") groups, or schools, or fish which may be configured to swim about through the virtual aquatic environment. In various embodiments such fish may be configured to be attracted to certain gestures or inputs of the user, while in other embodiments they may be configured to flee away from user movements as though they are scared of the user movements. The fish may be configured to grow and/or multiply over time, and may be configured to spontaneously or at a given time interval change to different species, so that the aquatic environment remains changing in time for the user.

Figure 4:
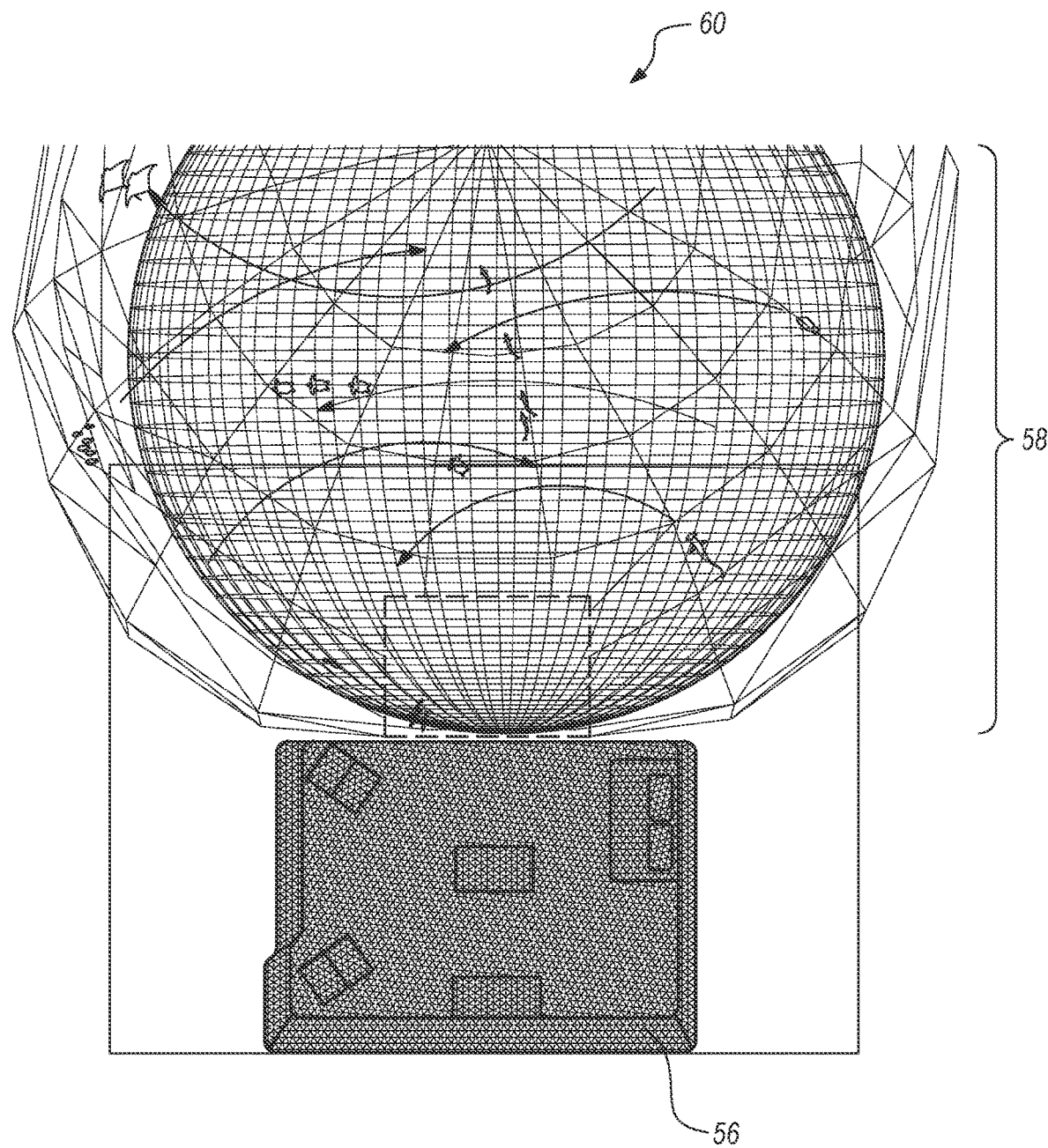
FIG. 4 is a depth view that show a mapping for a "vista" volume.

At 38, the system may be configured to operate the software to present the aquatic environment to the user. The aquatic environment is preferably presented to the user in full color and three dimensions, so that the user perceives the environment around the user to be that of an aquatic environment such as a fish tank, which in the case of a "vista", extends not only around the user's immediate environment/room, but also through the virtual connection framing or porting and into the extended vista presentation outside of the user's immediate environment/room. Time domain features (i.e., features that change position and/or geometry with time) may be configured such that the elements simulate natural movement (i.e., such as slow aquatic movement of virtually-presented aquatic plants, slow growth of virtually-presented aquatic coral elements, and/or creation, movement, or growth of virtually-presented fish or schools or groups thereof). The system may be configured to propose suitable locations and sizes for a possible portal or a framing location for a "vista", such as locations and sizes at the center of a vertical wall within the actual room occupied by the user that would give the user a broad view into the virtual "vista" extension of the virtual aquatic environment. In FIG. 4, a mesh 56 of a user's room is illustrated with a mapping for a somewhat spherical "vista" volume 58 which is operatively and virtually-fluidly coupled to the actual room as presented to the user. Also shown are predetermined pathways 60 for various fish to be presented in the "vista" presentation to the user.

In FIG. 2, at 40, the spatial computing system may be configured such that the user may interact with certain presented features. The user may for example use user hand gestures or the handheld controller 4 to wave a presented school of fish out of the way when the user is trying to view the an actual real-world computer monitor on an actual desk, push away virtual plant and/or coral growths that may be impinging upon the clear view of the computer monitor or other actual element such as actual desktop. The system may be configured with artificial intelligence capabilities configured to, for example, learn that by use of such a gesture or controller instruction, the user generally does not like a virtual elements impinging upon his clear view of such elements (i.e., such as computer monitor or actual desktop), or, for example, virtual schools of fish near the room's actual doorway, etc., and generally "learn" to model the virtual elements in accordance with such particular desires of a particular user. In other words, the system may be configured to keep the fish, plants, coral, and other presented virtual features out of the places where the user seems to not want them. Further, the system preferably is configured to not have virtual elements collide with actual elements of the room, by taking into the account the mesh 56 geometry.

FIG. 2 thus describes that the virtual object may be a nomadic life object, and that the augmented reality viewer may further include a nomadic subroutine on the storage device and executable by the processor to move the nomadic life object relative to the real-world objects. The data may include a plurality of nomadic life objects, wherein the nomadic subroutine is executable by the processor to move the plurality of nomadic life objects relative to the real-world objects and relative to one another.

The at least one sensor may sense a wave movement initiated by the user, and the augmented reality viewer may further include a wave movement routine on the storage device and executable by the processor to move the nomadic life object in response to the wave movement that is sensed by the at least one sensor. The wave movement may be initiated in a target zone and the nomadic object may be moved out of the target zone. The at least one sensor sensing the wave movement may be a camera that detects an image of a hand of the user.

The augmented reality viewer may further include a handheld controller, wherein the sensor is mounted to a handheld controller that is held in a hand of the user.

Figure 5A:
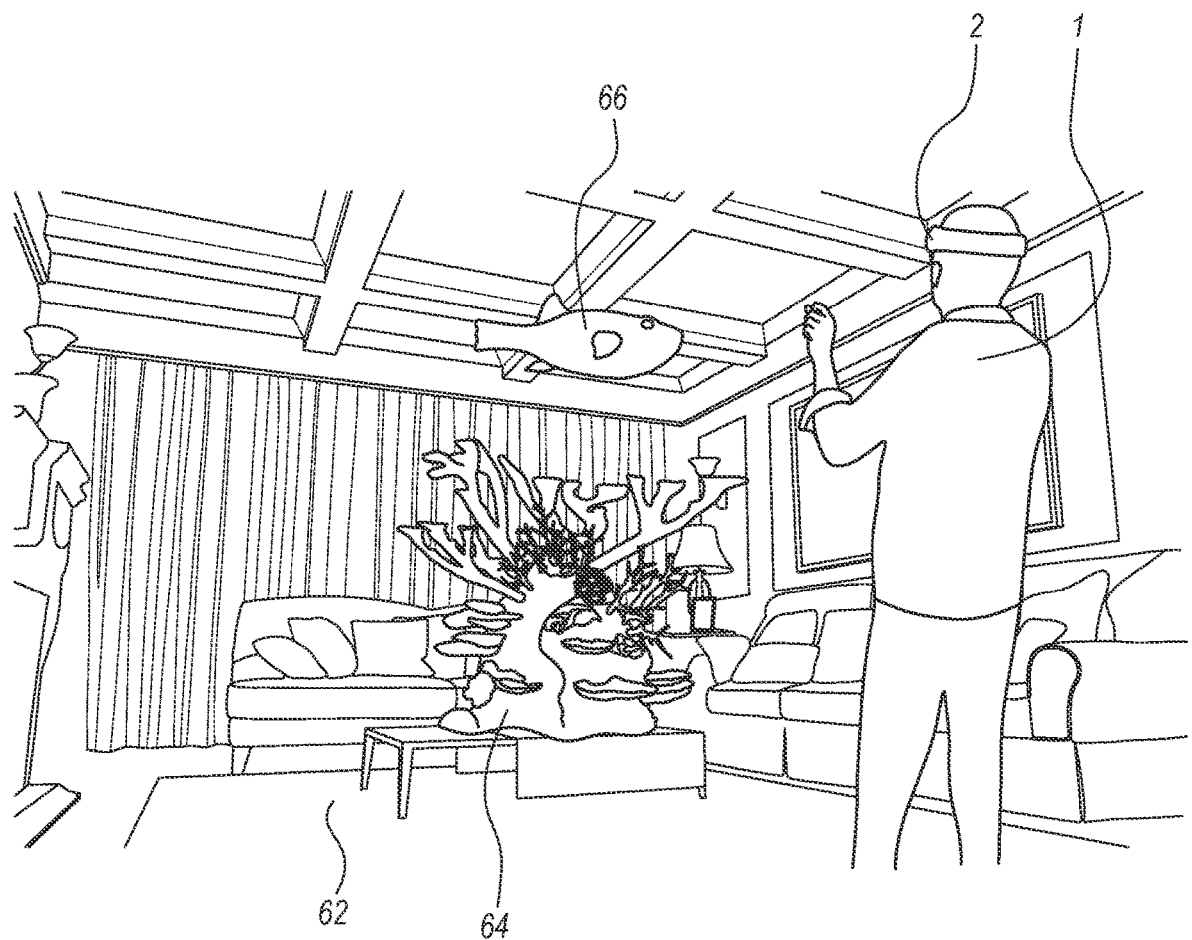
FIGS. 5A to 5E are depth views that show a living room scene wherein a user can experience a dynamic virtual aquatic environment.
Figure 5B:
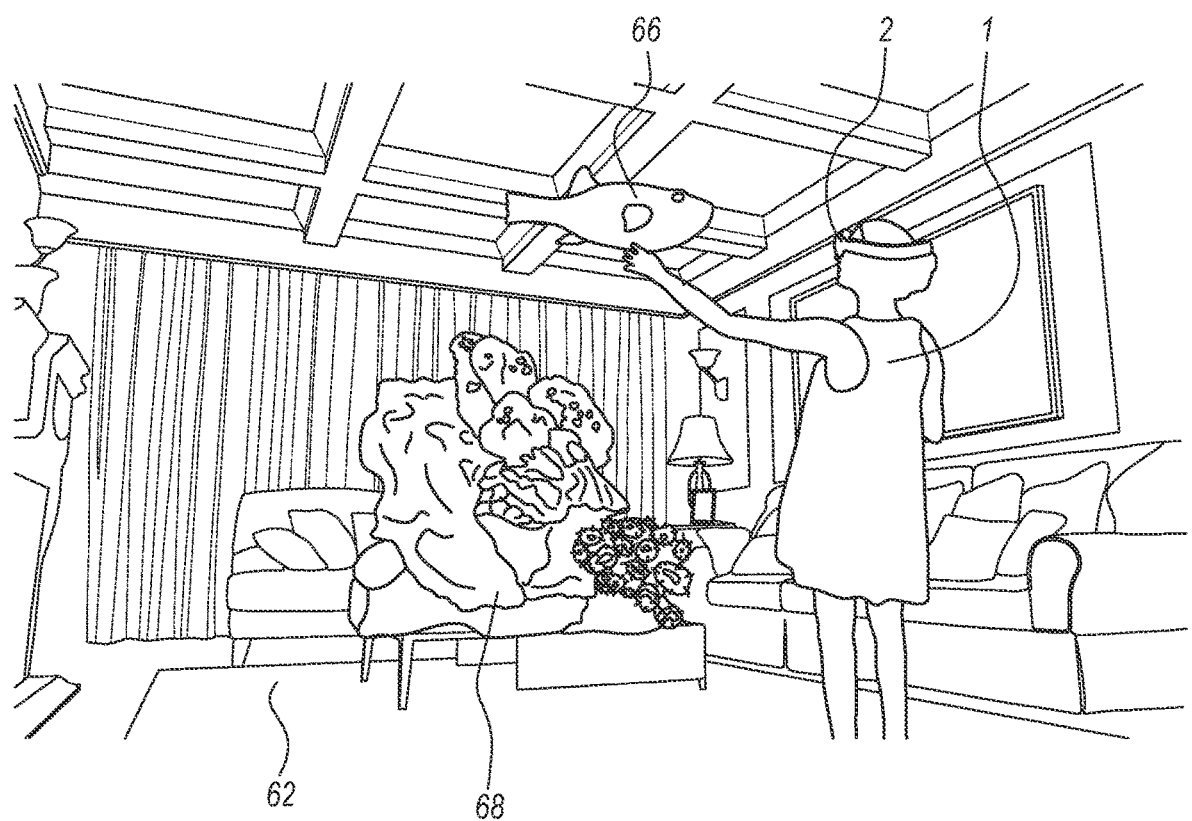
Figure 5C:
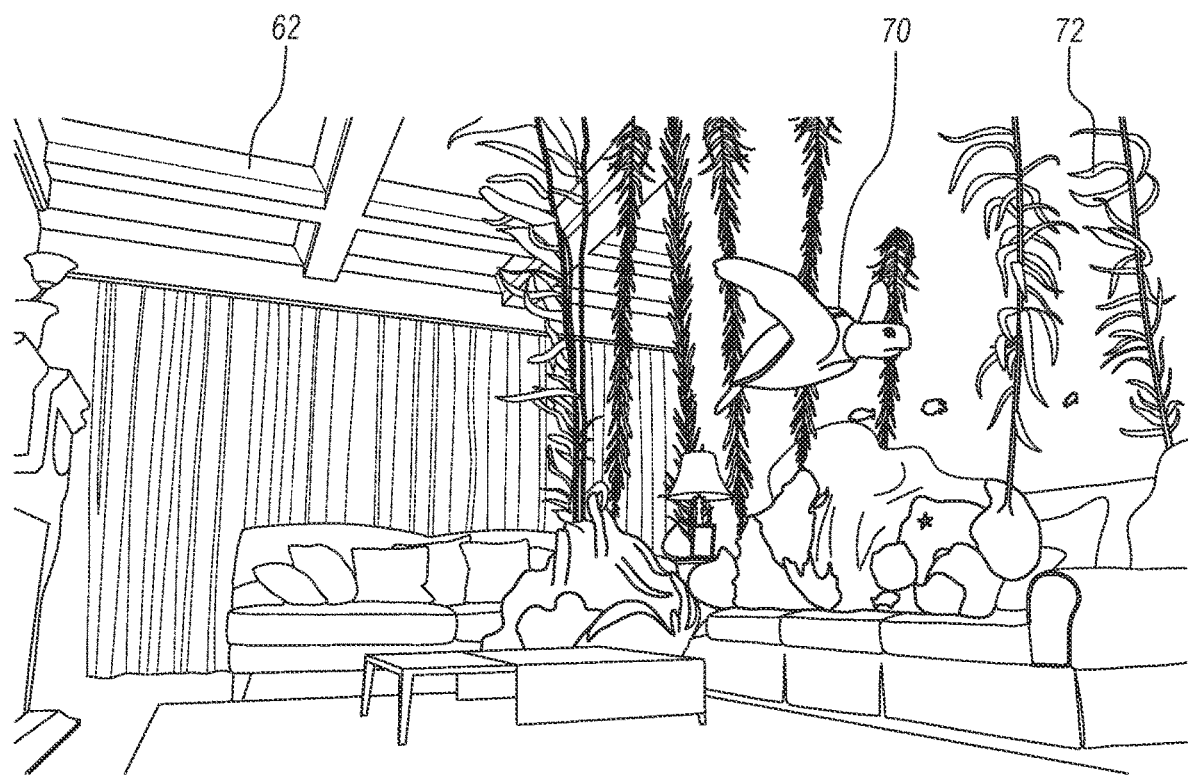
Figure 5D:
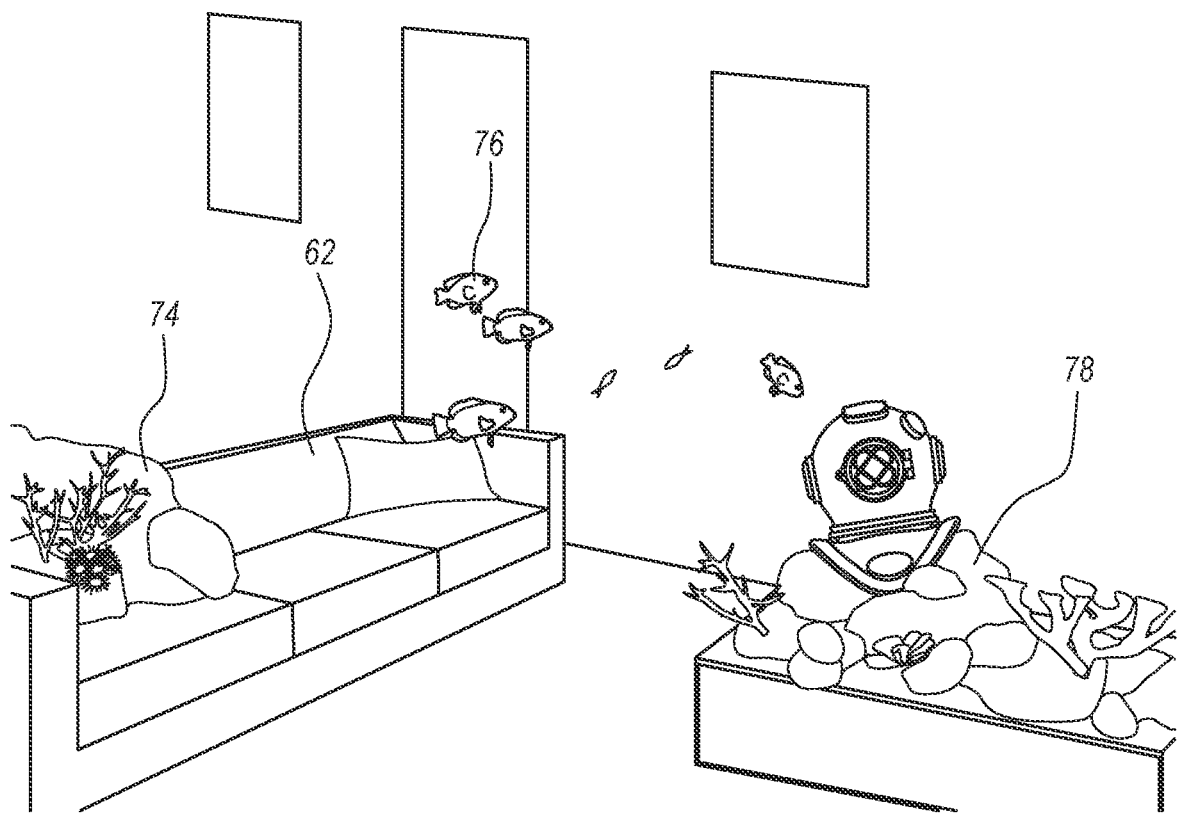
Figure 5E:
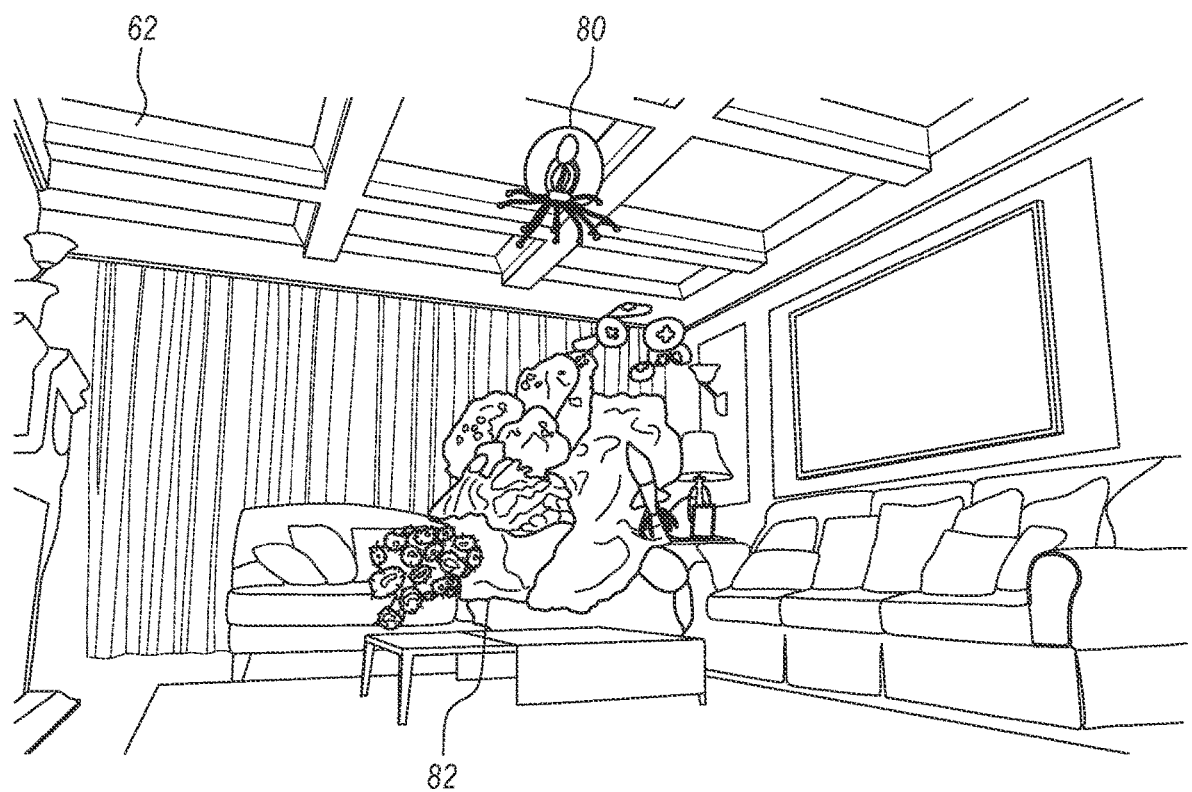

Referring to FIGS. 5A-5E, various embodiments of user viewable scenarios featuring actual room elements 62 as well as various virtual elements such as coral groupings or clusters 64, 68, 74, 78, 82, 83, kelp plants or forests 72, fish or other animals or schools or groups thereof 66, 70, 76, 77, 80, and the like, are illustrated. Referring to FIG. 5A, a living room scene is illustrated wherein a user 1 wearing a spatial computing system 2 is able to experience a dynamic virtual aquatic environment featuring a centrally located virtual coral cluster 64 as well as a relatively large and dynamic virtual fish 66. Referring to FIG. 5B, a living room scene is illustrated wherein another user 1 wearing a spatial computing system 2 is able to experience a dynamic virtual aquatic environment featuring a different centrally located virtual coral cluster 64 as well as a relatively large and dynamic virtual fish 66. Referring to FIG. 5C, a user may be able to view a living room scene with virtual aquatic elements such as a dynamic sea turtle 70 and a dynamic kelp forest 72. Referring to FIG. 5D, a user may be able to view a living room scene with virtual aquatic elements such as a dynamic school of fish 76, a coral cluster 74, and a central feature 78 comprising a sunken diver helmet, coral cluster, and dynamic aquatic plants. Referring to FIG. 5E, a user may be able to view a living room scene with virtual aquatic elements such as a dynamic jellyfish 80 and a central feature 82 comprising a coral cluster and dynamic aquatic plants. With each of the viewable configurations, the system may be configured to allow the user to adjust not only coloration themes, lighting, and shading, but also lighting placement.

Figure 6:
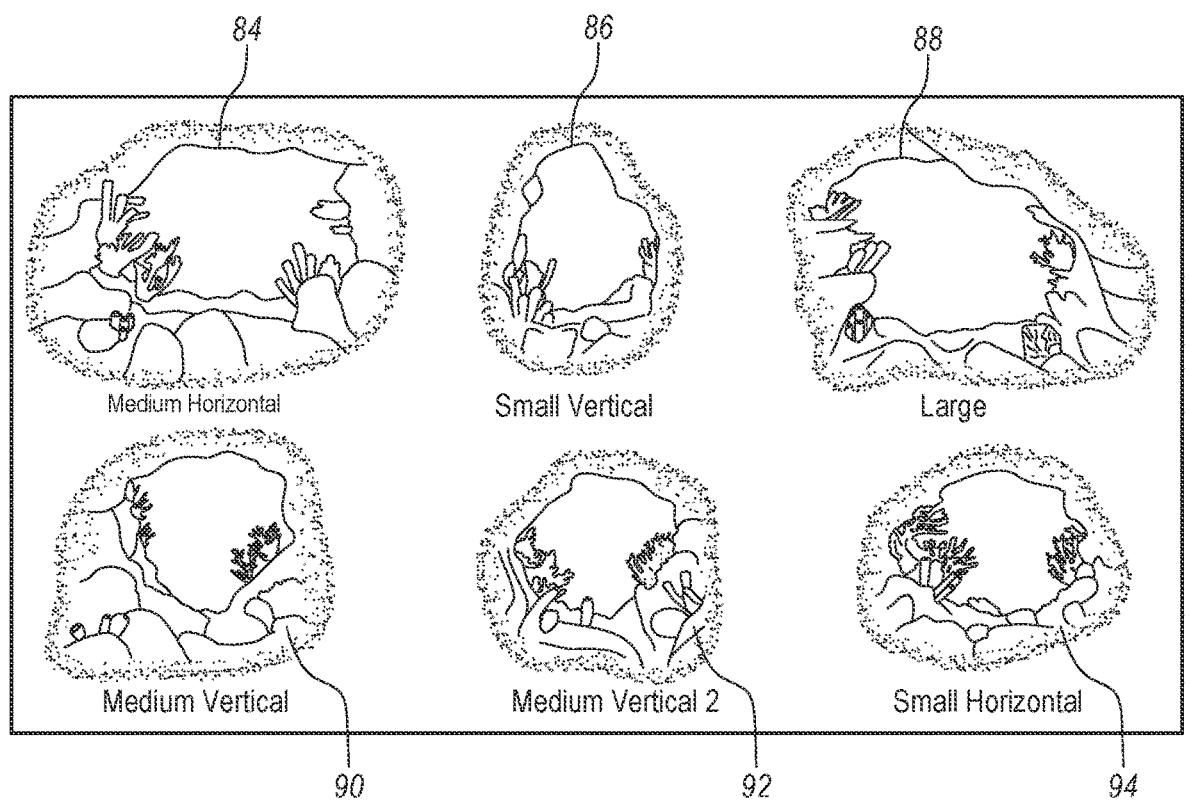
FIG. 6 are views configured to assist the user in selecting a size and location for framing/portal viewing access into a "vista"

Referring to FIG. 6, as noted above in reference to FIG. 2, the system may be configured to assist the user in selecting a size and location for framing/portal viewing access into a "vista". The user is presented with sample framing/portal configurations 84, 86, 88, 90, 92, 94 which may be selected by the user, depending upon the size and geometry of the actual environmental feature with which the frame or portal is to be virtually "coupled". For example, if a blank space of a vertical wall in a user's actual office is available but is relatively small, the system may be configured to suggest placing a frame or portal which is relatively small and relatively geometrically efficient.

Figure 7:
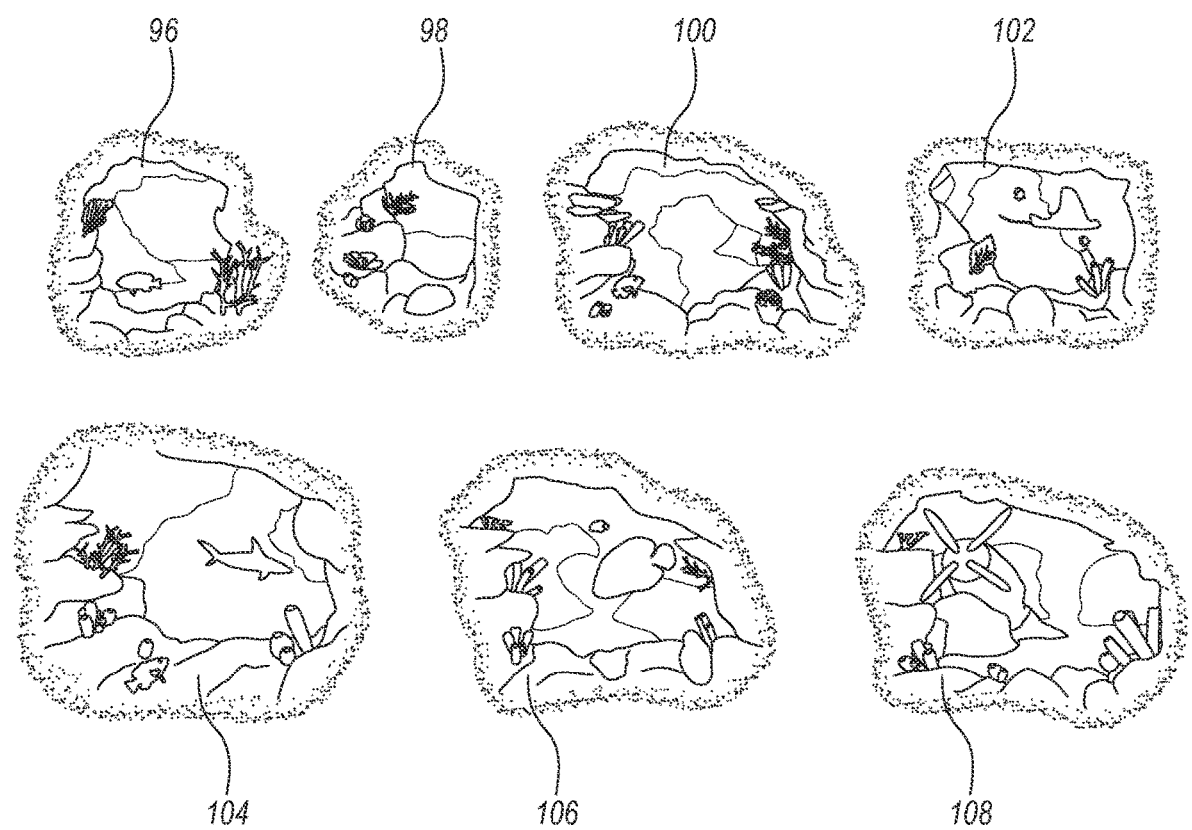
FIG. 7 are views showing that various aspects of a "vista" may be selected.

Referring to FIG. 7, with a frame or portal configuration selected, as described in reference to FIG. 6, various aspects of a "vista" may be selected, such as coloration, lighting, volume, virtual features such as rocks and fish, etc., resulting in many customizable choices, such as the seven samples 96, 98, 100, 102, 104, 106, 108.

Figure 8A:
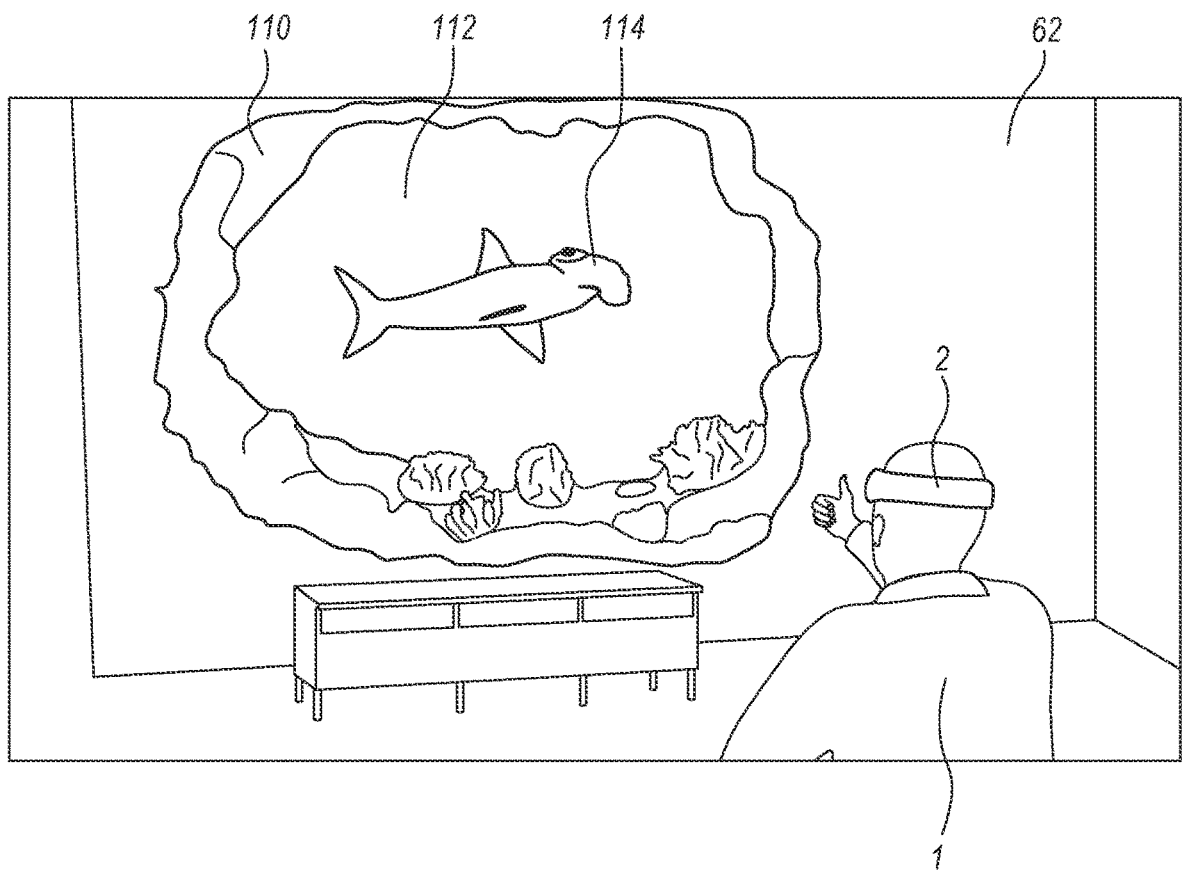
FIGS. 8A to 8C are depth views with a virtual frame or portal created so that he can virtually "see" out into an oceanic "vista" volume.
Figure 8B:
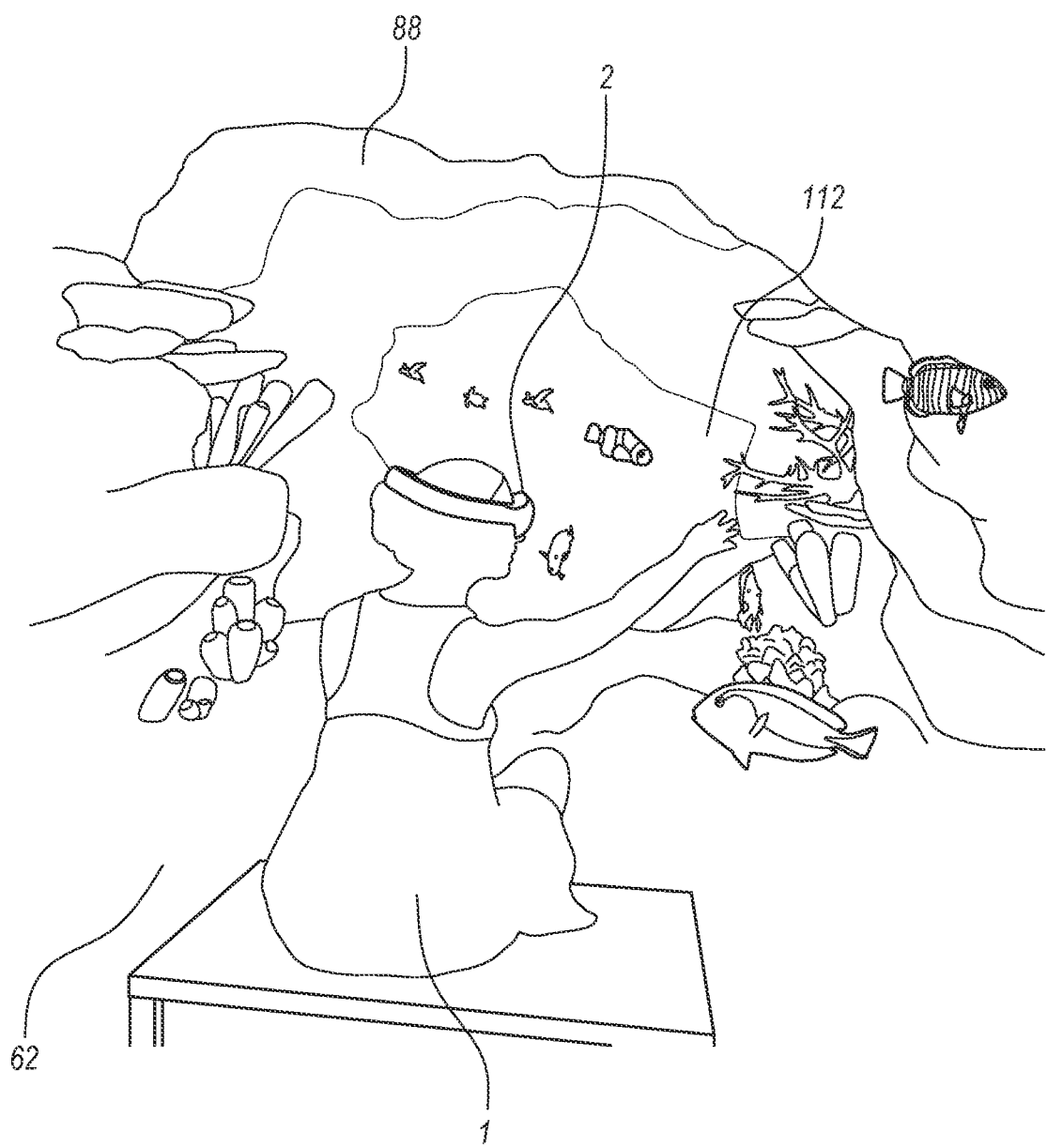
Figure 8C:
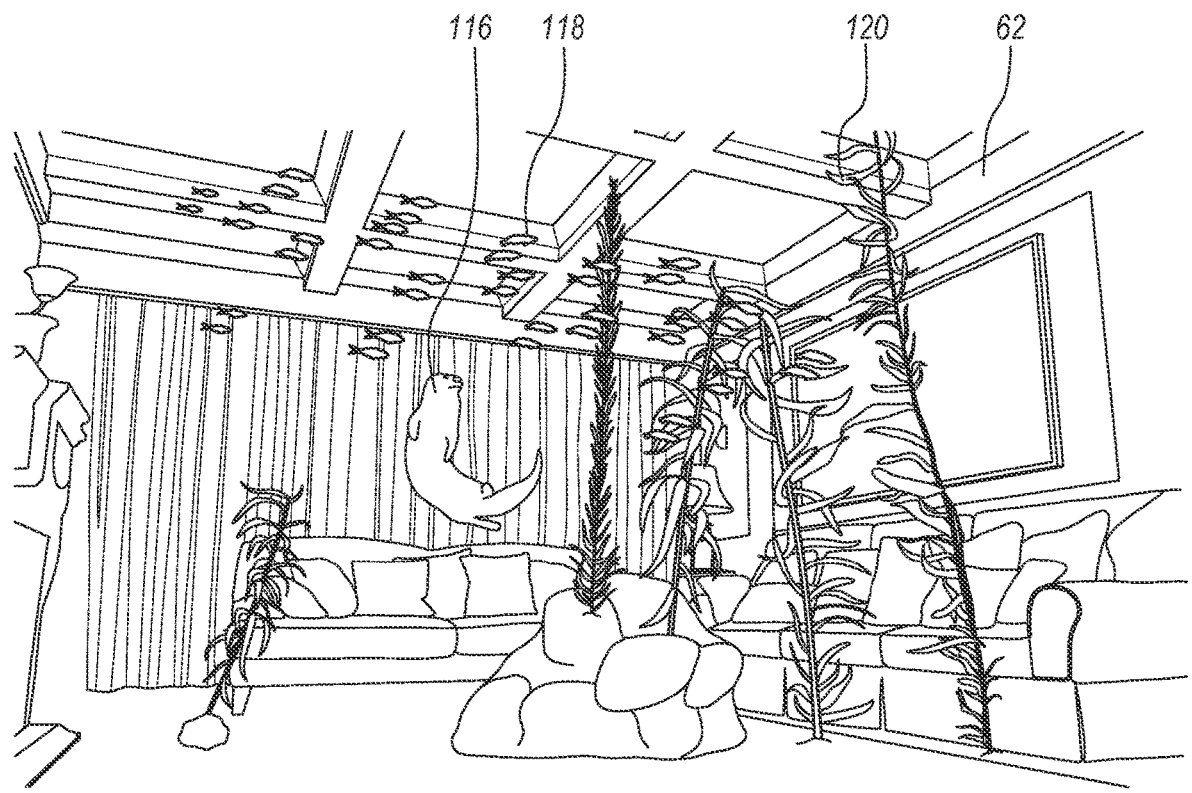

Referring to FIGS. 8A-8C, various views of "vista" room expansion configurations are illustrated. Referring to FIG. 8A, a user 1 wearing a head mounted component 2 of a spatial computing system such as that shown in FIG. 1 is shown in his living room 62 with a virtual frame or portal 110 created so that he can virtually "see" out into a oceanic "vista" volume 112 which features a virtual dynamic shark 114 in the depicted illustrative example. Referring to FIG. 8B, a user 1 wearing a head mounted component 2 of a spatial computing system such as that shown in FIG. 1 is shown in her living room 62 with a virtual frame or portal 88 created so that he can virtually "see" out into a oceanic "vista" volume 112 which features virtual elements of many kinds such as rocks, fish, plants, and coral, in the depicted illustrative example. Referring to FIG. 8C, an illustrative example of a living room 62 scene featuring dynamic virtual elements such as a sea otter 116, school of fish 118, and kelp forest 120 are shown with a "vista" that in this case extends upward through the ceiling of the actual room, providing the perception for the user that his living room is relatively deep in the virtual aquatic environment.

The augmented reality viewer may include a depth creation module on the storage device and executable with the processor to display, according to the desired display, in three-dimensional space, the virtual object to the user on a side of the opposing the user and with the surface between the user and the virtual object. The depth creation module may be executable with the processor to display a porthole in the surface to the user through which the virtual object is visible to the user. The virtual object may be a three-dimensional virtual object.

Figure 9A:
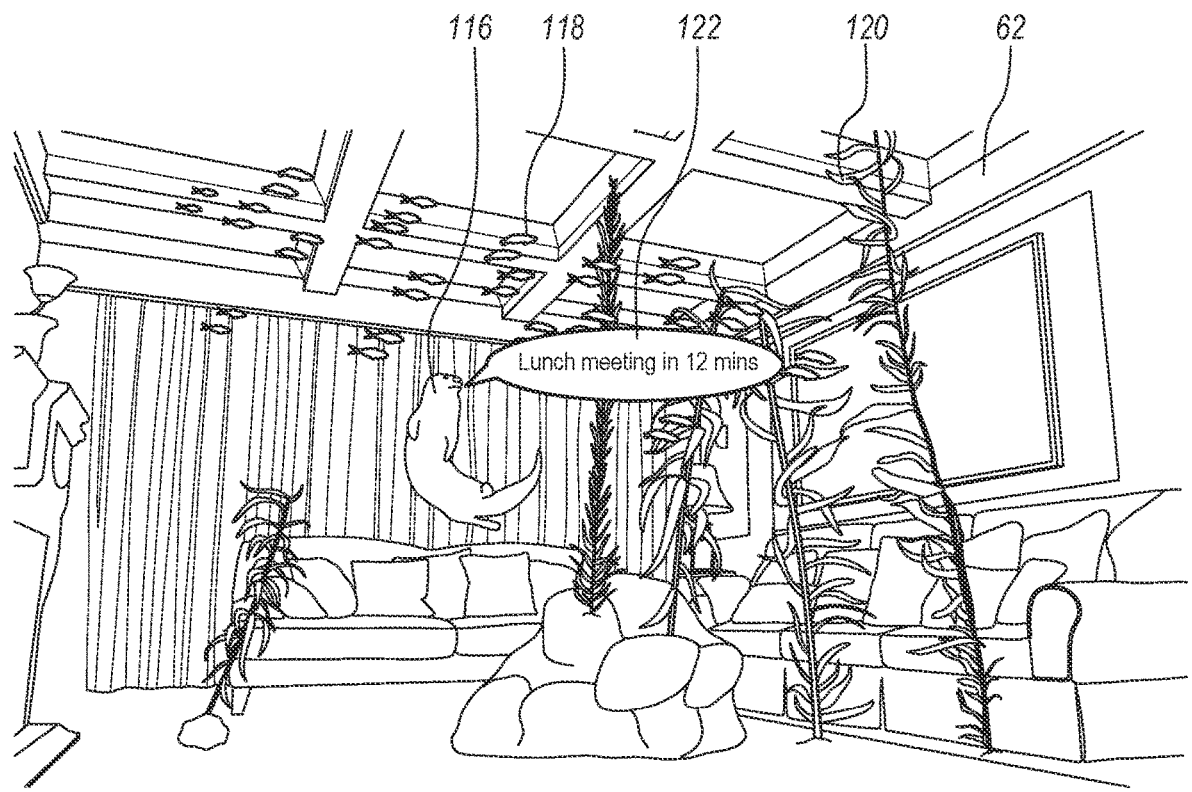
FIGS. 9A to 9D are depth views showing interaction between the user and various nomadic objects.
Figure 9B:
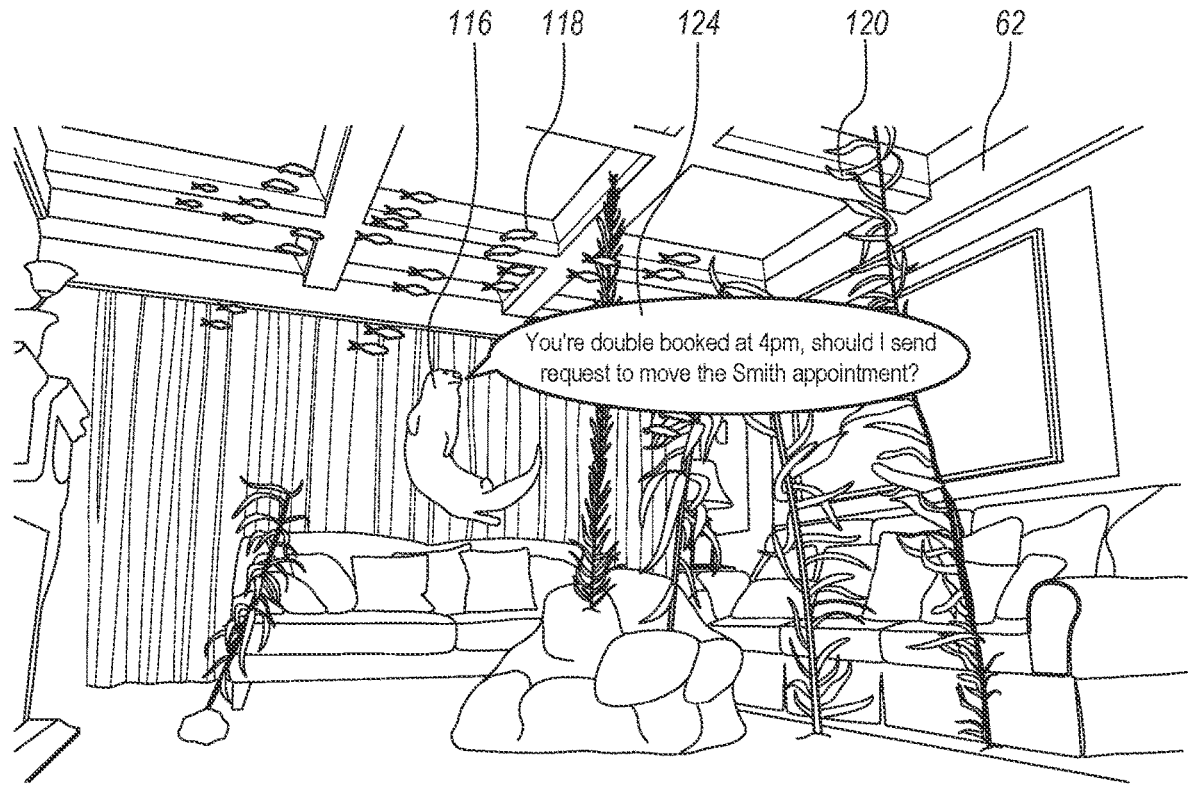
Figure 9C:
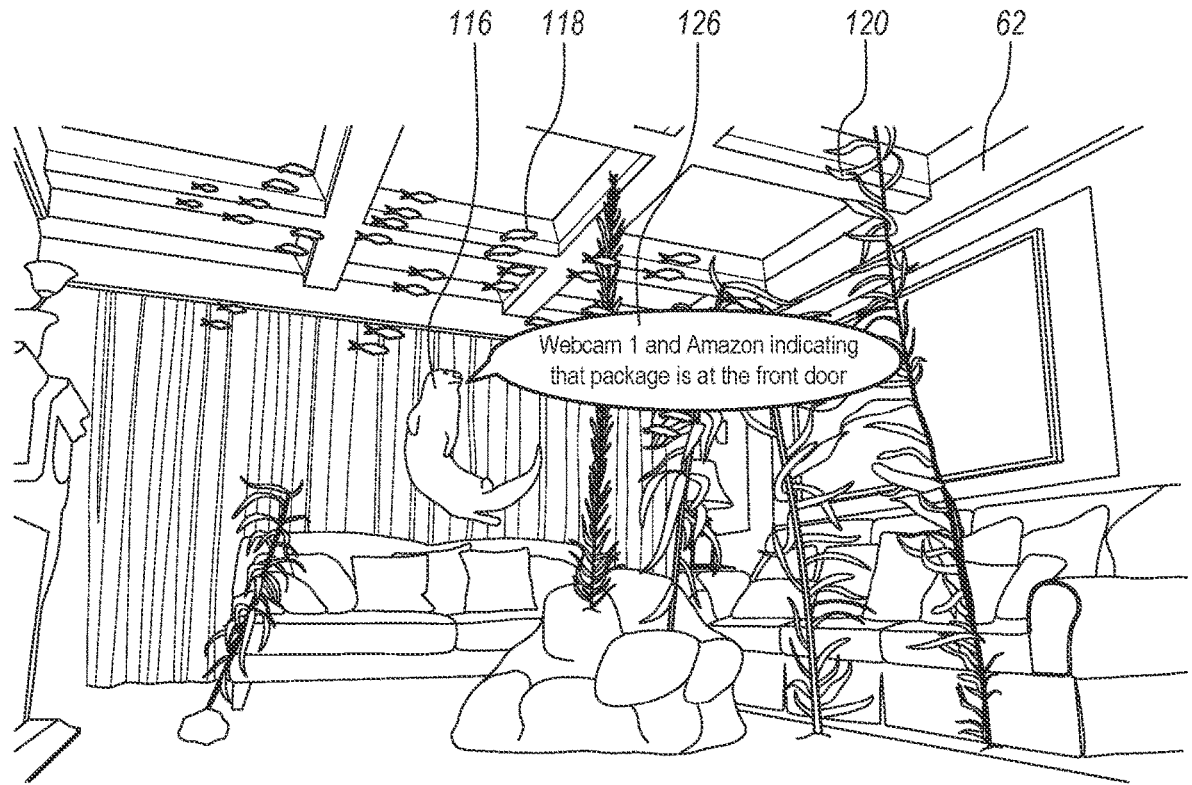

Referring to FIGS. 9A-9C, as noted in reference to FIG. 2, the system may be configured so that the user may interact with various virtual features, and so that the system may "learn" to configure the virtual presentation as desired by the user. For example, in various embodiments, if a user is seated in a relatively empty room with one door and one centrally located desk upon which there is a computer monitor, the user's spatial computing system may assist the user in locating corals, aquatic plants, and other features within the room, and the system may be configured to "spawn" or generate fish to dynamically swim about within the room. As the user sits at his or her desk and tries to use the computer monitor located a few feet in front of the user's head, if a too many fish start to swim between the user's head and the user's computer monitor, the user may waive them away (or use another system-recognizable gesture) with his hands, or use other controls (such as a handheld controller 4, to indicate to the system that the user doesn't want the fish right there between his head and the monitor. In various embodiments, the system may be configured to use artificial intelligence or learning features to learn that the user seems to not want too many fish swimming about in that volume between the user's head and the computer monitor—and the system may be configured to generally keep virtual objects such as fish, plants, or coral out of that volume. Similarly, the system may learn that the user generally doesn't like too many virtual plants or corals growing on his favorite window or door and may respond accordingly by learning to not place them there virtually.

Referring back to FIG. 1, the system may be operatively coupled to additional resources, such as other computing systems, by cloud or other connectivity configurations. For example, the spatial computing system may be operatively and securely coupled with a cellphone or laptop computer with privileges to access the user's calendar, texting, or internet-of-things ("IOT") connected resources, such as webcams, door locks, lights, or garage doors. Now referring again to FIGS. 9A-9D, such resource connectivity may be utilized in various embodiments such that one of more virtual features of the virtual presentation may be utilized to assist the user; in other words, in the illustrated configurations, the virtual sea otter 116 may be configured to generally swim around dynamically like a wild sea otter until some interaction is needed or desired by the user, in which case the sea otter may function akin to a personal assistant with connectivity to pertinent resources. For example, in the embodiment of FIG. 9A, the sea otter 116 is telling the user with a displayed bubble message 122 that the user's lunch meeting is in 12 minutes. The system may be configured such that the user can utilize a simple gesture, such as flicking away with the index finger, to clear the message and return the otter 116 back to natural dynamics. Referring to FIG. 9B, the system may be configured such that the otter character 116 provides a message bubble notification 124 that connected calendaring resources are indicating that the user is double booked; if the user desires, the otter can utilize the connected resources to send a message automatically to request a rescheduling of one of the appointments.

The augmented reality viewer may thus include a transmission agent on the storage device and executable with the processor to sense, with the at least one sensor, an instruction by the user, sense, with the at least one sensor, that the instruction is directed by the user to the nomadic life object at a location of the nomadic life object relative to the real-world objects, determine, based on the instruction, an outgoing communication and a resource, and communicate the outgoing communication to the resource.

The at least one sensor that senses the communication may be a microphone suitable to receive a voice instruction from the user.

Referring to FIG. 9C, the system may be configured such that the otter character 116 provides a message bubble notification 126 that connected webcam and messaging (and or Amazon network/web) resources are indicating that the user has received a package; such system may be further configured to allow the user to open the IOT garage door or other IOT-enabled access point to facilitate delivery by requesting this of the otter character 116, such as by voice recognition tools of the spatial computing system which utilize intercoupled microphone sensors 30.

The augmented reality viewer may thus include a transmission agent on the storage device and executable with the processor to sense, with the at least one sensor, an instruction by the user, sense, with the at least one sensor, that the instruction is directed by the user to the nomadic life object at a location of the nomadic life object relative to the real-world objects, determine, based on the instruction, an outgoing communication and an IOT device, and communicate the outgoing communication to the IOT device to operate the IOT device.

The at least one sensor that senses the communication may be a microphone suitable to receive a voice instruction from the user.

Figure 9D:
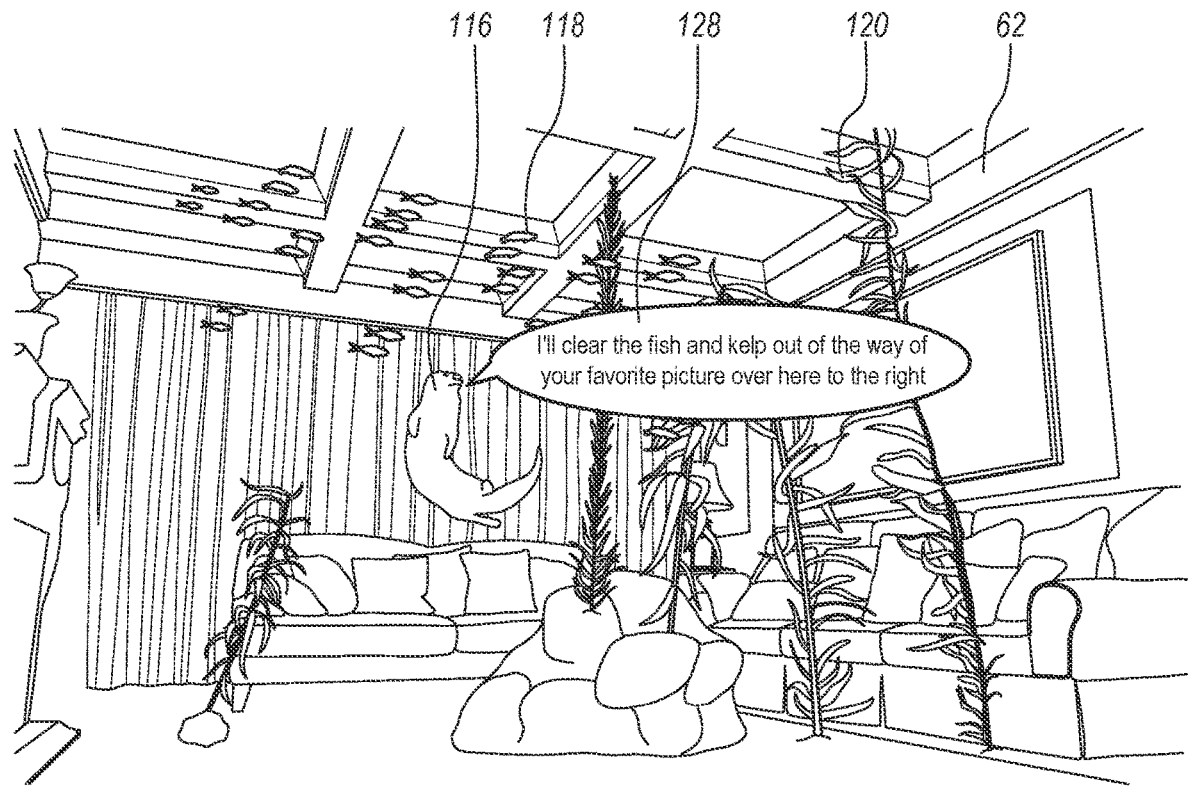

Referring to FIG. 9D, the system may be configured to use artificial intelligence and/or learning types of tools to analyze the eye gaze information pertinent to the user which may be captured by inward-facing cameras coupled to the head-wearable component 2 of the user's spatial computing system. Such analysis may yield system-based provisional conclusions that, for example, the user may be trying to gaze at something on the wall, such as a posted actual artwork, that currently is virtually obstructed by a kelp forest or other virtual feature—and that it may be a helpful thing for the personal-assistant-functioning otter character 116 to ask the user if he would like the right portion of the kelp forest moved a bit to allow better viewing of the actual wall, as suggested in the message bubble 128 shown in FIG. 9D.

The augmented reality viewer my include an artificial intelligence system on the storage device and executable with the processor to sense an action by the user using the at least one sensor, perform a routine involving the virtual object that is responsive to the action of the user, associate the routine with the action as an artificial intelligence cluster, determine a parameter that exists at a first time when the action is sensed, associate the parameter that exists at the first time with the artificial intelligence cluster, sense a parameter at a second time, determine whether the parameter at the second time is the same as the parameter at the first time, and, if the determination is made that the parameter at the second time is the same as the parameter at the first time then executing the routine.

The at least one sensor may include an eye tracking camera, wherein the action is a wave motion initiated by the user and the parameters are a gaze direction as determined by eye tracking of the user using the eye tracking camera. The action may be a wave movement initiated in a target zone and the nomadic object is moved out of the target zone.

The at least one sensor may include an eye tracking camera positioned to sense a gaze direction of the user, and the augmented reality viewer may further include a gaze direction movement routine on the storage device and executable by the processor to move the nomadic life object in response to the gaze direction that is sensed by the eye tracking camera.

There may be a plurality of nomadic life objects and the nomadic subroutine may be executable by the processor to move the plurality of nomadic life object relative to the real-world objects, and the augmented reality viewer may further include a personal assistant module on the storage device and executable with the processor to select a personal assistant nomadic life object among the plurality of nomadic life objects, and move at least one of the nomadic life objects other than the personal assistant nomadic life object with the personal assistant nomadic life object.

Figure 10A:
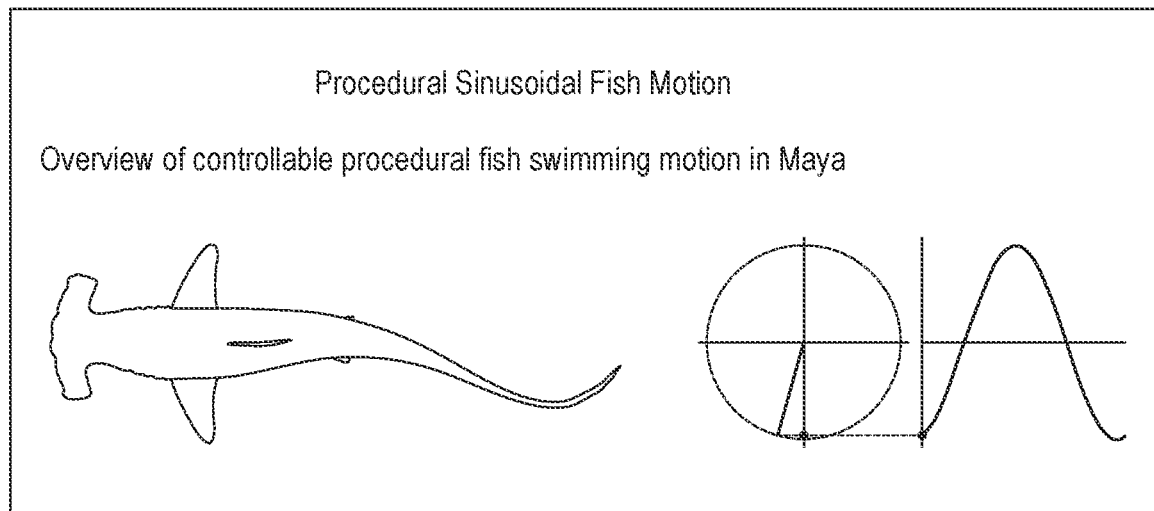
FIGS. 10A and 10B are views of mathematical models of cyclical behaviors of the various virtual characters.
Figure 10B:
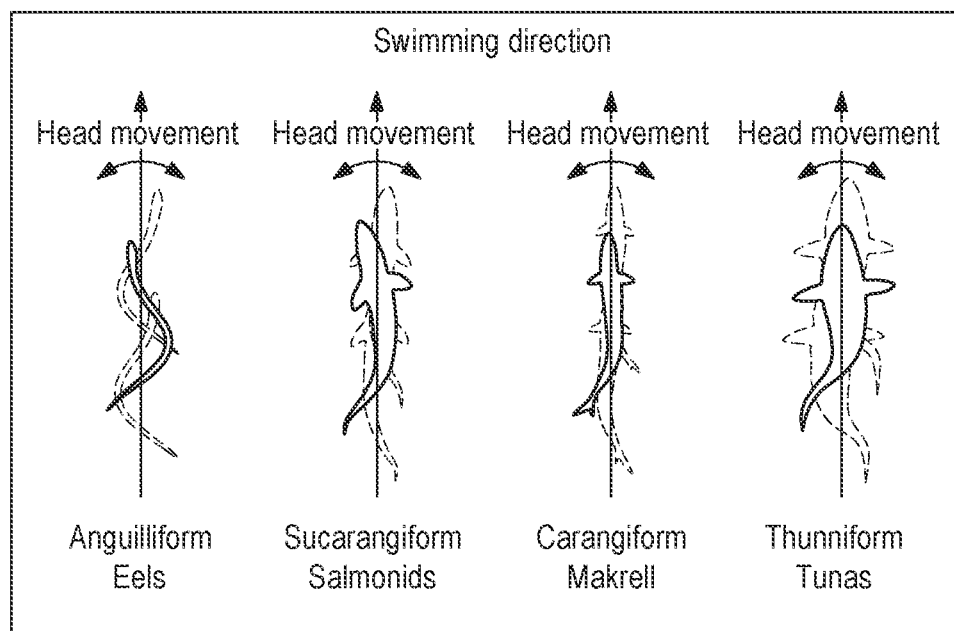

Referring to FIGS. 10A and 10B, in various embodiments, mathematical models may provide the basis for certain cyclical behaviors of the various virtual characters (such as fish of various types), and various types of fish may have various types of general locomotion patterns which may be utilized to produce motion which appears natural to the user. As noted above, in various embodiments, the fish may have several states to which they may be configured to return, such as fleeing as though they are scared, following as though they are interested, hungry, or curious, and these behaviors may be associated with factors such as velocity of a user's hand movement. For example, certain gestures or slow hand movements may be associated with feeding or friendliness/safety, such that one or more fish may be configured to follow or stay near the user's hand, whereas fast motions or certain gestures may be associated with potential danger or fear, in which case the one or more fish may be configured to flee the immediate area.

The nomadic life object may be a fish of a first type, and the augmented reality viewer may further include a movement module on the storage device and executable with the processor to articulate a body of the fish in a first back-and-forth manner. The movement module is executable with the processor to articulate a body of a fish of a second type in a second back-and-forth manner that is different from the first back-and-forth manner. The movement module may be executable with the processor to sense, with the at least one sensor, a slow hand movement of a hand of the user, and articulate the body of the fish in the first back-and-forth manner at a low speed in response to the slow speed of the hand movement, sense, with the at least one sensor, a fast hand movement of the hand of the user, and articulate the body of the fish in the first back-and-forth manner at a high speed in response to the fast speed of the hand movement. The movement module may be executable with the processor to move the first fish to stay close to the hand when the hand moves at the slow speed, and move the first fish to flee the hand when the hand moves at the fast speed.

Figure 11A:
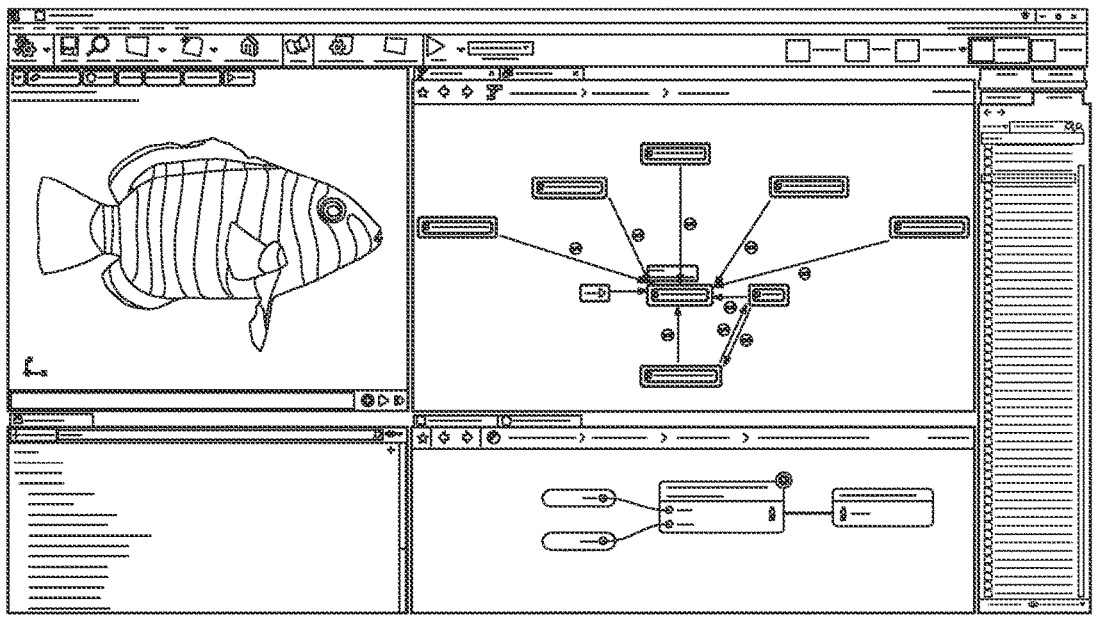
FIG. 11A is a screen shot of configurations that may be utilized to move the fish relative to the user.

Referring to FIG. 11A, various configurations may be utilized to move the fish relative to the user believably and efficiently from a spatial computing resources perspective. For example, a sine wave output may be utilized to modulate the position of a tail and body of a fish relative to each other. Rather than keyframing data for each body part, the system may be configured to change the speed generally of the character without precision math calculating velocities of every component thereof and secondary motion may be added for other components in various embodiments. Thus, the system may be configured such that grouped or bulk motion may be produced without having to hand-animate every part. FIG. 11A illustrates a flowchart for a series of animations such as "sharp left turn", then "sharp right turn", which may be fed into the basic locomotion engine. Transition code may assist with transitions between states, such as between normal straight calm swimming motion and a fleeing state. Interpolation, or animation blending, and type transitioning may be utilized to smooth transitions.

Figure 11B:
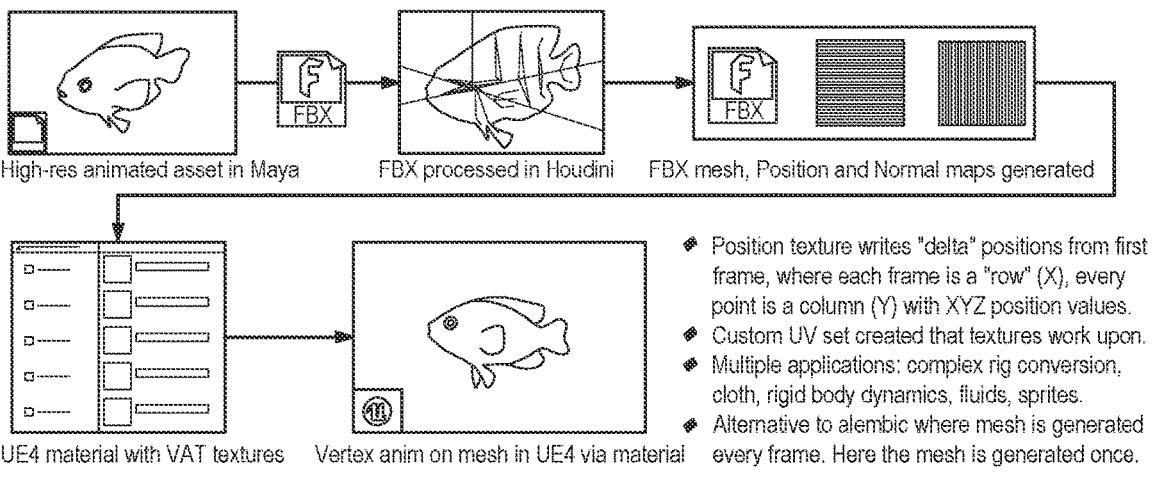
FIG. 11B is a flowchart of vertex animation to assist in converting animated skeletal assets to animated vertex meshes in a clownfish.
Figure 12A:
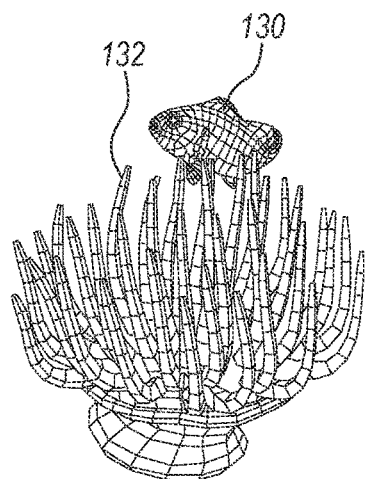
FIGS. 12A to 12D are depth views of vertex animation to assist in converting animated skeletal assets to animated vertex meshes in other virtual objects.
Figure 12B:
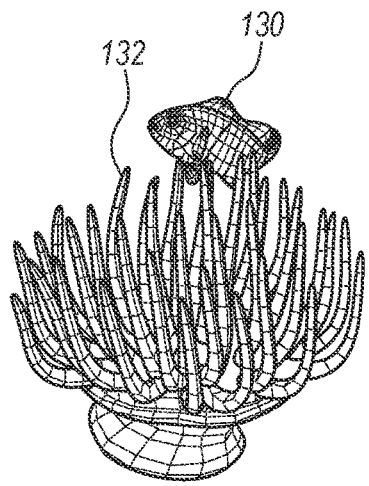
Figure 12C:
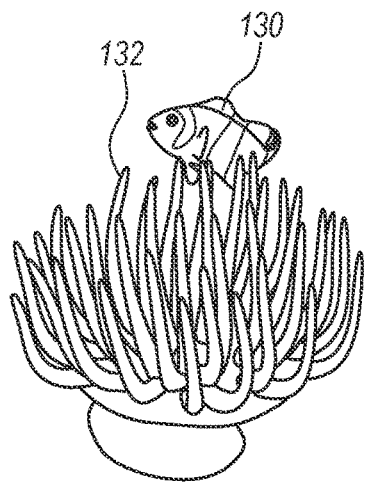
Figure 12D:
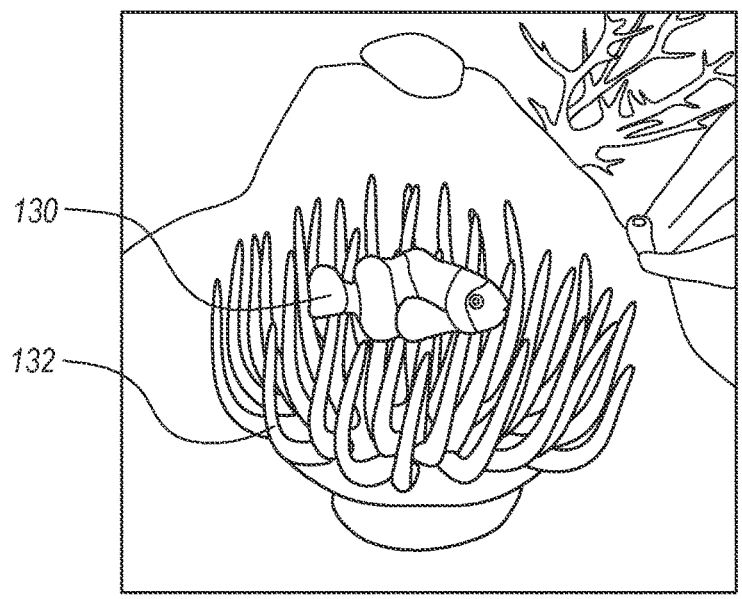

Referring to FIG. 11B, vertex animation may be utilized to assist in converting animated skeletal assets to animated vertex meshes using texture maps, such as those from the brand/authoring tool available under the tradename Houdini (RTM), which may be utilized to process data that may be brought into an interactive development environment, such as the Unreal Engine (RTM) for incorporation into the experience to be presented to the user. Such techniques may be utilized to assist in making assets such as fish significantly more efficient to display for the user, as well as more efficient from a computing resources perspective. In other words, a basic three dimensional model may be associated with a "rig"; then the system may be configured such that the rig need not be used at runtime since associated vertices of the 3-dimensional model/mesh may be animated directly. For example, instead of manipulating a skeleton type frame underlying a fish model, the fish itself, or a mesh thereof, may be moved (i.e., manipulate the mesh vs the rig). Such efficiencies allow for reduced compute overhead, and may assist, for example, in rendering more fish simultaneously.

Referring to FIGS. 12A-12D, similar approaches may be utilized to not only efficiently animate fish such as the clownfish asset shown 130, but also to animate features such as anemones 132. FIGS. 12A-12D illustrate views of the clownfish 130 and anemone 132 in various levels of natural replication, from mesh elements, as in FIG. 12A, to full color animation elements, as in FIG. 12D. If each anemone tentacle had to be animated individually rather than as described above, the requisite computing resources would be significantly larger.

The augmented reality viewer may include a vertex animation routine on the storage device and executable with the processor to store a virtual object mesh representing the virtual object, associate a texture with the virtual object mesh, and manipulate the virtual object mesh to cause movement of the texture and the virtual object in a view of the user. The virtual object mesh may be manipulated to articulate the virtual object. The same virtual object mesh may be used multiple times to cause movement of the texture and the virtual object.

Referring to FIG. 13, in a mixed reality or spatial computing environment, there is a lot of unpredictability, as the system is configured to dynamically react relative to the environment around the user. It is not clear ahead of time what the room around the user will be like geometrically until the system scans the room. There are some unique challenges presented in terms of animating various features, mainly because a very wide range of believable behavior is generally preferred. For example, in a completely virtual reality system, each rock and each fish and each coral could be carefully placed in three dimensions to work well together. This is not the case with an unknown room that the user can see and experience around them in augmented reality. Further, as described above, the system is preferably configured such that various elements, such as fish, may interact with the user, such as via hand or eye motions of the user, and these may also be relatively unpredictable. If every fish did the same pirouette to the left and swam away at the same vector when a relatively high velocity hand of a user approached, the scene would not appear natural. Thus, the system preferably is configured to have many variations of dynamic behaviors for the various states, such as feeding or fleeing.

Figure 14:
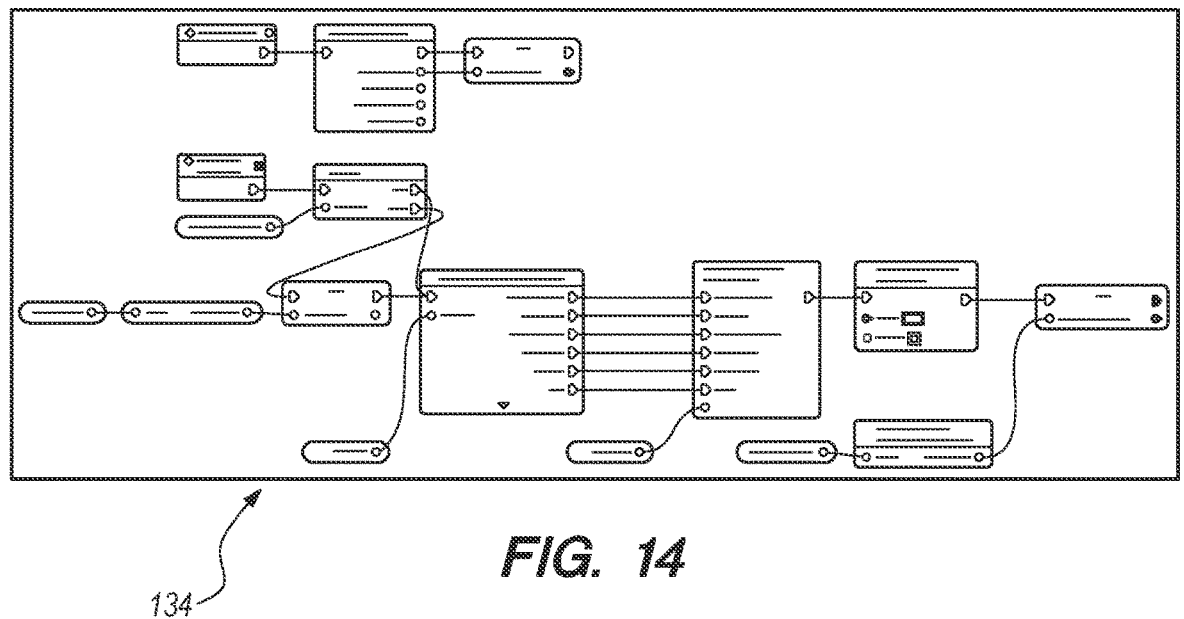
FIG. 14 is a screen shot a "code blueprint"
Figure 15:
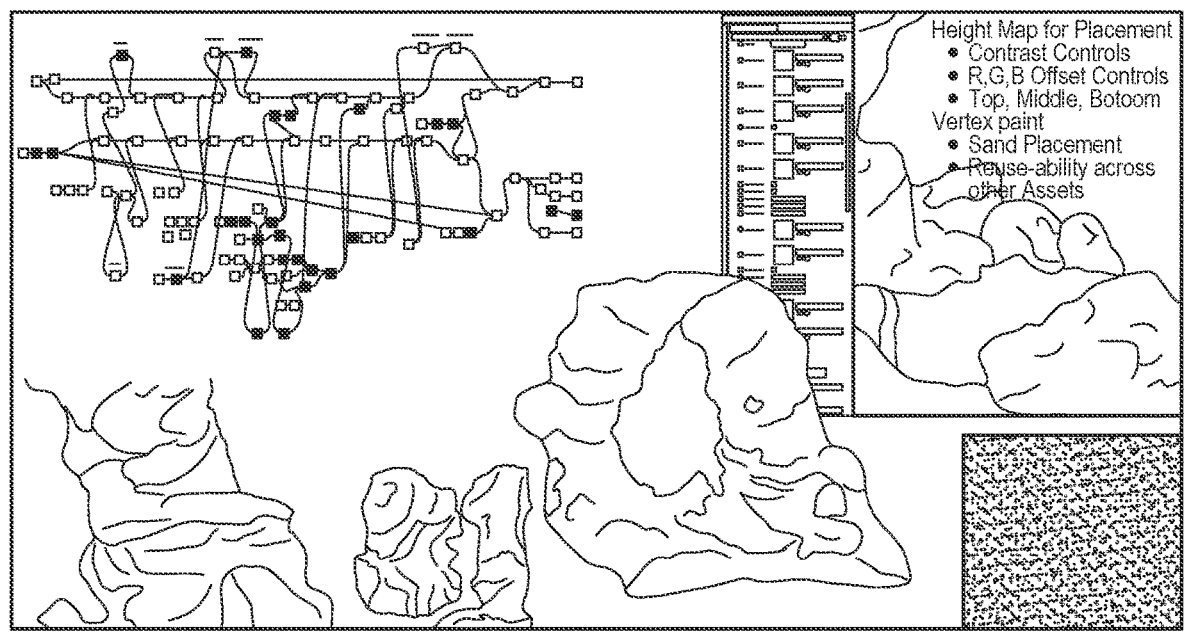
FIG. 15 is a screen shot that illustrates aspects of an interface for laying out and texturing various elements.

Referring to FIG. 14, a "code blueprint" 134 is shown, such as those which may be created using an environment such as that available under the tradename Unreal Engine (RTM). Such a code blueprint represents relatively high level functional programming of various elements, and may be utilized, for example, to control how the system switches between various vista framing/porting configurations, as described above in reference to FIGS. 4, 6, 7, and 8A-8C. For example, the system may be configured to not only locate possible generally planar locations for possible vistas and frames/ports associated therewith, but also to maximize the size of such vistas and frames/ports and/or center them horizontally and/or vertically relative to the planar surface, etc. FIG. 15 illustrates aspects of an interface for laying out and texturing various elements, such as a coral, to be presented to the user. In various embodiments, coloring or painting may be conducted directly on the vertex of the mesh of the object, and height map controls may be utilized to provide texture and topology for an object, so that such configuring need not be conducted with polygons.

Figure 16:
FIG. 16 is a depth view of a coral cluster comprising an assembly of smaller coral elements.

Referring to FIG. 16, a coral cluster 65 similar to those described above 64, 68, 74, 78, 82 is shown and may comprise an assembly of smaller coral elements which may be utilized together akin to building blocks, with configurable rules to assist in making such assembly natural (for example, in various configurations table-driven settings may be utilized to control variables such as number of coral elements which may extend from a given base rock element, acceptable vectoring of plants relative to light sources, etc.). Thus, the system presentation may be iterated using a control panel of sorts without modifying code for every tuning change.

Figure 17A:
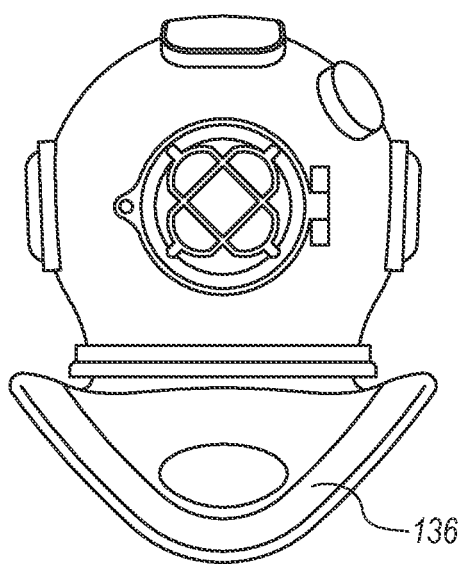
FIG. 17A is a depth view of a high-fidelity model of a diver helmet.
Figure 17B:
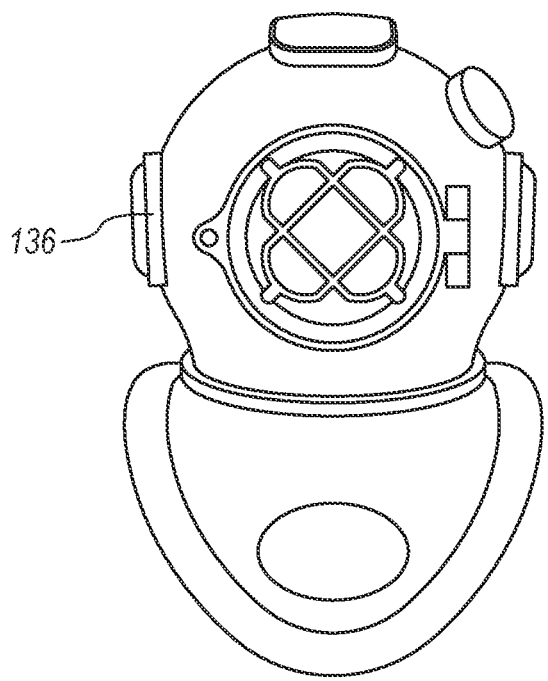
FIGS. 17B and 17C are depth views illustrating a much more efficiently reproducible output of the diver helmet.
Figure 17C:
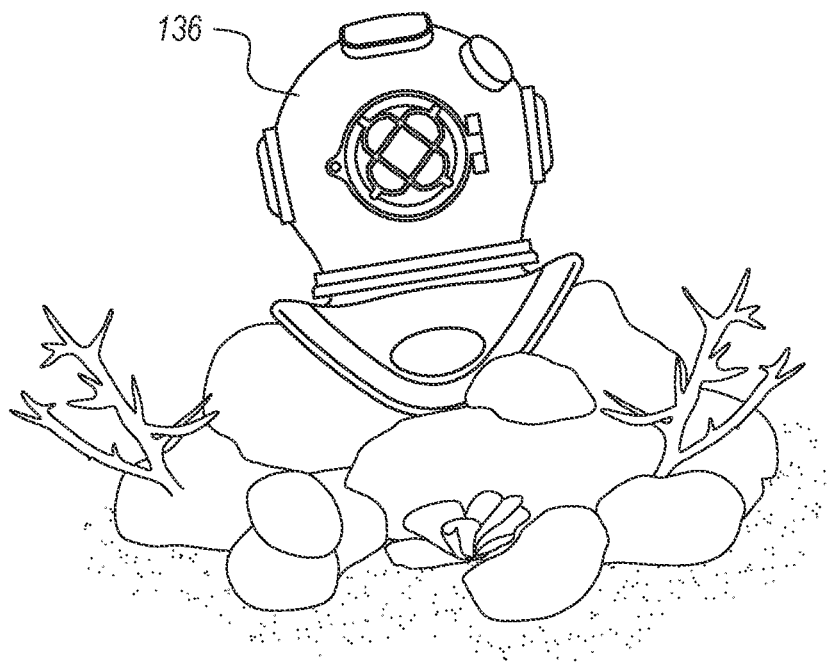
Figure 18:
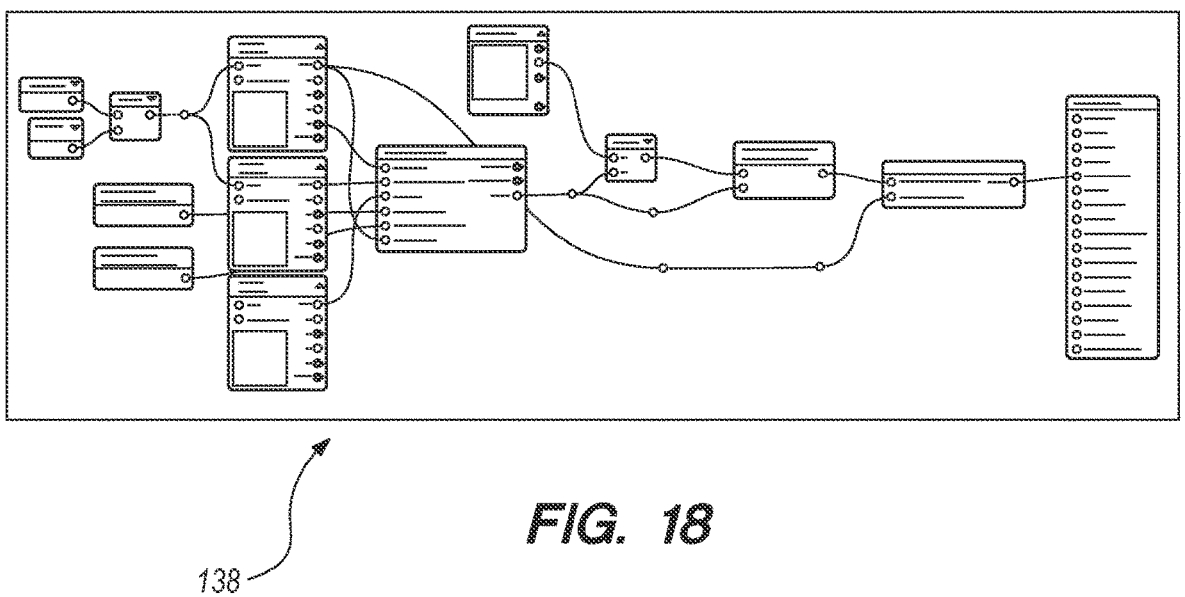
FIG. 18 is a screen of a shot core unlit shader network configuration.
Figure 23A:
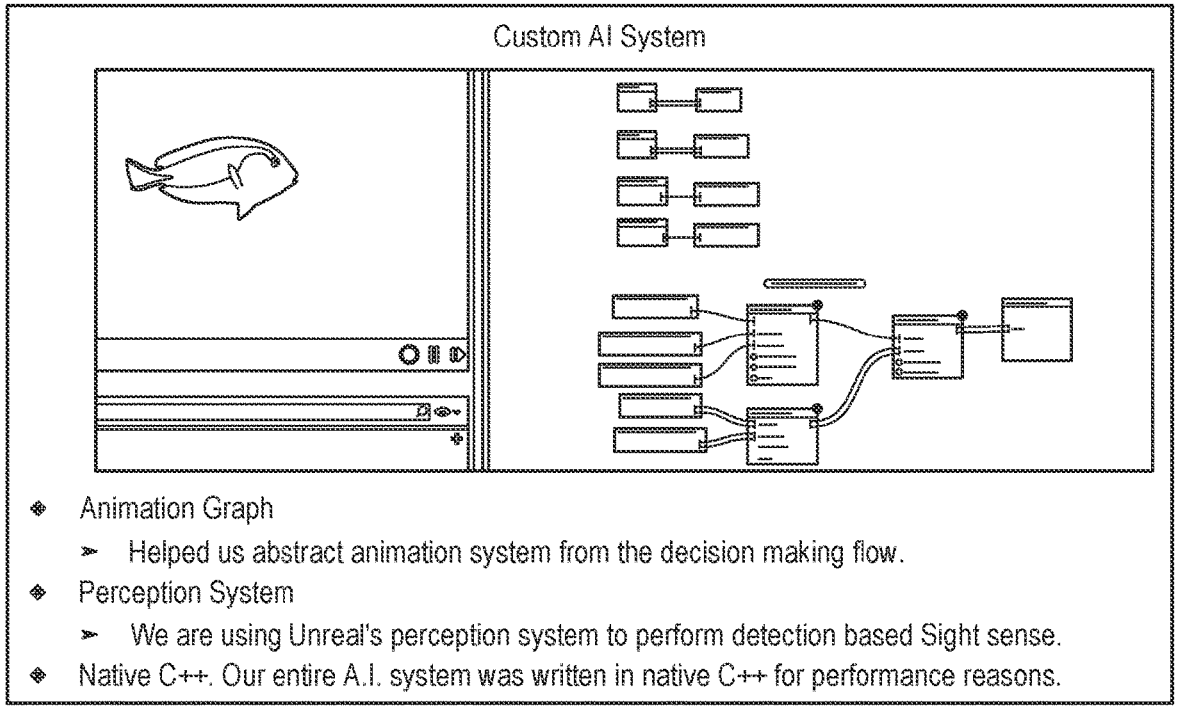
Figure 23B:
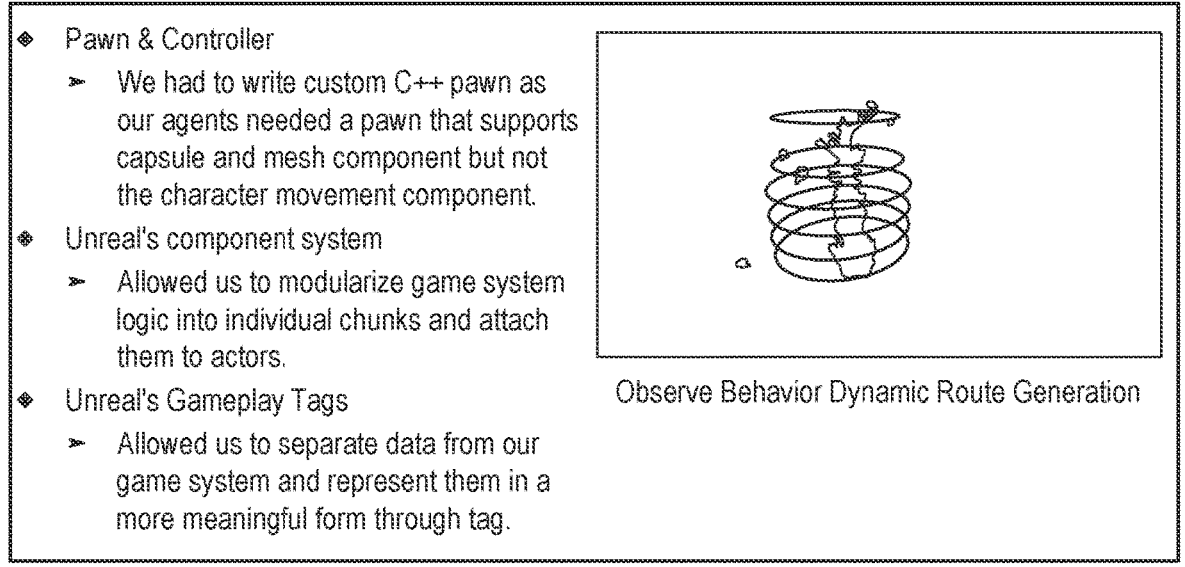

Referring to FIGS. 17A-17C, with regard to lighting and shading, in various embodiments lighting may be faked (i.e., without emulating physics) in a given scene to bypass conventional development environment shading and shadowing, with shading accomplished, for example, by an unlit shading path (i.e., an "emissive channel" in Unreal (RTM) terminology, or "unlit channel" in Unity (RTM); in both cases meaning generally to process a texture without calculating any lighting). The conventional overhead of the graphics pipeline may be bypassed to achieve greater visual quality within tight performance budgets, yielding important overall compute demand efficiencies. The system is configured to utilize unlit shading path techniques, bypassing a conventional lighting engine, and other effects such as fog, optics, and/or water effects may be added to assist in making the presentation to the user perceived as more natural. Various elements may be "instanced", to allow for fine tuning the overall presentation without having to provide compute resource for every individual element. FIG. 17A illustrates a high fidelity model of a diver helmet 136; FIGS. 17B and 17C illustrate a much more efficiently reproducible output of the diver helmet 136, still with relatively high fidelity. Referring to FIG. 18, one embodiment of a core unlit shader network configuration 138 is shown in functional "code blueprint" form for an environment such as the Unreal Engine (RTM).

Referring to FIGS. 19 and 20, as noted above, such as in reference to FIGS. 2, 3, and 4, the system may be configured to utilize the geometry of the room or environment that surrounds the user. Content (such as vistas or corals) may be placed using randomized procedural configurations, and/or to provide a content assembly that fits naturally in the room, is aesthetically pleasing to the user, and is at least somewhat different each time that the system is utilized for such application. As noted above, the system may be configured, for example, to identify planar surfaces, empty surfaces, and empty volumes, which may be suitable for placement of various elements, either with assistance from the user or automatically, such as in accordance with predetermined general themes which may be selected by the user.

The augmented reality viewer may include a surface extraction routine on the storage device and executable with the processor to identify a surface among the real-world objects. The surface may be a two-dimensional surface of a wall or a ceiling.

The augmented reality viewer may include a vista placement routine on the storage device and executable with the processor to capture a space that includes the real-world objects, represent the space as a real-world mesh, collect vertical and horizontal planes from the real-world mesh, filter the planes by height from a floor, dimensions, orientation, and location relative to the real-world mesh, spawn a blueprint which includes a portal frame and all the content in the vista at the selection location, and cut a hole in an occlusion material of the real-world mesh material so the user can see through the portal into the vista.

Referring to FIG. 21, the system also may be configured to locate positions within the mesh of the room that may be suitable anchors for elements such as coral clusters; suitable anchors may, for example, be scored, and the highest scoring may be recommended for the user or automatically selected; after scoring and selection, elements such as coral or coral clusters may then be grown or "spawned" for the user to observe. Scores may be impacted, for example, not only by geometry, but also positioning and orientation relative to the user (for example, the system may be configured to score a potential anchor point higher if a coral may be placed upon it in an orientation that is relatively perpendicular to the floor of the room around the user, rather than at, say, a 45 degree angle from the floor of the room around the user).

The virtual object may thus be a coral cluster. The augmented reality viewer may include a coral cluster spawner on the storage device and executable with the processor to determine a volume, perform a line trace at random points within the volume from a maximum height of the volume to a floor of the volume, determine whether a valid location is identified by the line trace, if a valid location is identified then, in response to the identification, perform a box trace to test if a random cluster will fit without overlapping a world mesh while attempting different scales and rotations and generating a score for each placement, determine a select placement with a highest score among scores, and spawn the coral cluster to the placement with the highest score. The augmented reality viewer may thus include a vista placement routine on the storage device and executable with the processor to place a vista, wherein the volume is bound by the vista.

Figure 24:
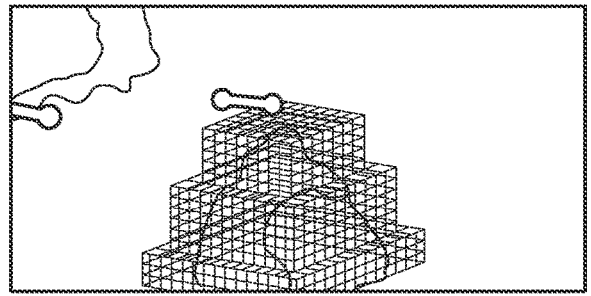

Referring to FIGS. 22A-24, one of the challenges with various system configurations described herein is in creating interesting, believable interactions between the user and augmented reality elements which may be overlaid upon or within the actual world in which the user is positioned. Preferably the various elements such as fish, which are animated and configured to interact with the user, may be configured to have natural, non-repetitive behaviors which make sense to a user relative to the time domain (i.e., they don't swim too fast, they don't switch from "fleeing" state to "discovery/curious" state too quickly or too often, etc.); further, the system, such as that depicted in FIG. 1, generally has limited computing resources. Referring to FIGS. 23A-23B, in various embodiments, one technique for gaining compute efficiency is to write certain code elements in C++ rather than with functional code blueprinting. Referring to FIG. 24, a three dimensional navigation and pathfinding plug-in product which may be utilized with an environment such as the Unreal Engine (RTM) may be utilized to assist in navigating and developing movement paths for various elements such as fish; such a plug-in allows for a development team to focus more on higher-order animation issues, such as fish feeding behavior, exploring behavior, and interactions with the user, such as with the hand motions of a user.

Figure 25:
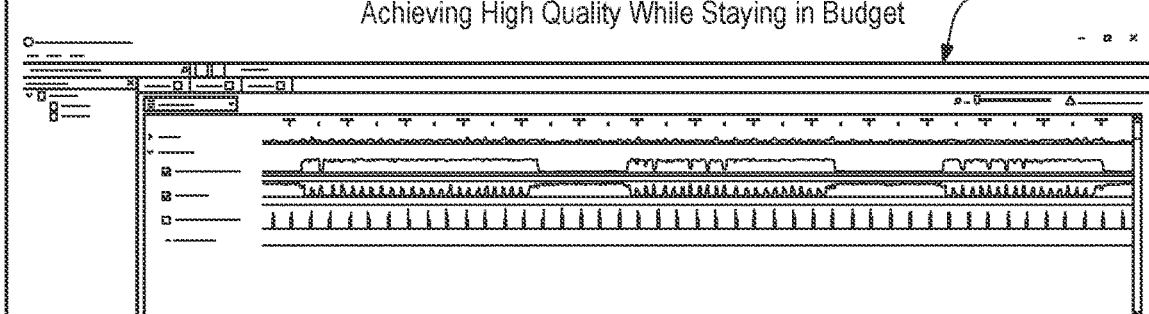
FIG. 25 is a screen shot of tools to visualize the utilization of various computing threads versus time.

Referring to FIG. 25, standard tools may be utilized to visualize 140 the utilization of various computing threads versus time so that a development team may further optimize the system. FIG. 26 illustrates various aspects of learnings which may be applicable to certain development processes and teams.

One or more users may be able to share their virtual environments with one or more other users, such that a plurality of users experience the same virtual environment features from their own viewing perspectives, by virtue of multi-location "passable world" types of configurations, as described in the aforementioned incorporated applications. For example, if a user located in an office in New York has virtual aquarium features displayed around him in his office, and if another user from San Francisco is virtually brought into that New York office and virtual world, then the user from San Francisco preferably is able to see the virtual aquarium features from that San Francisco user's virtual position/orientation within the New York room.

Figure 27:
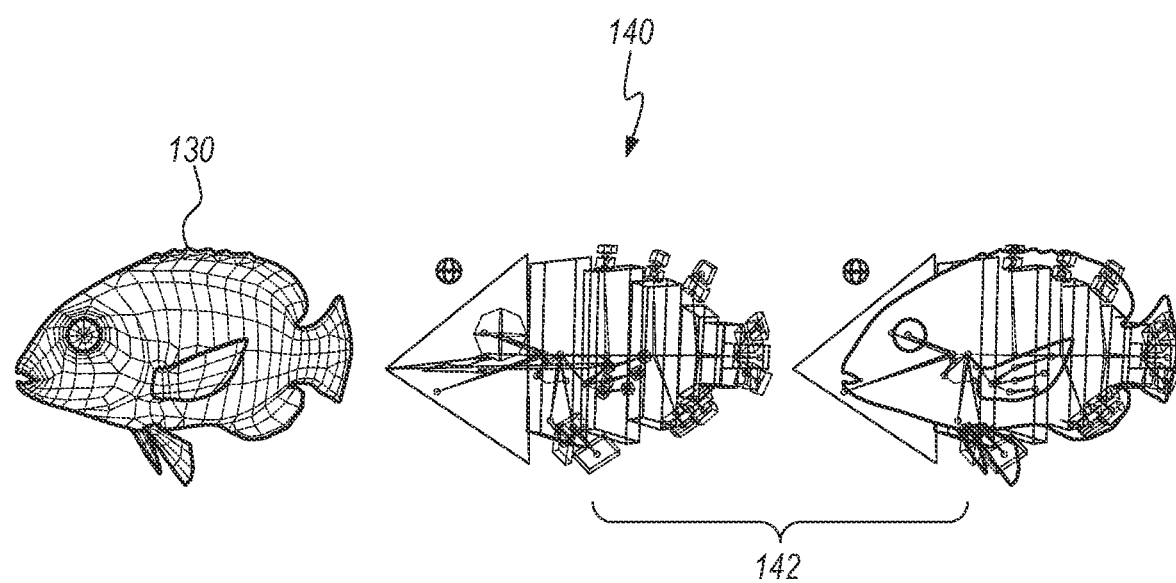
FIG. 27 is a sequential view of an animation pipeline.

Referring to FIG. 27, and also referring back to FIG. 11B, in various embodiments, with an augmented reality aquarium experience, a creative team may engage in rethinking about animations, techniques, and rigs to work with AI pathfinding, which can change states and navigate meshed spaces that may be occupied by one or more users. For example, an animation and/or rigging team may invest time for a standard fish 130 to develop a standard fish rig 140, and animation pipeline 142 with standardized animation and user interface ("UI") controls, auto-swim functionality, auto level-of-detail ("LOD") functionality, fish eye "look-at" tools, customizable tentacle and fin rigs, blend-spaces that trigger various behaviors, and/or vertex animation texture baking tools (i.e., for efficiently transferring details from one model to another). Such features may afford a designer great flexibility, and the ability to re-use animation and tune it to a creature's desired behaviors. In certain configurations we have found it useful to employ tools such as "auto-LOD" from Unreal Engine 4 (RTM) to assist in reducing bone and poly counts dynamically as performance budgets are modified.

Figure 28:
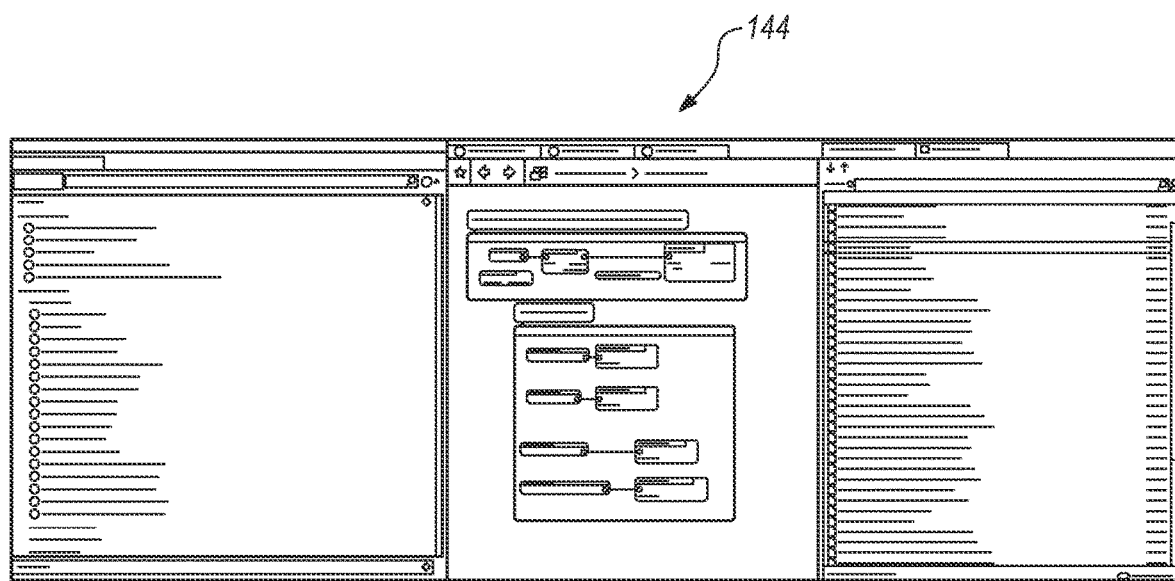
FIG. 28 is a screen shot of an artificial intelligence ("AI") pathfinding solution.

Referring to FIG. 28, and referring back to FIG. 11A, one challenge for developers has related to building and testing animation sets to work with an artificial intelligence ("AI") pathfinding solution. A fish element, for example, may have a set of "blend spaces" with a specific set of animations which may be triggered by the AI system, based upon various logic triggers and specific states, such as swim speed, wander, seek, flee, feed, etc. Blend spaces functionality may be configured to let the developer specify inputs, the animations, and how the inputs are used to blend between animations. As shown in the developer panel 144 representation in FIG. 28, various locomotion states are shown to the left, while the middle display has "audio anim notifies" and "overall anim notify" triggers for behaviors such as feed, turn, etc.

Figure 29:
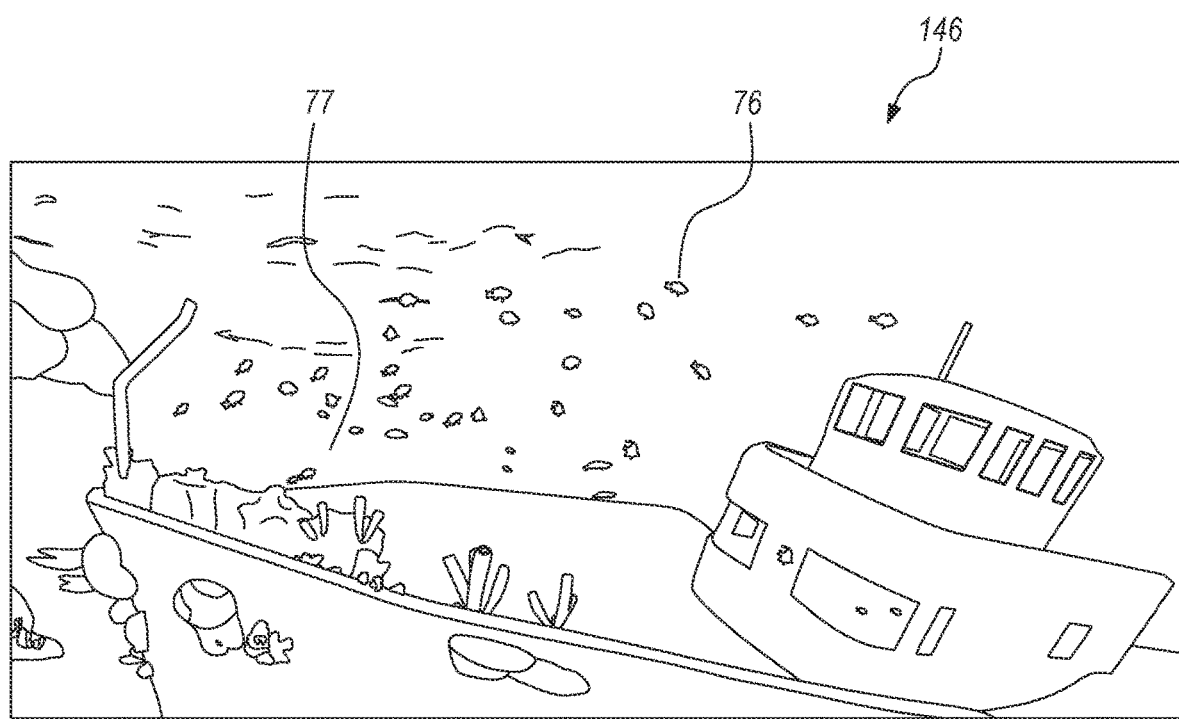
FIG. 29 is a depth view showing baking of animation data into textures.

Referring to FIG. 29, we have relied upon rigs and hand-keyed animations, but we also have discovered some valuable solutions for certain environment-based creature configurations that facilitate baking animation data into textures using a pipeline that leveraged the aforementioned Houdini (RTM) game tools, Maya (RTM), and Unreal Engine 4 (RTM). With such tools, we can develop an end result providing desired performance leeway, particularly in scenarios wherein a balance of central processing unit (CPU) and graphics processing unit (GPU) (including texture streaming) load is desired, such as when using Vulkan 3.1 (RTM) mobile. FIG. 29 illustrates a displayed shipwreck scene 146 wherein schools of fish elements 76, 77 in the midground and background are displayed using the aforementioned baking technique. Due to the sheer amount of content that a developer may want to author in a given experience, it may not be practical to have a scenario such as birds flocking in real-time. For large groups of virtual fish, for example, we have arrived at a solution to reduce baked texture sizes. For each member fish in a large group of fish, one may export-out their swim cycle from Maya (RTM) to an FBX file; each of these caches may then be taken into Houdini (RTM), wherein individual vertex animated textures (or "VATs") may be created that are then plugged into the Houdini softbody frame blending vertext shader tools for deformation. An FX artist may generate a simulation in Houdini and attach each individual particle to a joint which may be utilized to drive each vertex animated fish along through the virtual water. To develop fish and creature swimming content, rig and animation controls may be standardized across a group of, or all of, the fish. Auto-swim functionality may be developed (such as procedural sinusoidal swim functionality). Traditional LOD rig systems or auto-LOD functionality may be utilized. Fish-eye-look-at tools may be developed to assist in driving fish gaze. Additional specialized environment creatures (such as eels, crabs, octopi, sea horses, turtles, rays, sharks) may be developed. Blendspaces and in-place rotation offsets may be used in conjunction with AI to trigger behaviors such as speed or various states. For example, one may show a sample animated rig in Maya with someone controlling it in Maya and/or one may set up needed animations and blend spaces for a technical team to integrate with AI pathfinding. A vertex-animated fish pipeline functionality may be developed to assist in providing flexibility and power given a particular graphics and computing budget scenario, such as one associated with a mobile platform.

Referring to FIGS. 30A-30H, and also referring back to FIGS. 5A, 5B, 5D, 5E, and 16, various coral cluster configurations 83, 152, 154, 156, 158 and components thereof 148, 150 are illustrated. In various embodiments, it was a priority to give users an opportunity to experience a dynamically placed and procedurally driven undersea reef experience. Thus, our challenge was to build a variable-driven coral/rock spawning and placement system using blueprints that integrate with the real world. In one embodiment we opted for a computing-performance-friendly "hybrid" approach where we loaded and placed pre-built rock formations and sand bases, then used our coral spawning and placement system configuration to "spawn" coral and seaweed thereon. In one embodiment, before doing so an art team established a cohesive set of coral rock formations, such as those illustrated in FIGS. 30C and 30D 148, 150 that would serve as the foundation for "kit-bashing" different layouts.

Figure 30A:
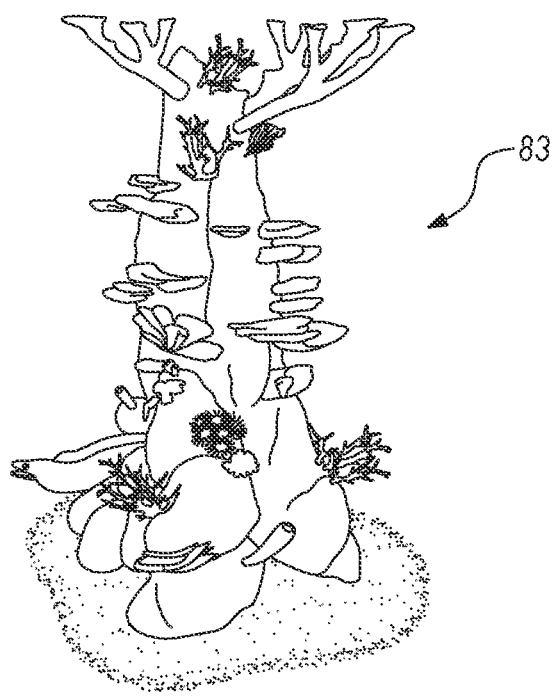
FIGS. 30A to 30H are depth views of various coral cluster configurations.
Figure 30B:
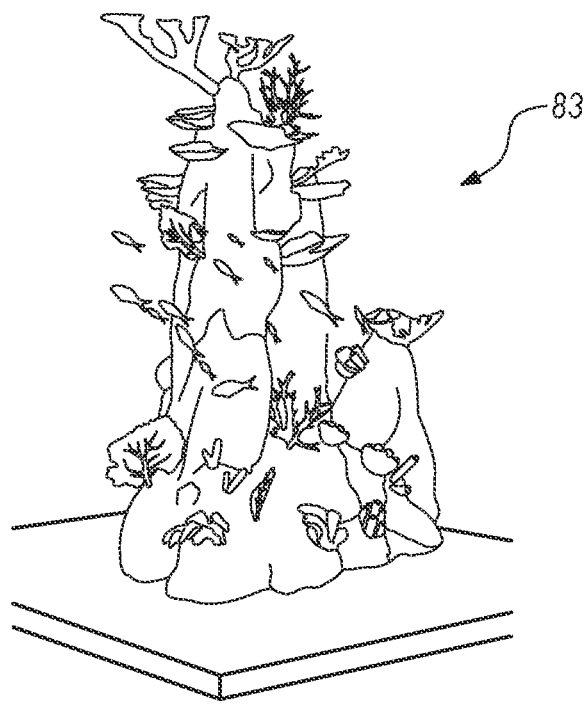
Figures 30C, 30D:
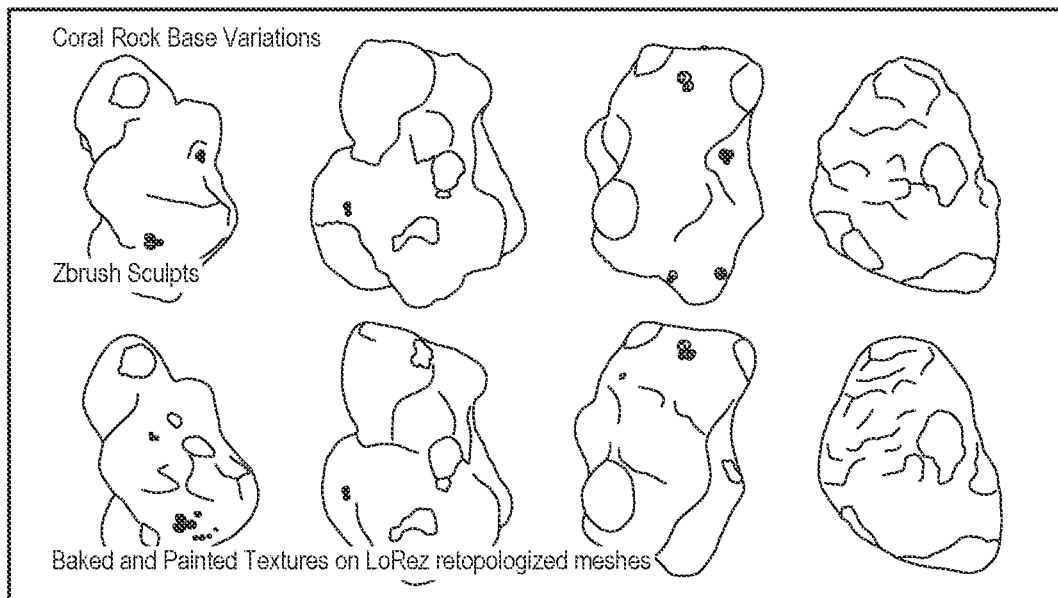
Figure 30E:
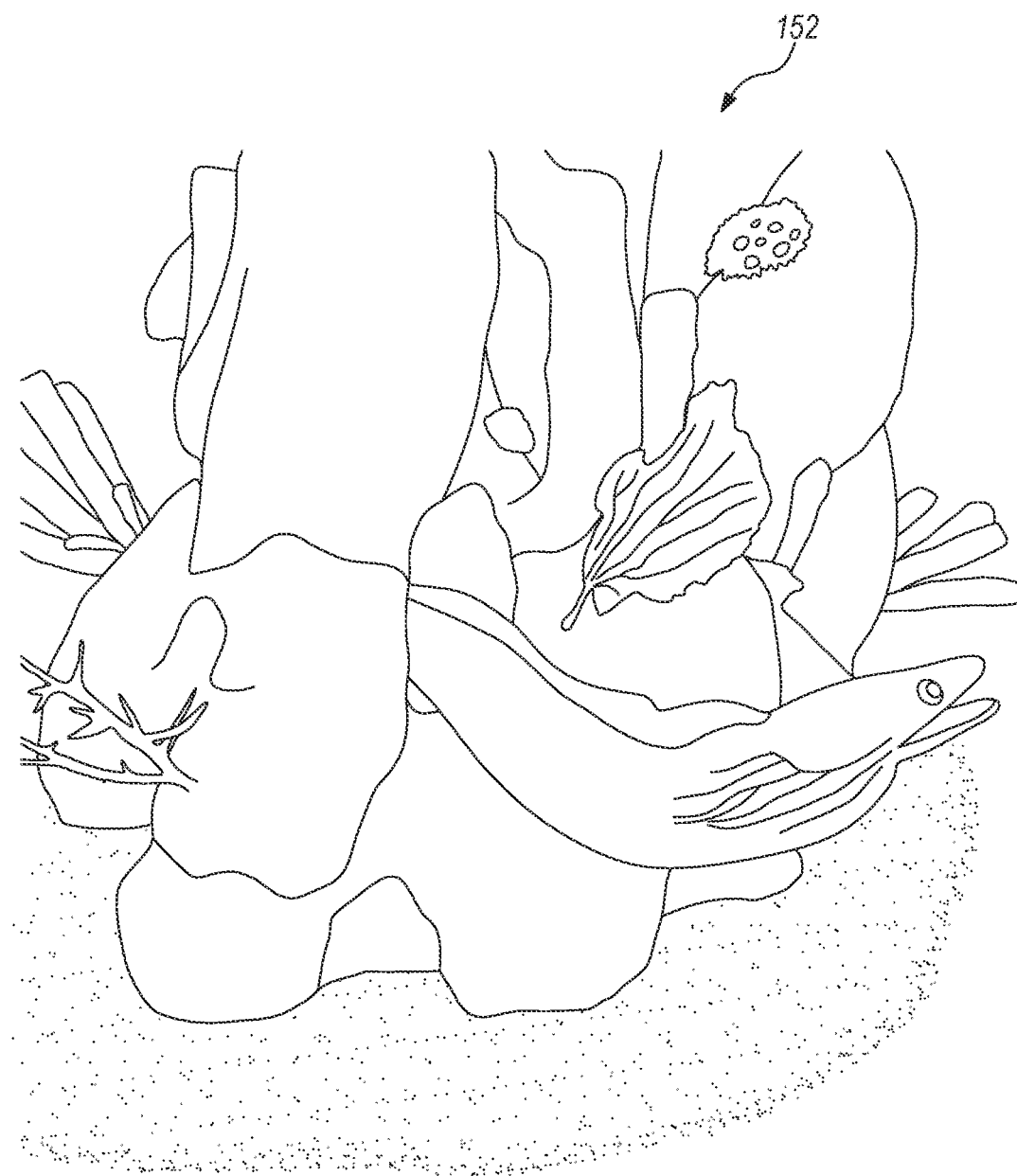
Figure 30F:
Figure 30G:
Figure 30H:
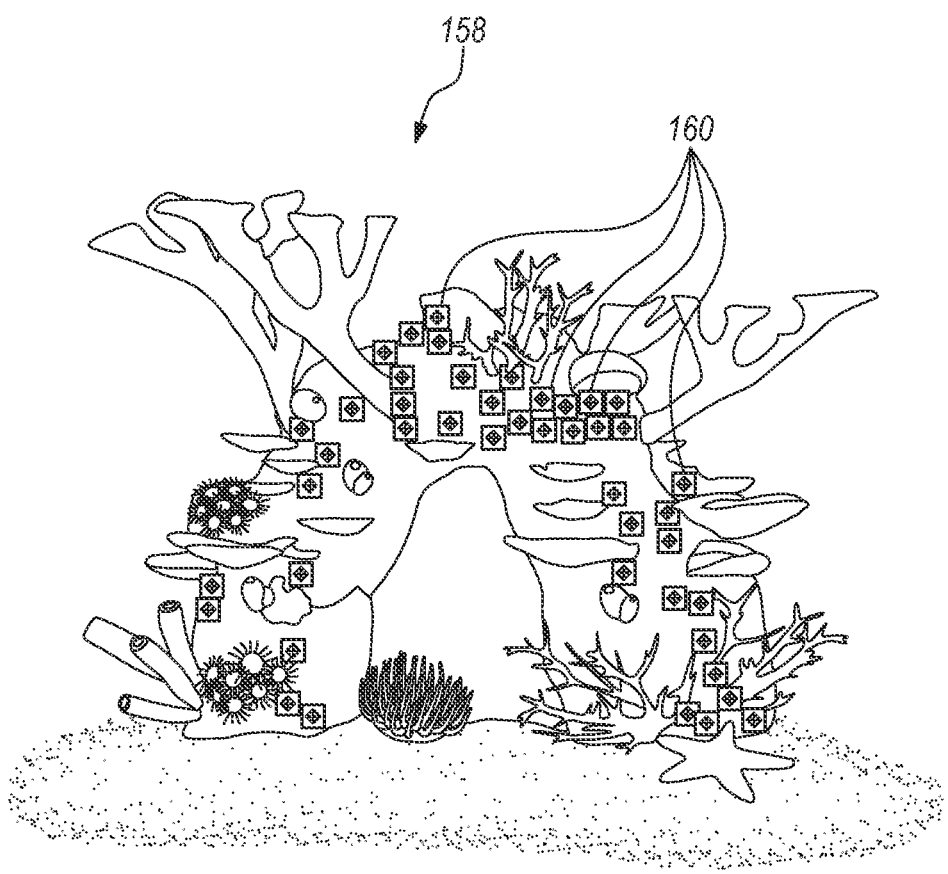

A system for dynamically spawning and placing corals was developed using blueprints. Although blueprints were initially considered more for early prototyping and making gameplay proof of concepts, our technical art team garnered important functionality from them. Referring to FIG. 30H, various vertices 160 are illustrated as they are validated for simulated potential coral growth. In various embodiments it may be desirable, for example, to have coral clusters that behave randomly each time a user returns to the experience.

Figures 31A, 31B:
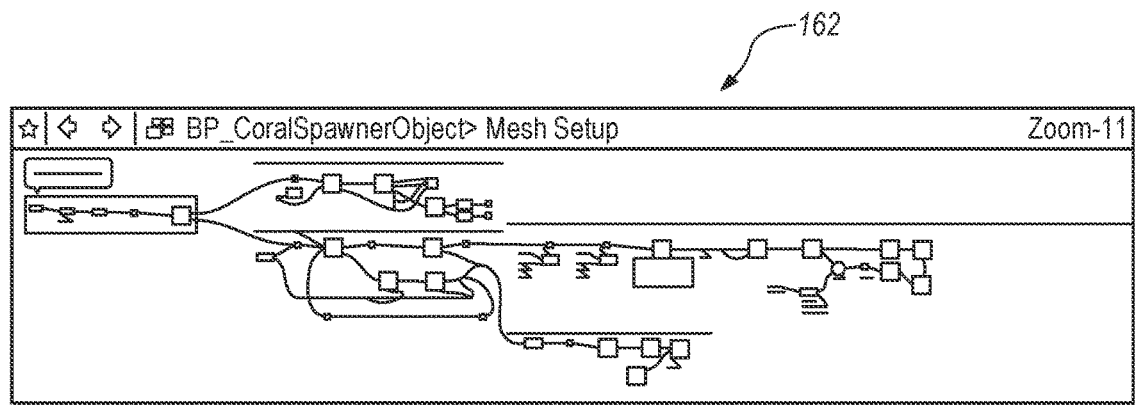
FIGS. 31A and 31B are depth views of a coral spawner object system.

Referring to FIGS. 31A and 31B, images of embodiments of a coral spawner object system 162 and coral growth control table 164 are illustrated. A system embodiment may employ some notable features, such as: a data table approach to set individual population and species max counts, spawn type, height-based percentages, and other classification variables; a vertex crawling and raycast algorithm to check for placement viability, growth, and caching of valid points to file; a run-time coral static mesh loop that first calculates the shadow pass and then creates instanced static meshes of all corals; and a collision-based exclusion configuration to allowed developers to simply place box colliders where they don't want certain species to grow. To help integrate and ground the coral clusters in the user's space, the system may comprise a set of smaller "supporting" rock and sand elements with dynamically moving seaweed on them. The spawner manager (on the C++ core game side) then may be configured to place those supporting elements around the main coral clusters based on available floor planes that the system detects and the space constraints in each user's room. This also helps ensure a unique layout for every play space. In various embodiments, although each of a plurality of core vista environments may be pre-built, the swappable frames and dynamic AI and FX driven creatures may be utilized to make these pre-built vistas feel completely unique. Each layout may be dynamic and dependent upon the meshed room size; for example, FIG. 30F illustrates a procedurally spawned coral cluster 154 surrounded by smaller rock pieces and seaweed elements. The subject system may be configured to use a run-time coral static mesh loop that first calculates the shadow pass using actor tags, then immediately creates instanced static meshes of all corals to reduce draw calls and overhead; growth may be data table driven, and may include vertex-based growth, raycast search and caching of valid points—as well as height-based and collision-based inclusion/exclusion of species. In various embodiments, we have built and employed reusable and procedurally spawnable rocks and coral reef elements that may be rotated and snapped in random configurations; we have grounded and integrated the content by using a subtle falloff on sand and adding randomly placed supporting rocks with seaweed around the clusters; and we have used Maya (RTM), Zbrush (RTM), Substance Designer (RTM), and Painter (RTM) tools to create unique and tileable procedural and hand crafted assets.

The augmented reality viewer may include a coral spawner system on the storage device and executable with the processor to store at least a first coral element of a first type on the storage device, and construct the coral cluster from a plurality of coral elements including the first coral element.

The coral spawner system may be executable with the processor to construct the coral cluster from a plurality of first coral elements.

The coral spawner system may be executable with the processor to store at least a second coral element of a second type on the storage device, wherein the plurality of coral elements includes the second coral element.

The coral spawner system may be executable with the processor to determine a coral cluster setting, wherein the processor constructs the coral cluster according to the setting. The setting may be available space that is detected, and a number of the coral elements is selected based on the available space. The coral spawner system may be executable with the processor to simulate ambient light, wherein the setting is the ambient light. A number of coral elements may be selected based on the ambient light. Orientations of the coral elements may be selected based on the ambient light. The coral spawner system may include a data table on the storage device with a plurality of coral cluster settings, wherein the coral spawner system constructs the coral cluster according to the plurality of coral cluster settings. The coral cluster settings may include at least one of population; species max counts; spawn type; and height-based percentages. The coral spawner system may include a vertex crawling and raycast algorithm to check for placement viability, growth, and caching of valid points to file. The coral spawner system may include a run-time coral static mesh loop that first calculates a shadow pass and then creates instanced static meshes of all coral clusters. The coral spawner system may include collision-based exclusion configuration to place box colliders where certain species should not grow.

FIG. 32 shows instructions that reside on the a storage device as described above, including a set of data of virtual objects 200, a display module 202, a data stream generator 204, a light generator 206, a position adjustment module 208, a nomadic subroutine 210, a wave movement routine 212, a retrieval agent 214, a transmission agent 216, an artificial intelligence system 218, a gaze direction movement routine 220, a personal assistant module 222, a movement module 224, a surface extraction routine 226, a depth creation module 228, a vista placement routine 230, a vertex animation routine 232, and a coral cluster spawner 234.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit, or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. An augmented reality viewer comprising:
   at least one sensor positioned to sense a location of at least one of a plurality of real-world objects and a wave movement initiated by a user in a target zone;
   a storage device;
   a set of data on the storage device including a nomadic life object;
   a processor connected to the storage device;
   a display module on the storage device and executable by the processor to determine a desired display of the nomadic life object relative to the location of at least one of the real-world objects;
   a data stream generator on the storage device and executable by the processor to generate a data stream based on the data and the desired display;
   a light generator connected to the processor to receive the data stream and generate light based on the data stream;
   a display device positioned to receive the light that is generated and to display the light to the user, wherein the light creates a rendering of the nomadic life object visible to the user and rendered in accordance with the desired display;
   a nomadic subroutine on the storage device and executable by the processor to move the nomadic life object relative to the real-world objects;
   a wave movement routine on the storage device and executable by the processor to move the nomadic life object out of and away from the target zone in response to and because of the wave movement being sensed by the at least one sensor in the target zone;
   a movement module on the storage device and executable with the processor to:
   sense, with the at least one sensor, a slow hand movement of a hand of the user in the target zone;
   articulate the body of the nomadic life object in the first back-and-forth manner at a low speed out of the target zone in response to the slow speed of the hand movement;
   sense, with the at least one sensor, a fast hand movement of the hand of the user;
   articulate the body of the nomadic life object in the first back-and-forth manner at a high speed out of the target zone in response to the fast speed of the hand movement; and
   move the nomadic life object to stay close to the hand when the hand moves at the slow speed and due to the slow speed, and move the nomadic life object to flee the hand when the hand moves at the fast speed and due to the fast speed.

2. The augmented reality viewer of claim 1, wherein the data includes a plurality of nomadic life objects, wherein the nomadic subroutine is executable by the processor to move the plurality of nomadic life objects relative to the real-world objects and relative to one another and the wave movement routine on the storage device is executable by the processor to move the plurality of nomadic life object out of and away from the target zone in response to and because of the wave movement being sensed by the at least one sensor in the target zone.

3. The augmented reality viewer of claim 1, wherein the at least one sensor sensing the wave movement is a camera that detects an image of a hand of the user in the target zone.

4. The augmented reality viewer of claim 1, further comprising:
   a handheld controller, wherein the sensor is mounted to a handheld controller that is held in a hand of the user to sense the hand of the user in the target zone.

5. The augmented reality viewer of claim 1, further comprising:
an artificial intelligence system on the storage device and executable with the processor to:
sense a wave movement;
associate, in response to sensing the wave movement, the movement of the nomadic life object with the wave movement as an artificial intelligence cluster,
determine a parameter that exists at a first time when the action is sensed,
associate, in response to the determining of the parameter at the first time, the parameter that exists at the first time with the artificial intelligence cluster;
sense a parameter at a second time;
determine, in response to the determining of the parameter at the second time, whether the parameter at the second time is the same as the parameter at the first time; and
if the determination is made that the parameter at the second time is the same as the parameter at the first time then executing the wave movement routine in response to the determination that is made that the parameter at the second time is the same as the parameter at the first time.

6. The augmented reality viewer of claim 5, wherein the at least one sensor includes an eye tracking camera, wherein the first and second parameters are each a gaze direction as determined by eye tracking of the user using the eye tracking camera.

7. The augmented reality viewer of claim 1, wherein there are a plurality of nomadic life objects and the nomadic subroutine is executable by the processor to move the plurality of nomadic life object relative to the real-world objects, further comprising:
a personal assistant module on the storage device and executable with the processor to:
select a personal assistant nomadic life object among the plurality of nomadic life objects; and
move at least one of the nomadic life objects other than the personal assistant nomadic life objects with the personal assistant nomadic life object in response to an instruction by the user.

8. The augmented reality viewer of claim 1, wherein the display device displays the light that is generated to the user while the user views at least one of the real-world objects.

9. The augmented reality viewer of claim 8, wherein the display device is a see-through display device that allows light from the at least one real-world objects to reach an eye of the user.

10. The augmented reality viewer of claim 1, further comprising:
a head-worn structure shaped to be worn on a head of the user, wherein the display device is mounted to the head-worn structure and the at least one sensor is of a kind that is suitable to sense movement of the display device due to movement of a head of the user; and
a position adjustment module, executable by the processor, to adjust a location of the nomadic life object so that, within a view of the user, the nomadic life object remains stationary relative to the at least one real-world object.

11. An augmented reality visualization method comprising:
sensing, with at least one sensor, a location of at least one of a plurality of real-world objects;
storing, on a storage device, data including a nomadic life object;
determining, with a processor, a desired display of the nomadic life object relative to the location of at least one of the real-world objects;
generating, by the processor, a data stream based on the data and the desired display;
generating, with a light generator, light based on the data stream;
displaying, with a display device, the light that is generated to a user, wherein the light creates a rendering of the nomadic life object visible to the user and rendered in accordance with the desired display;
moving, with the processor, the nomadic life object relative to the real-world objects;
sensing, with the at least one sensor, a wave movement initiated by the user in a target zone;
moving, with the processor, the nomadic life object out of and away from the target zone in response to and because of the wave movement being sensed by the at least one sensor in the target zone;
sensing, with the at least one sensor, a slow hand movement of a hand of the user in the target zone;
articulating, with the processor, the body of nomadic life object in the first back-and-forth manner at a low speed out of the target zone in response to the slow speed of the hand movement;
sensing, with the at least one sensor, a fast hand movement of the hand of the user;
articulating, with the processor, the body of nomadic life object in the first back-and-forth manner at a high speed out of the target zone in response to the fast speed of the hand movement;
moving, with the processor, the nomadic life object to stay close to the hand when the hand moves at the slow speed and due to the slow speed; and
moving, with the processor, the nomadic life object to flee the hand when the hand moves at the fast speed and due to the fast speed.

12. The method of claim 11, wherein the data includes a plurality of nomadic life objects, further comprising:
moving, with the processor, the plurality of nomadic life objects relative to the real-world objects and relative to one another and to move the plurality of nomadic life object out of and away from the target zone in response to and because of the wave movement being sensed by the at least one sensor in the target zone.

13. The method of claim 11, wherein the at least one sensor sensing the wave movement is a camera that detects an image of a hand of the user in the target zone.

14. The method of claim 11, wherein the sensor is mounted to a handheld controller that is held in a hand of the user to sense the hand of the user in the target zone.

15. The method of claim 11, further comprising:
sensing, with the at least one sensor, the wave movement;
associating, with the processor, in response to sensing the wave movement, the movement of the nomadic life object with the wave movement as an artificial intelligence cluster;
determining, with the at least one processor, a parameter that exists at a first time when the action is sensed;
associating, with the processor, in response to the determining of the parameter at the first time, the parameter that exists at the first time with the artificial intelligence cluster;
sensing, with the at least one sensor, in response to the determining of the parameter at the second time, a parameter at a second time;

determining, with the processor, whether the parameter at the second time is the same as the parameter at the first time; and if the determination is made that the parameter at the second time is the same as the parameter at the first time then executing the movement of the nomadic life object in response to the determination that is made that the parameter at the second time is the same as the parameter at the first time.

16. The method of claim 15, wherein the action is a wave motion initiated by the user and the first and second parameters are each a gaze direction of the user.

17. The method of claim 11, further comprising:

moving, with the processor, a plurality of nomadic life object relative to the real-world objects;

selecting, with the processor, a personal assistant nomadic life object among the plurality of nomadic life objects; and moving, with the processor, at least one of the nomadic life objects other than the personal assistant nomadic life objects with the personal assistant nomadic life object in response to an instruction by the user.

18. The method of claim 11, wherein the display device displays the light that is generated to the user while the views at least one of the real-world objects.

19. The method of claim 18, wherein the display device is a see-through display device that allows light from the at least one real-world objects to reach an eye of the user.

20. The method of claim 11, further comprising:

sensing, with the at least one sensor, movement of the display device due to movement of a head of the user; and adjusting a location of the nomadic life object so that, within a view of the user, the nomadic life object remains stationary relative to the at least one real-world object.

* * * * *